United States Patent
Mizutani et al.

(10) Patent No.: US 8,457,495 B2
(45) Date of Patent: Jun. 4, 2013

(54) NETWORK SYSTEM, OPTICAL NETWORK UNIT AND OPTICAL LINE TERMINAL

(75) Inventors: Masahiko Mizutani, Yokohama (JP); Toshiki Sugawara, Kokubunji (JP); Hiroki Ikeda, Hachioki (JP)

(73) Assignee: Hitachi, Ltd., Tokyo (JP)

(*) Notice: Subject to any disclaimer, the term of this patent is extended or adjusted under 35 U.S.C. 154(b) by 1060 days.

(21) Appl. No.: 12/337,790

(22) Filed: Dec. 18, 2008

(65) Prior Publication Data

US 2009/0162063 A1 Jun. 25, 2009

(30) Foreign Application Priority Data

Dec. 21, 2007 (JP) .................. 2007-329496

(51) Int. Cl.
*H04J 14/00* (2006.01)
(52) U.S. Cl.
USPC .................. 398/70; 398/71; 398/58; 398/66
(58) Field of Classification Search
USPC ............... 398/70, 71, 72, 75, 98, 99, 100, 66, 398/67, 68, 69, 58, 47
See application file for complete search history.

(56) References Cited

U.S. PATENT DOCUMENTS

| | | | |
|---|---|---|---|
| 7,016,608 B1* | 3/2006 | Ball et al. | 398/71 |
| 7,885,543 B2* | 2/2011 | Chen et al. | 398/72 |
| 8,005,363 B2* | 8/2011 | Liu et al. | 398/72 |
| 2007/0122151 A1 | 5/2007 | Watanabe | |
| 2007/0212072 A1* | 9/2007 | Iannone et al. | 398/72 |
| 2009/0060507 A1* | 3/2009 | Effenberger et al. | 398/60 |

FOREIGN PATENT DOCUMENTS

JP 2007-129429 5/2007

OTHER PUBLICATIONS

ITU-T Recommendation G.984.1 (Mar. 2003), "Gigabit-capable Passive Optical Networks (GPON): General characteristics", International Telecommunication Union.
ITU-T Recommendation G.984.2 (Mar. 2003), "Gigabit-capable Passive Optical Networks (GPON): Physical Media Dependent (PMD) layer specification", International Telecommunication Union.
ITU-T Recommendation G.984.3 (Feb. 2004), "Gigabit-capable Passive Optical Networks (GPON): Transmission convergence layer specification", International Telecommunication Union.
JP Office Action in JP Application No. 2007-329496, dated Jun. 26, 2012, with partial translation.

* cited by examiner

*Primary Examiner* — M. R. Sedighian
(74) *Attorney, Agent, or Firm* — Mattingly & Malur, PC

(57) ABSTRACT

It is necessary to completely remove overlapping of signals between plural PONs in order to make the PONs coexist. Accordingly, it is required to share or intensively manage bandwidth use conditions over an optical fiber that serves as a common band between plural systems. Therefore, transmission clocks should be synchronized with high accuracy between plural systems. A reference clock is provided from an external device or a representative OLT to the entire systems to perform clock synchronization between plural systems, so that the overall systems are synchronized by synchronizing each OLT with the reference clock. A hierarchical management method is selected that manages ONUs under the control of each OLT by managing band use information arranged for each OLT with respect to an external device or a representative OLT for sharing of bandwidth use conditions between plural systems.

14 Claims, 56 Drawing Sheets

FIG.19A

| ONU-ID | EqD | FLAG, ETC. |
|--------|-----|------------|
| 1801 | 1802 | 1803 |
|  |  |  |
|  |  |  |
|  |  |  |
|  |  |  |

| DIFFERENCE IN DELAY TIME FROM REFERENCE OLT (OR DELAY REFERENCE VALUE) OR DIFFERENCE IN ARRIVAL TIME("DELAY CORRECTED VALUE" OF NEXT FIGURE) | ΔD |
|---|---|

| OLT-ID | RESPONSE DELAY TIME | DELAY CORRECTED VALUE |
|--------|---------------------|------------------------|
| 1901 | 1902 | 1903 |
|  |  |  |
|  |  |  |
|  |  |  |
|  |  |  |

| ONU-ID (2201) | EqD (2202) | FLAG, ETC. (2203) |
|---|---|---|
|  |  |  |
|  |  |  |
|  |  |  |
|  |  |  |

| DIFFERENCE IN DELAY TIME FROM REFERENCE OLT (OR DELAY REFERENCE VALUE) OR DIFFERENCE IN ARRIVAL TIME ("ADJUSTMENT TIME" OF NEXT FIGURE) | ΔD (2211) |
|---|---|

| OLT-ID (2301) | RESPONSE DELAY TIME (2302) | ADJUSTMENT TIME (2303) |
|---|---|---|
|  |  |  |
|  |  |  |
|  |  |  |
|  |  |  |

| IDENTIFIER OR REFERENCE VALUE OF REFERENCE OLT | OLT#1 OR REFERENCE VALUE (2311) |
|---|---|
| IDENTIFIER OF SELF-DEVICE | OLT#2 (2312) |

| BAND CONTROL ID | ALLOCATION BAND | ALLOCATION START TIME | |
|---|---|---|---|
| Alloc-ID#v1 | 2000kB | | |
| Alloc-ID#v2 | 10000kB | | |
| ..... | | | |
| Alloc-ID#vn | 5000kB | | |

Columns: 2501, 2502, 2504, 2503

FIG.26B

| BAND CONTROL ID | ALLOCATION BAND | ALLOCATION START TIME | |
|---|---|---|---|
| Alloc-ID#v1 | 2000kB | | |
| Alloc-ID#v2 | 10000kB | | |
| Alloc-ID#v3 | 0kB | | |
| ..... | | | |
| Alloc-ID#vn | 0kB | | |

Columns: 2501, 2502, 2504, 2503

2504 COMMUNICATION TIME INSTRUCTION (rows Alloc-ID#v1, Alloc-ID#v2)

2505 STANDBY TIME INSTRUCTION (rows Alloc-ID#v3 ... Alloc-ID#vn)

FIG.29A

| ID | DATA AMOUNT ACCUMULATED IN BUFFER | PRIORITY | FLAG |
|---|---|---|---|
| OLT-ID#1 | 3000kB | A | |
| OLT-ID#2 | 7000kB | B | |
| | ..... | | |
| OLT-ID#n | 3000kB | A | |

Columns: 2801, 2802, 2803, 2804

FIG.29B

| ID | DATA AMOUNT ACCUMULATED IN BUFFER | TYPE INFORMATION | FLAG |
|---|---|---|---|
| OLT-ID#1 | 1000kB | FIXED | |
| OLT-ID#2 | 4000kB | VARIABLE | |
| | ..... | | |
| OLT-ID#n | 2000kB | FIXED | |

Columns: 2801, 2802, 2805, 2804

FIG.30A

| ID | ALLOCATION BAND | ALLOCATION START TIME |
|---|---|---|
| OLT-ID#1 | 3000kB | |
| OLT-ID#2 | 7000kB | |
| | ..... | |
| OLT-ID#n | 3000kB | |

FIG.30B

| ID | ALLOCATION BAND | TYPE | ALLOCATION START TIME |
|---|---|---|---|
| OLT-ID#1 | 1000kB | FIXED | |
| OLT-ID#1 | 4000kB | VARIABLE | |
| | ..... | | |
| OLT-ID#m | 2000kB | FIXED | |

FIG.31

| OLT | BAND CONTROL ID | ALLOCATION BAND | |
|---|---|---|---|
| OLT-ID#1 | Alloc-ID#v1 | 2000kB | |
| OLT-ID#2 | Alloc-ID#v1 | 10000kB | |
| | ---- | | |
| OLT-ID#n | Alloc-ID#vn | 5000kB | |

FIG.35A

| OLT-ID | USE BAND | START TIMING | ALLOCATION PRIORITY | MAXIMUM AVAILABLE BAND |
|---|---|---|---|---|
| | | | | |
| | | | | |
| | | | | |
| | | | | |

| REMAINING BAND | |
|---|---|
| IDENTIFIER OF OWN OLT | |

| BAND CONTROL ID | ALLOCATION BAND | COMMUNICATION START LOCATION | FRAME NUMBER | |
|---|---|---|---|---|
| Alloc-ID#v1 | 2000kB | | | |
| Alloc-ID#v2 | 10000kB | | | |
| ····· | | | | |
| Alloc-ID#vn | 5000kB | | | |

Columns: 2501, 2502, 4501, 4502, 2503

FIG.43B

| BAND CONTROL ID | ALLOCATION BAND | COMMUNICATION START LOCATION | FRAME NUMBER | |
|---|---|---|---|---|
| Alloc-ID#v1 | 2000kB | | | |
| Alloc-ID#v2 | 10000kB | | | |
| Alloc-ID#v3 | 0kB | | | |
| ····· | | | | |
| Alloc-ID#vn | 0kB | | | |

Columns: 2501, 2502, 4501, 4502, 2503

2504 COMMUNICATION TIME INSTRUCTION (rows Alloc-ID#v1, Alloc-ID#v2)

2505 STANDBY TIME INSTRUCTION (rows Alloc-ID#v3 ... Alloc-ID#vn)

FIG.49A

| BAND CONTROL ID (2501) | ALLOCATION BAND (2502) | COMMUNICATION START LOCATION (5101) | FRAME NUMBER (5102) | (2503) |
|---|---|---|---|---|
| Alloc-ID#v1 | 2000kB | | | |
| Alloc-ID#v2 | 10000kB | | | |
| ----- | | | | |
| Alloc-ID#vn | 5000kB | | | |

FIG.49B

| BAND CONTROL ID (2501) | ALLOCATION BAND (2502) | COMMUNICATION START LOCATION (5101) | FRAME NUMBER (5102) | (2503) |
|---|---|---|---|---|
| Alloc-ID#v1 | 2000kB | | | |
| Alloc-ID#v2 | 10000kB | | | |
| Alloc-ID#v3 | 0kB | | | |
| ----- | | | | |
| Alloc-ID#vn | 0kB | | | |

2504 COMMUNICATION TIME INSTRUCTION (rows Alloc-ID#v1, Alloc-ID#v2)

2505 STANDBY TIME INSTRUCTION (rows Alloc-ID#v3 ... Alloc-ID#vn)

FIG.50A

| ID | ALLOCATION BAND | ALLOCATION START TIME | FRAME COUNTER |
|---|---|---|---|
| OLT-ID#1 | 3000kB | | |
| OLT-ID#2 | 7000kB | | |
| | ..... | | |
| OLT-ID#n | 3000kB | | |

| ID | ALLOCATION BAND | TYPE | ALLOCATION START TIME | FRAME COUNTER |
|---|---|---|---|---|
| OLT-ID#1 | 1000kB | FIXED | | |
| OLT-ID#1 | 4000kB | VARIABLE | | |
| | ..... | | | |
| OLT-ID#n | 2000kB | FIXED | | |

2901, 2902, 2903, 2904, 5101

NETWORK SYSTEM, OPTICAL NETWORK UNIT AND OPTICAL LINE TERMINAL

CLAIM OF PRIORITY

The present application claims priority from Japanese patent application JP2007-329496 filed on Dec. 21, 2007, the content of which is hereby incorporated by reference into this application.

BACKGROUND OF THE INVENTION

1. Field of the Invention

The present invention relates to a system control method that enables managing of ONUs, securing of communication bands, and identifying of communication data in each of plural systems that are disposed to share an optical fiber when plural optical access devices are installed.

2. Description of the Related Art

Due to the increased demands for broad bands, phone line-based access technologies such as Digital Subscriber Line (DSL) and the like are replaced by large-capacity access lines using optical fibers as user-dedicated access lines. Optical access line type is generally classified into two types. One type is called "media converter (MC)" and this is a method of connecting optical fibers from a station of a communication service provider to a user's home or building to establish optical fibers in a one-to-one (point-to-point) topology. The other type of method is called PON (Passive Optical Network), and this provides an optical coupler (optical splitter) in an optical fiber interval that is disposed in an interval from a station to a user to split an optical signal from a station into 32, 64, or 128 optical fibers. Currently, the PON system, which provides point-to-multipoint topology, has drawn attention for optical access services. One reason is that an optical fiber from the station to the splitter is shared by all the users in the PON system and therefore costs for establishing lines and maintenance-related costs may be reduced. The other reason is that the PON system requires a signal multiplexing transmission structure because of signals from plural users are arranged and received on the station side. Multiplexing methods currently adopted include TDMA (Time Division Multiple Access), CDMA (Code Division Multiple Access) and so on. Utilizing these functions provides the PON system with an advantage that mounting optical devices may be done at low costs with respect to devices on the station side.

Currently, there are discussed recommendations (ITU-T Recommendation G. 984. 1, "Gigabit-capable Passive Optical Networks (G-PON): General characteristics", TTU-T Recommendation G. 984. 2, "Gigabit-capable Passive Optical Networks (G-PON): Physical Media Dependent (PMD) layer" specification) of G-PON (Gigabit-capable PON) for ITU-T (International Telecommunication Union Telecommunication Standardization Sector). The recommendations have been completed for the main parts, and vendors started to release G-PON products on the market. At the same time, carriers from each country started optical access services that employ G-PON. Also, some carriers are providing optical access services whose infrastructure is based on GE-PON (Gigabit Ethernet PON) standardized in IEEE (Institute of Electrical and Electric Engineers).

While introduction of optical access systems is accelerated, next-generation optical access systems are already under discussion in FSAN (Full Service Access Network) and IEEE (IEEE 802.3av) that are standardization groups regarding optical access technologies. In terms of transmission path multiplexing methods, IEEE 802.3av moves toward speed-up of TDMA and FSAN considers WDMA as another candidate and therefore both do not reach one conclusion at the current stage. However, both adopt 10 Gbps as a reference respective of downstream transmission speed.

Upon high bit rate (broad band) transmission of 10 Gbps, problems with wavelength distortion occur due to S/N deterioration and/or wavelength dispersion. Accordingly, improving the control of output of a laser or wavelength for suppressing wavelength dispersion is considered as an important technology. Further, the cost of addressing the problems should be in consideration of the market cost not in terms of high-cost devices that is used for a repeating system.

What carriers' value most is not depending on the next-generation PON methods but the ability to coexist with existing B-PON (Broadband PON, which is standardized in ITU-T in Recommendation G.983.x series)/GE-PON/G-PON. In the FSAN, it is currently researched to make the existing PON coexist with next-generation optical access system (NGA) through WDM, and therefore, research is undergoing in terms of costs and performance of wavelength filters to be introduced on the ONU (Optical Network Unit; one of the PON equipments located in the user sites) side. It is necessary to perform technological reviews on technologies in order to realize 10 Gbps having wavelengths applicable to the NGA restriction. The NGA review group of the FSAN is considering adopting a wavelength dispersion compensation function for electrical signals as well as light, a semiconductor optical amp. (such as SOA, EDFA (Erbium Doped Fiber Amplifier), PDFA (Praseodymium Doped Fiber Amplifier)), an external modulator (Electro-Absorption Modulator Integrated Distributed Feedback Laser; EA-DFB), high-sensitive receiver (Avalanche Photo Diode; APD), and an FEC (Forward Error Correction) to realize 10 Gbps transmission in existing optical fibers (split number of 32 or 64, transmission distance of 20 km).

Therefore, multi-system coexistence is also under discussion which is carried out by time multiplexing using the same wavelength in optical characteristics for a case where plural PON systems coexist. Such a system construction is expected to be necessary in the future from the point of view of costs, which are considered the most important in optical access.

BRIEF SUMMARY OF THE INVENTION

Costs required to replace transmission devices become significantly problematic as FTTH services are being prevalently used. System costs are directly reflected in user's service fees in accordance to the type of access system. Due to the increase of the speed of DSL and the DSL speed is migrating toward using FTTH, which in turn accelerates infrastructure-providing businesses and exposes price competition. Therefore, cost has recently become an important issue in optical access systems and the main topic in respects to standardization. Carriers are requiring as the development of system exchange or coexistence between plural systems having different generation and method be considered in order to maximally utilize existing resources such as optical fiber as well as to reduce costs required to establish lines connecting between users' homes and a station of a carrier and device costs.

In the conventional PON, the specifications describing thereof are under the assumption that the PON exists alone. In a case where plural systems coexist, it is problematic how to remove interference between the systems. From the problems of optical characteristics, it has been suggested to use the same wavelength for plural PONs especially for PON upstream communication, and it has also been suggested to make plural systems coexist at the same wavelength by a time-multiplexing method even with respect to PON downstream communication.

It is required to remove a signal overlapping between plural PONs in order to make the plural PONs coexist. Accordingly, it is needed intensively manage bandwidth use conditions over an optical fiber that serves as a common bandwidth between the plural systems. Thus, transmission clocks should be synchronized with high accuracy between plural systems.

A general object of the present invention is to provide a communication technology that enables migration to new systems and enables various PON systems having different methods to coexist by solving the above problems in a case where an optical fiber is shared by plural PON systems including a case where each PON has different transmission speed.

A first OLT and a second OLT mutually share the allocation information of the uplink communication band such that each of the first and second ONUs transmits the uplink frame.

The first OLT allocates the uplink communication band to the first ONU by avoiding the uplink communication band that is allocated to the second ONU and the second OLT allocates the uplink communication band to the second ONU by avoiding the uplink communication band that is allocated to the first ONU.

In the optical access system business, in order to maximally use the existing optical fiber resources, it is possible to make the plural PON systems coexist. Specifically, when the signal passes through the optical fiber, it is possible to control so that the response timings to the instruction of the OLT from each of the ONUs are not overlapped.

BRIEF DESCRIPTION OF THE DRAWINGS

FIGS. 19A and 19B are views illustrating an example of a database construction including information that should be retained to adjust a logical distance between PON systems as described with reference to FIGS. 15 to 17;

FIG. 20 is a view illustrating a construction example of a table for adjusting an arrival time of the upstream signal between OLTs by intensively managing a response time in all of the OLTs;

FIGS. 23A and 23B are views illustrating an example of a database construction including information that should be retained to adjust a logical distance between PON systems as described with reference to FIGS. 21 and 22;

FIGS. 24A and 24B are views illustrating a construction example of a delay DB 2101;

FIGS. 26A and 26B are views illustrating a construction example of a bandwidth allocation table retained in an OLT;

FIGS. 29A and 29B are views illustrating a construction example of a table for calculating an available bandwidth for each OLT in a DBA control unit;

FIGS. 30A and 30B are views illustrating a construction example of a bandwidth allocation table for managing an available bandwidth for each OLT in a DBA control unit;

FIG. 31 is a view illustrating a construction example of a band allocation management table in the DBA control unit 2600 when bandwidth allocation to the entire ONUs is determined in a DBA control unit;

FIGS. 35A and 35B are views illustrating a database construction including information that should be retained to autonomously adjust a logical distance between PON systems;

FIGS. 43A and 43B are views illustrating a construction example of a band allocation information table in case of FIGS. 41 and 42;

FIGS. 49A and 49B are views illustrating a construction example of a bandwidth allocation information table in case of FIGS. 47 and 48;

FIGS. 50A and 50B are views illustrating a bandwidth use condition management table retained in a DBA control unit when a DBA period is different in each OLT in the first and second methods;

DETAILED DESCRIPTION OF THE INVENTION

Figure 1:
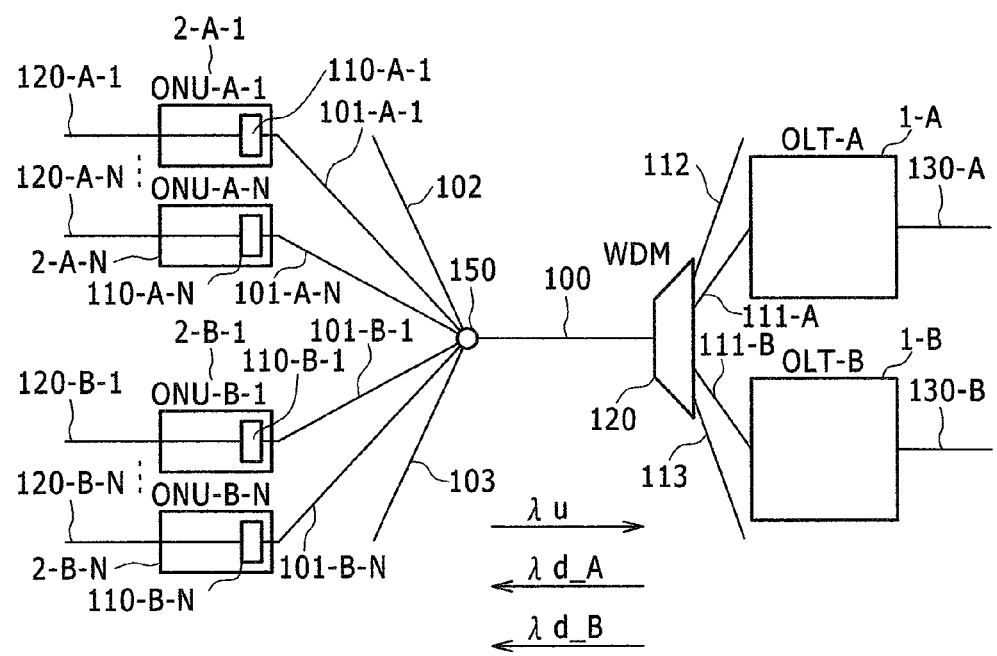
FIG. 1 is a view illustrating a general system construction in which an optic fiber is shared by plural PONs that are considered as an application of the present invention.

The object of the present invention aims to minimally suppress an influence on the other systems and an influence on data for communication, which take place when an optical fiber is shared by plural PON systems and is caused by a ranging process in a certain system. Therefore, a mechanism has been achieved in which PON section communication timing of each system is shared between PON systems that share an optical fiber. This enables efficient operation of the plural PONs while maintaining basic functions of PON. Plural variations may be considered in the mode of disposing the PONs but the present invention may apply to all of the configurations. Plural variations are considered when plural PONs are disposed in the form of sharing an optical fiber. An example includes a case where the plural PONs use a common upstream wavelength or a common downstream wavelength. For a system configured in such an organization, four methods are generally considered according to combinations of wavelengths used for upstream communication and downstream communication.

When each of the disposed PONs uses different wavelengths with respect to each of upstream communication and downstream communication, the same operating method as the prior art (existing recommendations) may apply to the system. It is problematic when one of the uplink communication and downstream communication uses a common wavelength.

For example, it is difficult to receive a correct signal at the OLT side when the upstream wavelength is shared because signals from all of the ONUs coexist on the optical fiber after the signals from the plural ONUs have been multiplexed (that is, on the optical fiber disposed at the OLT side to transmit a multiplexed signal). The control of communication time, which has been conventionally performed for each and every ONU in an individual PON system, should be generally carried out for the all of the ONUs that share the optical fiber in order to avoid this problem. In this case, all of the ONUs that use the wavelength for the upstream communication are subjected to controlling communication time without depending on the OLT to which the ONUs belong. The communication timing control should be carried out on the OLT side since time-multiplexing communication should be performed between the ONUs.

Moreover, when a downstream wavelength is shared, the plural PON systems share the head information of a downstream communication frame. In this case, therefore, each OLT does not independently decide timing when an instruction is made (a frame is transmitted) to the ONU that is subordinate to the OLT and should control the ONU under its management while always adjusting the frame transmission timing together with the other OLTs that are connected to the same optical fiber. At this time, timing when an upstream communication bandwidth is notified to the ONU should be interlocked between all of the PONs. Therefore, the bandwidth instruction timing (Dynamic Bandwidth Assignment (DBA) processing timing and band control period) from the OLT should be operated under any synchronized condition even if each PON uses its own individual wavelength for the upstream communication. That is, the communication timing needs to be controlled on the OLT side to perform time multiplexing communication of PON control signals.

As mentioned above, in either case of the upstream wavelength or the downstream wavelength, coexistence requires the control of the frame transmission timing in the PON section. In the PON, the frame transmission timing is managed by the OLT side no matter whether it is upstream or downstream. Therefore, the means becomes important, which shares bandwidth information and communication timing (clock) information between the plural OLTs. Generally, there are considered a system having a function of managing communication timing information of each OLT outside the OLT and a system in which each OLT has a control function to manage other co-existed OLTs' timing control information. Moreover, there are adopted two methods as a bandwidth (timing) control method in these systems. That is, there exist a centralized control method that independently instructs the other OLTs with the communication timing by either an external timing information management unit in the former system or the OLT in the latter system and a distributed processing method that determines the timing by each OLT and shares the result between the OLTs.

In exemplary embodiments of the present invention, communication rate of an individual PON or type of communication protocols used in the PON section does not matter. For example, a combination of G-PON standardized in ITU-T and GE-PON, G-PON, or next generation PON (for example, ITU-T based 10 Gbps-PON, IEEE 802.3av based 10 Gbps E-PON, or the like) may be available. A frame configuration of ITU-T based G-PON is assumed as an example in the following description.

According to an exemplary embodiment of the present invention, a system with a common upstream wavelength will be first described herein as an example, which has a timing information management unit outside an OLT, wherein the timing information management unit independently supplies clocks to the OLT. Thereafter, exemplary embodiments and effects will be described with respect to a case where the system has a downstream wavelength and a case where the system has common upstream and downstream wavelengths.

FIG. 1 is a view illustrating a general system construction in which an optical fiber is shared by plural PONs that are considered as an application of the present invention. An OLT-A (1-A) controls NA ONUs from ONU-A-1 to ONU-A-NA, and performs start of ONUs, bandwidth control of the ONUs by a DBA, and state management of the ONUs. An OLT-B (1-B) controls NB ONUs from ONU-B-1 to ONU-A-NB, and performs start of ONUs, bandwidth control of the ONUs, and state management of the ONUs. The OLT-A and the OLT-B share an optic fiber 100 in a PON section (Optical Distribution Network (ODN) section). The OLT-A and the OLT-B are connected to the shared optical fiber 100 through optic fibers 111-A and 111-B for OLT connection, respectively. The optical fibers for OLT connection are connected to the optical fiber 100 through a wavelength division multiplexer (WDM) 120. The WDM 120 has a function of multiplexing a signal transmitted from the OLT-A to the ONU and a signal transmitted from the OLT-B to the ONU.

In this system, signals transmitted from the OLT-A to the ONUs under its control, respectively, use different wavelengths from each other (hereinafter, a signal directed from the OLT to the ONUs is referred to as "downstream signal" or "downstream communication" and a signal directed in the opposite direction of the downstream signal is referred to as "upstream signal" or "upstream communication"). In the drawings, the downstream signals are indicated as λd_A and λd_B. For upstream signals, ONUs transmit the signals to the OLT at the same wavelength no matter whether they are ONUs under the control of the OLT-A or ONUs under the control of the OLT-B. These upstream signals are indicated as λu in the drawings. Accordingly, the upstream signals from the entire ONUs are distributed to the OLT-A and the OLT-B with the same strength. The signals multiplexed by the WDM 120 pass through branch line optical fibers 101-A-1 to 101-A-NA and 101-B-1 to 101-B-NB, each of which is connected to the individual ONU, via an optical splitter 150 (which functions as an optical coupler for the upstream signals) to be sent to the ONUs. Light distributed omni-directionally by the optical splitter arrives the entire ONUs connected to the optical splitter no matter whether they are under control of OLT-A or OLT-B. Accordingly, the ONUs have their own wavelength block filters 110-A-1 to 110-A-NA and 110-B-1 to 110-B-NB therein to identify the signals from the OLT to which they belong. The wavelength block filter is designed to screen light having wavelengths that the filter does not receive so that unnecessary light is not mixed at an optical receiver (not shown herein) located behind the wavelength block filter. A communication path 130-A from the OLT-A to the external and a communication path 130-B from the OLT-B to the external are a line used for connecting to, for example, a local IP network that is an upper network of an optical access line, and these may employ Ethernet (registered trademark), SONET/SDH, and the like as one line type. The type of line and communication protocol between the OLTs and the upper network are not particularly restricted in the present invention. Lines 120-A-1 to 120-A-NA and 120-B-1 to 120-B-NB, which are located downstream of the ONUs, are considered to be connected to LANs of a building or home. For this case, Ethernet or telephone line is primarily considered to be used as the line. Of course, the type of line and communication protocol is not particularly restricted herein, either.

A mode in which the optic fiber 100 is shared by further plural OLTs is considered. The description has been made using the OLT-A and the OLT-B in this exemplary embodiment. Even though the number of OLTs connected, that is, the number of PONs sharing the optical fiber 100, increases, it may be similarly applied to the present invention without losing the features of the present invention. For this case, OLT connection optical fibers 112 and 113 are used for connection with other OLTs. Further, branch line optical fibers 102 and 103 are used to add or move ONUs to be managed by the above-mentioned new OLT or the ONUs to be managed by the OLT-A or OLT-B.

Figure 2:
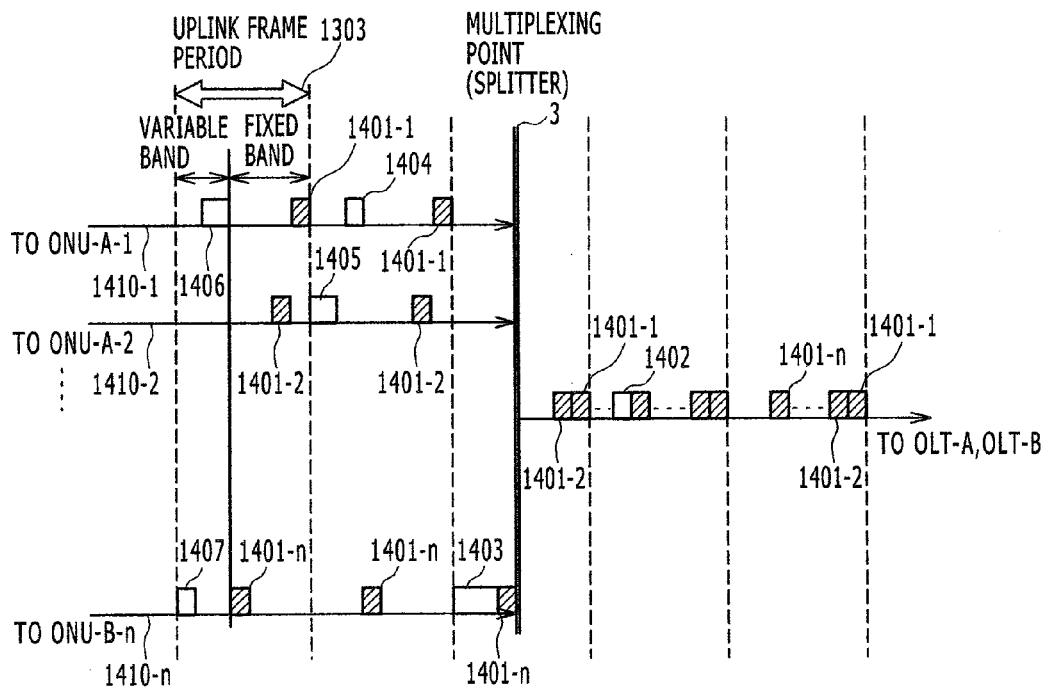
FIG. 2 is a view illustrating an upstream communication control method using a time-division multiplexing method that is required to operate the system shown in FIG. 1.

FIG. 2 depicts an upstream communication control method using a time division multiplexing method, which is necessary to operate the system shown in FIG. 1. In the system shown in FIG. 1, it is impossible for each OLT on the receiving side to identify the signals transmitted from the ONUs under its control by the wavelength because all of the ONUs use the same wavelength with respect to the upstream signals from the ONUs. The conventional PON refers to the transmission/receipt timing by a DBA function in response to a communication bandwidth request from the ONU under its control to identify the ONU, which is the transmission source, from signals having the same wavelength. The time division multiplexing (TDM) method is also used herein to extract the signal from the individual ONU. The OLT has managed only the communication situation with the ONU under its control when allocating a communication time to an individual ONU because the conventional PON individually existed without sharing the optical fiber. Therefore, it is possible in this system for an OLT to avoid the upstream communication time used by the other OLTs so as to prevent overlapping of signals when the OLT performs a bandwidth control.

FIG. 2 is a view illustrating a frame multiplexing method over an optical fiber upon upstream frame transmission from an ONU2 to an OLT1. This shows a situation in which a frame is transmitted from the left side of FIG. 2 to the OLT 1 on the right side of FIG. 2. Further, FIG. 2 shows an example of an arrangement situation for a frame whose transmission time is late from the ONU 2 toward the left side, wherein the right side of FIG. 2 shows the earliest data transmitted. The dotted line indicates a basic frame period (for example, 125 microseconds).

The frames transmitted from the ONU 2's respectively are multiplexed to a single optical fiber when passing through the splitter 3. In the drawing, 1401-1 to 1401-$n$ refer to the transmission location and the size of fixed bandwidth communication data transmitted from the ONU2#1 to ONU2#$n$, respectively. The data 1401-1 to n, which have been distributed over the plural optical fibers before passing through the splitter, are multiplexed after having passed through the splitter. The frames 1402 to 1407 refer to variable bandwidth data transmitted from the ONU 2's. The variable bandwidth data are inserted not to overlap the fixed bandwidth data upon multiplexing by a DBA mechanism.

There is an associated operation that is necessary between OLTs to enable the optical fiber 100 to be shared as described above. Further thereto, there are required (1) a function of synchronizing clocks between the OLTs, (2) a function of sharing a use situation of upstream bandwidths between the OLTs, and (3) a function of cooperating with the DBA control.

There are a method of supplying a reference clock, which is common with respect to the entire systems, from the outside of the OLT, and a method of supplying a reference clock by a representative OLT in order to achieve function (1). Also, there are a method of providing a common database at the outside so that the entire OLTs may refer to it and a method of providing each OLT with an individual database to let the bandwidth use situation notified between the OLTs in order to achieve functions (2) and (3).

Figure 3:
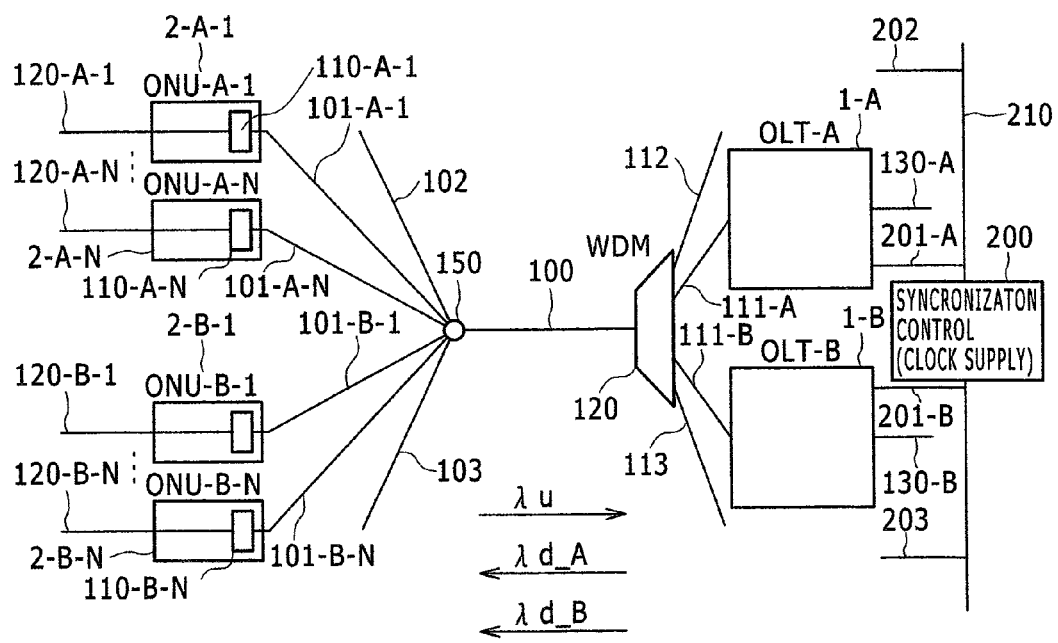
FIG. 3 is a view illustrating a method of synchronizing operation clocks of an OLT by providing a clock control unit outside the system shown in FIG. 1.

Below, clock synchronization will be described. FIG. 3 is a view illustrating a method of synchronizing an operation clock of an OLT by providing a synchronization control unit for clock synchronization outside the system shown in FIG. 1. The synchronization control unit 200 is provided behind the OLTs and the OLTs are connected to the synchronization control unit 200 through lines 201-A, 201-B, 202, 203, and 210 for clock supply. A clock generating unit 830 (refer to FIG. 6) is included in the synchronization control unit 200. A synchronization signal processing unit 670 (refer to FIGS. 5A and 5B) is included in the OLT. The synchronization signal processing unit 670 synchronizes a clock given by a signal from the clock generating unit 830 and performs a signal process in the PON section according to the extracted clock.

Plural supply methods are considered for clocks to be supplied from the synchronization control unit 200 to an OLT with required accuracy. The fastest clock among the clocks in the PON section should be used to perform synchronization within accuracy of 1 bit between the plural systems in order to improve the communication efficiency in the PON section. Practicably, it is preferable to perform an operation with the clock that corresponds to the least common multiple of the clocks of each PON system. When PON interfaces are used in the systems sharing the optical fiber wherein the clock speed of one PON interface corresponds to an integer multiple of that of another one, for example, like when any one PON interface has the clock speed of 10 Gbps and another PON interface has the clock speed of 2.5 Gbps (corresponding to a case of G-PON), the PON interface having the fastest clock speed is used among the disposed PON interfaces. It is possible to make upstream and downstream transmission timing of a low-speed clock consistent to that of a high-speed clock by matching the clock speed to the high-speed side. This enables controlling the timing of variation in optical signals with respect to all of the PON interfaces to be disposed. On the contrary, matching the clock speed to the low-speed side may not detect the timing of variation in some optical signals in the PON interfaces which operate at a high-speed clock. Accordingly, density of data that may be transferred is correspondingly lowered.

On the contrary, moreover, it is also practically possible to notify the clock that is sub-sampled at a smaller bit rate than the bit rate in the PON section (for example, by 1/n) when a long guard time under the start of the upstream frame transmission is occurring while there is room in accordance to the upstream band availability of the PON section. This method may be used, for example, in a case where high bit rate PON interfaces are disposed. Because of having a high transmission speed, this method may transmit a relatively sufficient amount of data at a TDM Access (TDMA) guard time. Setting the guard bit broadly has the following merits. For example, in case of being transmitted by the TDMA signals, fast data is transmitted from each ONU with burst characteristics, however, it is difficult to clearly establish synchronization of the optical signal and frame at the optical termination, which is on the OLT side. Because data is at high-speed, the noises detected by a photo-detector are expanded, and problems occur in terms of technologies and costs to detect the signal patterns at such a speed in order to be capable of following the high-speed bit rate to extract the data. For example, it is possible to be co-existent at the lower-speed side than the optical signal rate using an existing photo-detector by selecting a clock corresponding to the greatest common divisor of operation clocks of disposed PON interfaces. For example, it has been required in the existing G-PON to catch a relatively short-term signal (within the receipt of restricted bit number) when receiving an upstream frame at the OLT side. Such restriction in a bit number is difficult and vendors owning technologies that may be realized are limited, especially taking into consideration operation speed of optical parts. Therefore, current recommendations (ITU-T Recommendation G. 984. 3, "Gigabit-capable Passive Optical Networks (GPON)=Transmission convergence layer specification") mitigate conditions, so that frame capturing time may be adapted to be lengthened upon startup of ONUs. As such, it may lead to merits such as reduction in costs of the photo-detector and realize stable operations to expand the guard bits while considering the limitations of performance of a part which receives optical signals, that is, optical devices and SERDES (SERializer DESerializer). As mentioned above, it is natural to depend on objects of system establishment either to supply high-speed clocks or low-speed clocks.

Figure 4:
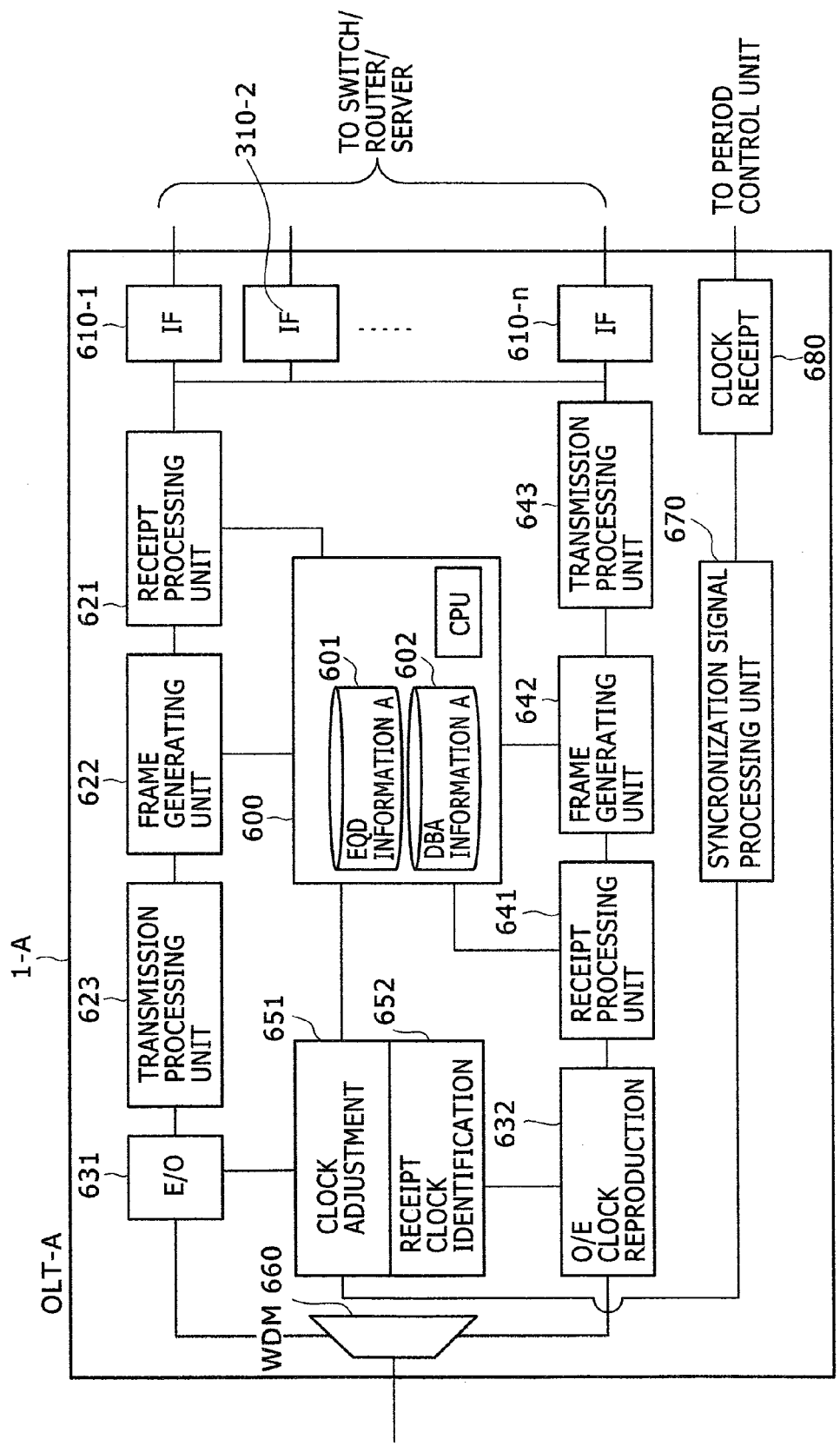
FIG. 4 is a view illustrating a block construction of an OLT-A (1-A) of the system shown in FIG. 3.

Further, although not relating directly to the clock synchronization itself, a reference clock for transmitting and receiving the upstream and downstream frames (125 microseconds period, i.e. 8 KHz clock in G-PON) needs to be supplied to each PON system together with the clock signal in order to perform the frame process as described above. This will be described in association with the control of DBA to be described later. FIG. 4 depicts a block diagram of an OLT-A (1-A) in the system shown in FIG. 3. The OLT-A (1-A) has an interface with an optical fiber 111-A at the PON section side (Access Network Interface (ANI) side). WDM 660 plays a role as the interface herein. The WDM 660 is used to separate the wavelengths of the upstream signal and the downstream signal, and there is separately prepared another WDM 120 to connect between OLTs in FIGS. 5A and 5B. Ethernet (registered trademark), 10 Gbps Ethernet (registered trademark), TDM interfaces, whose representative example includes T1 and E1, and the like may be used as an interface 610 at the carrier network side (Service Node Interface (SNI) side) of the OLT-A (1-A).

The process of downstream signals of the OLT-A (1-A) has the following flow, for example, when the Ethernet (registered trademark) is used as the interface. First of all, if a signal is inputted to interfaces 610-1 to 610-*n*, the inputted signal performs a synchronization process in the interface 610 to terminate the protocol. A receipt processing unit 621 determines the destination of the downstream frame in the PON section on the basis of the head information of a received downstream frame. That is, it is determined whether the destination information is located before a specific ONU or the plural ONUs, or the destination is such that information should be processed by OLT termination (that should be transferred to CPU included in a PON control unit of the OLT). Further, the receiving processing unit 621, if necessary, performs conversion, provision, and deletion of address information in response to the type of destination information or receiving data. Here, the destination information includes logic path information, such as VLAN tags or MPLS labels, as well as the routing information of MAC and IP beginning. The information that should be transferred to the CPU is transmitted to the PON control unit 600 and the data to be transferred to the ONU is transmitted to the downstream frame generating unit 622. The downstream frame generating unit 622 makes a frame for downstream transmission based on the frame received from the receipt processing unit 621 and the information from the PON control unit 600. The information from the PON control unit 600 includes DBA information to be notified to the ONU and control information for performing control/management in the PON section (for example, Physical Layer Operations, Administration and Management (PLOAM) messages and the like in G. 984.3). The control information is generally inserted into the header of the downstream frame, however, may be stored in the payload of the frame in a case where the ONU may be recognized with respect to a special usage such as a message unique to a vendor (frame format is not limited in the present invention). A transmission processing unit 623 buffers the frame generated by the downstream frame generating unit 622, and reads it according to the priority of frame information, conditions of the destination ONU, and processing performance. And, an E/O converting unit 631 converts the read result into an optical signal, and transmits the converted result according to the transmission clock.

In connection with the upstream signals, the following steps are operated. When an uplink wavelength signal separated by the WDM 660 is received by an O/E converting unit 632, serial data is reproduced based on the received signal. The transmission clock of the upstream signal is extracted based on the reproduced signal. The receiving data is serial/parallel converted according to the reproduced clock, and then frame synchronization is performed with respect to the upstream frame. At this time, the reproduced clock is received at the timing designated upon transmission of the downstream frame with respect to the ONU before the upstream frame is received by the OLT-A (1-A). The designated timing is retained in DBA information A in the PON control unit 600 of the OLT-A (1-A) until the upstream frame is received to identify whether the upstream frame is received at the right timing upon receipt. This is done by comparing and referring to the received clock information and DBA information 602 with respect to the receiving clock identifying unit 652. It is very important that the reference distance measurement is within the ranging upon startup of the ONU for the phase surveillance of the upstream frame. In ranging, the distance of the PON section (round trip communication time in the PON section) is measured on a per-one bit basis. Therefore, when different-speed PONs are disposed, the one-bit difference causes a time difference (difference in receipt timing) of ten times in case of 1 Gbps to 10 Gbps and four times in case of 2.5 Gbps to 10 Gbps. Accordingly, the different-speed disposed systems require a mechanism of improving accuracy between the reference distance and a mechanism of suppressing the phase variation under operation at the early distance measuring stage (that is, ranging). This ranging reference location (measurement start location) is determined in processing an electrical signal in the OLT.

Figure 8:
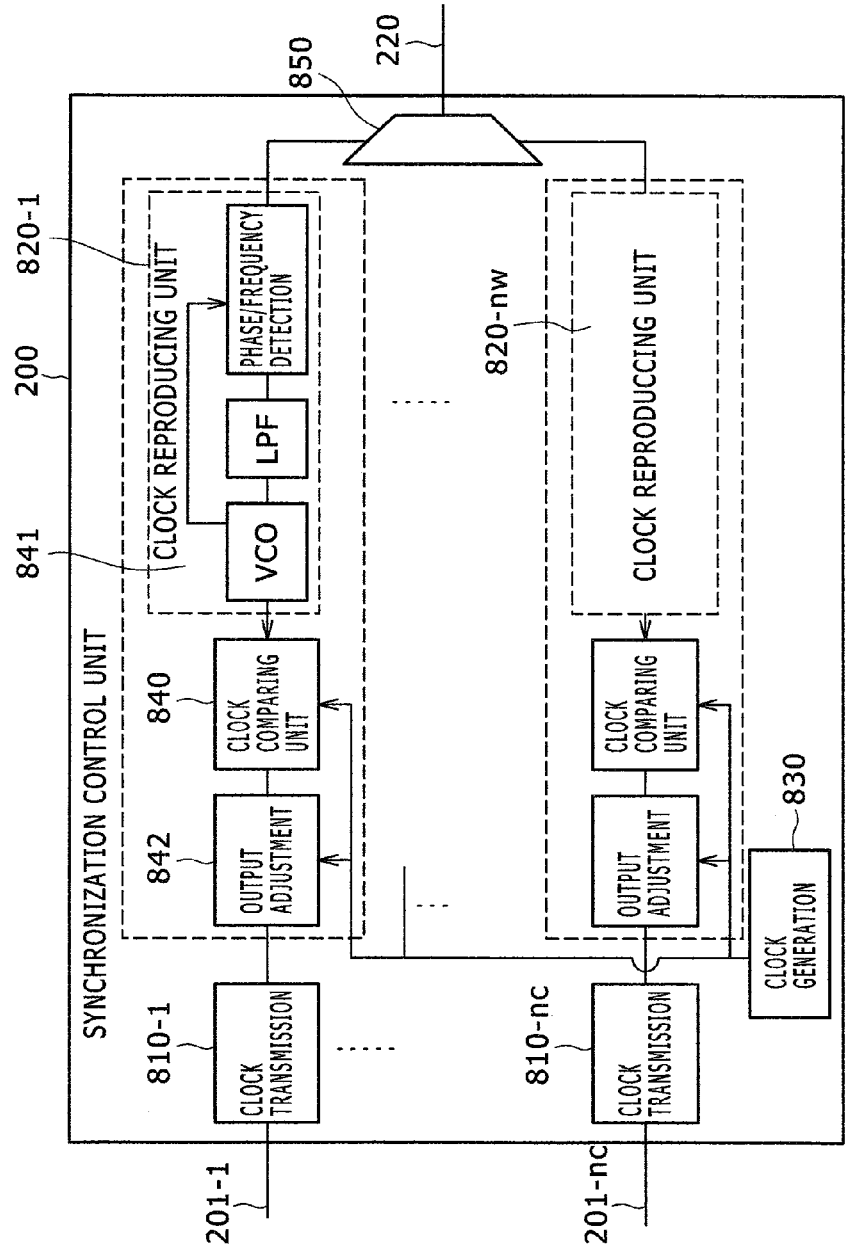
FIG. 8 is a view illustrating a construction of the synchronization control unit 200 which further includes a feedback function for clock adjustment.

From a point of view of when plural optical modules (that is, plural OLTs) are provided, each of the plural optical modules has a slight difference in processing time upon E/O conversion, strictly speaking, it is preferable to make the optical modules uniformed. However, it is difficult to make this environment when OLTs are additively disposed, and therefore, the following descriptions will be made assuming that each optical module is individually provided to each OLT. Furthermore, it is necessary to make the ranging reference points consistent in order to synchronize the clocks of the optical signals as much as possible. Even in a case where downstream wavelengths are different from each other, it is preferable to make the start timing of the ranging consistent in each OLT to perform an exact ranging. Further, stricter adjustment is required when different-speed PONs are disposed. The treatment of this case will be described later (FIG. 8).

At this point, when the timing is different from the expected one, EqD information A601 retained in the PON control unit 600 is updated and the EqD information for each ONU is inserted into the header of the downstream frame to correct the logical distance. The receipt processing unit 641 identifies whether it is data that should be transmitted to the SNI or the PON control unit 600 on the basis of the header information of the receiving frame like in the process of the downstream frame. Besides, addition, conversion, and deletion of information on the destination are performed according to the setup of path information on the basis of the header information of the receiving frame. The upstream frame generating unit 642 generates the header and payload of the frame to be transmitted to the SNI from the information of the PON control unit 600 and the receipt processing unit 641, and transmits them to the transmission processing unit 643. The transmission processing unit 643 buffers the generated frame, reads it according to the priority of the frame information, the condition of the destination ONU, and processing performance, and transmits the data through the SNI-sided interface 610.

The interface 680 with the synchronization control unit 200 is an interface to receive a clock that is generated and supplied by the synchronization control unit 200. The clock is sent to the synchronization signal processing unit 670, which in turn generates timing based on the received clock. The clock obtainable herein is transferred to the clock adjusting unit 651, which in turn transmits a downstream signal according to the clock. The clock adjusting unit 651 has a function of managing the difference in clock phase between the downstream signal and the upstream signal. The conventional exchanger constituting a PON and a telephony network has employed a configuration of receiving a reference clock from a base station of a carrier through the clock distribution network. At this time, the received clock is stored in the device at a PLL (Phase Locked Loop) to be used as a device clock. Further, only the clock generated by a crystal oscillator in the device may be operated. In a case where plural PONs are disposed, use of external clocks or clock transfer (FIG. 10) from the reference device is inevitable for cooperation between devices. In the conventional method, occurrence of the device synchronization has been sufficient at a millisecond level, for example, in the telephone network, however, phase synchronization of clocks is important for DBA cooperation or ranging to be described later, which requires synchronization of within about 1 bit (sub-microseconds) in case of PONs. Functions and effects necessary for this will be described below (FIG. 8).

In addition, the configuration of the synchronization control unit shown in FIG. 3 is equal to the configuration of the device shown in FIG. 8, which will be described below, when the feedback function is omitted. The system shown in FIG. 3, which has been described so far, is necessary when the same optical fiber is shared by plural PON systems which have a common laser wavelength used in at least one of the upstream communication and the downstream communication. A common clock is provided to all of the disposed systems with respect to the OLTs, which are devices located at a side of controlling the upstream and downstream data transmission timing in the PON sector in order to avoid overlapping of signals in the PON sector. It can be possible to externally supply a common clock with respect to the overall OLTs by providing the synchronization control unit 200. Use of the supplying clock as reference information for adjusting the operation timing between the OLTs may control the DBA processing period and frame transmission and receipt timing in both directions of the PON section.

Even in a case where downstream signals have different wavelengths, it is necessary to exactly adjust the reference point of the ranging set in the OLT, and the clock synchronization and the above-mentioned 8 kHz timing synchronization are necessary to measure the communication distance during the ranging as well as to avoid overlapping between optical signals upon transmission of the frame.

Figure 5A:
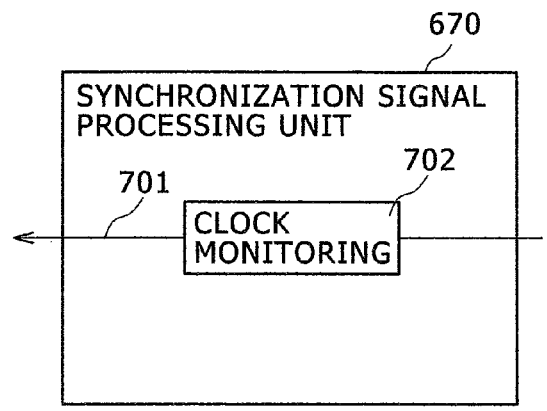
FIGS. 5A and 5B are block diagrams illustrating a synchronization signal processing unit.
Figure 5B:
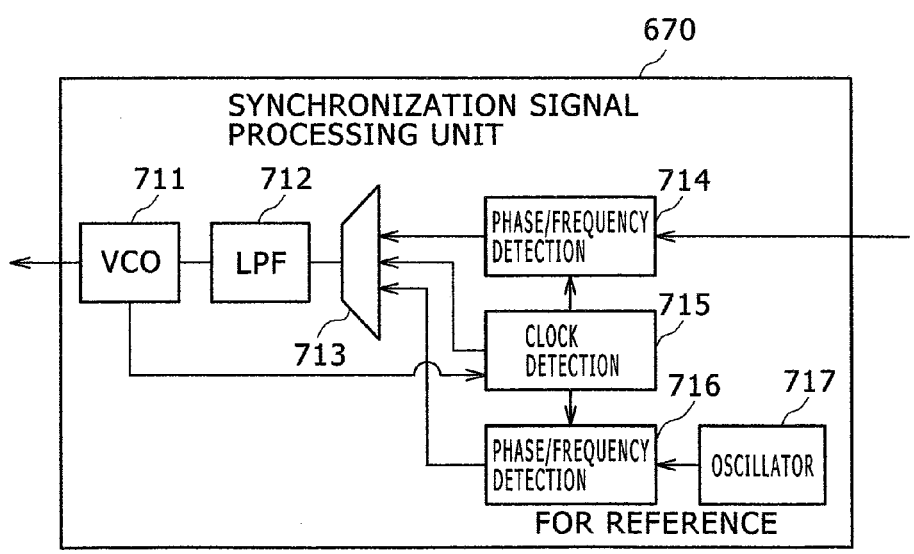

FIGS. 5A and 5B are block diagrams of the synchronization signal processing unit 670 included in the OLT 1 shown in FIG. 4. FIG. 5A is a block diagram when a clock from the synchronization control unit 200 is used as the operation clock of the OLT without providing any reference oscillator to the inside of the OLT, and FIG. 5B is a block diagram when each oscillator is provided to the inside of each OLT so that clocks for controlling the PON section are acquired by receiving a clock signal from the synchronization control unit 200 and mapping the received clock signal with the clock in the device.

In FIG. 5A, a clock signal is received from the synchronization control unit 200 by the clock receiving unit 680 that functions as a clock receiving interface and the received clock signal is transmitted to the OLT 1 as it is over a line 701. In this case, there is provided a single clock oscillator for the entire system, and this may achieve synchronization for the entire system. Accordingly, a stable operation may be done without any shift in clocks between the OLTs. It may be possible to provide a function 702 of monitoring the receiving clocks in the block.

FIG. 5B depicts a constructional example of the synchronization signal processing unit 670 in a case where each clock oscillator is provided in the inside of each OLT. The synchronization signal processing unit 670 employs a oscillator 717, a phase/frequency detecting unit 716, a Low Pass Filter (LPF) 712, and a Voltage Controlled Oscillator (VCO) 711 to generate the OLT control clock. The clock signal from the oscillator 717 passes through the phase/frequency detecting unit 716, the LPF 712, and the VCO 711 and transmits to the OLT. Meanwhile, the clock signal from the synchronization control unit 200 is sent from the clock receiving unit 680 to the phase/frequency detecting unit 716. This signal passes through the LPF 712 and the VCO 711, similar to the signal from the oscillator 717, and transmits to the OLT. The clock receiving unit 680 includes a clock detector 715 to synchronize the clocks from these two systems (synchronize the clock inside the OLT with the clock from the synchronization control unit 200). The clock detector 715 has a function of detecting the clock timing of both clocks to adjust it so that the internal clock is synchronized with the reference frequency. Further, there is an effect of stabilizing the clock supplied in the OLT by performing a loop-back on the individual clock from these two systems from the VCO 711 to the clock detector 715. This operation may be realized by providing a dividing circuit and a comparison circuit in the clock detector 715. Further, the operation frequency may be fixed by providing a clock detection circuit in the clock detector 715, and this may maintain the operation with some accuracy until the clocks, which may have been lost for a period of time, are recovered as well as previous clock timing upon startup.

Figure 6:
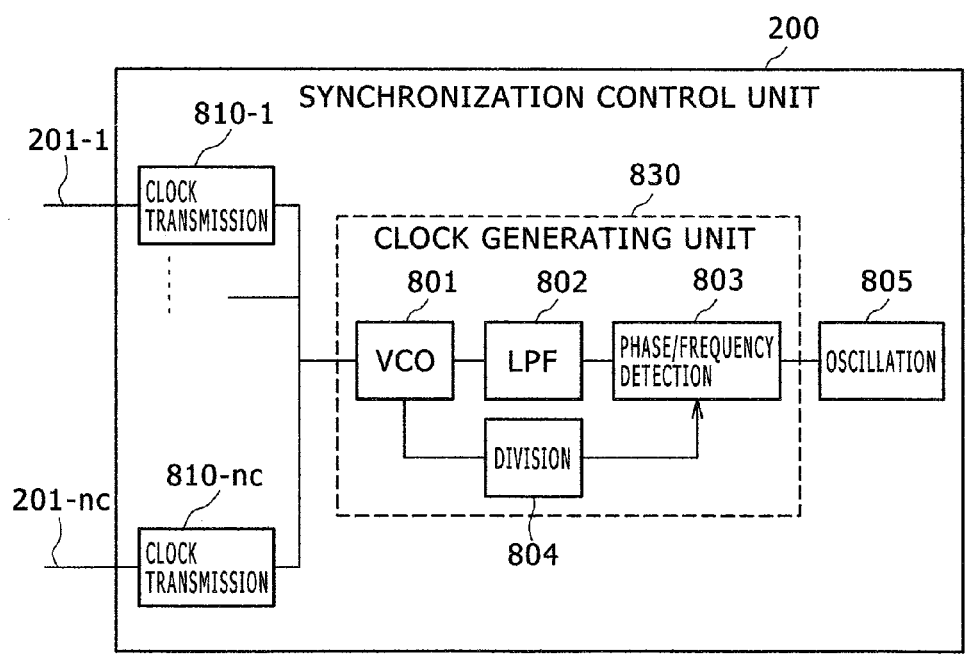
FIG. 6 is a block diagram illustrating a synchronization control unit 200.

FIG. 6 is a functional block diagram illustrating a function of the synchronization control unit 200 shown in FIG. 3. A clock signal generated by the oscillator 805 is outputted to the clock generating unit 830. A general PLL circuit construction is described herein as an example of the clock generating unit 830. The clock generating unit 830 includes a phase/frequency detecting unit 803, an LPF 802, a VCO 801, and a dividing circuit 804. A clock signal generated by the clock generating unit 830 passes through the phase/frequency detecting unit 803, the LPF 802, and the VCO 801 and is sent to the clock transmitting units 810-1 to 810-n. The signal which passes through the VCO 801 and is then sent to the clock transmitting unit 810 is also sent to the dividing unit 804 at the same time. The dividing circuit converts the inputted clock by the factor of 1/n and transmits the result to the phase and the phase/frequency detecting unit 803 as a comparative clock. The phase/frequency detecting unit 803 compares the clock from the oscillator 805 with the clock from the dividing circuit 804 to synchronize the clock for transmission having a period of 1/n, which is generated by the dividing circuit 804, with a stable clock of the stable oscillator 805. The stable clock obtained is supplied from the clock transmitting unit 810 to an external device.

Figure 7:
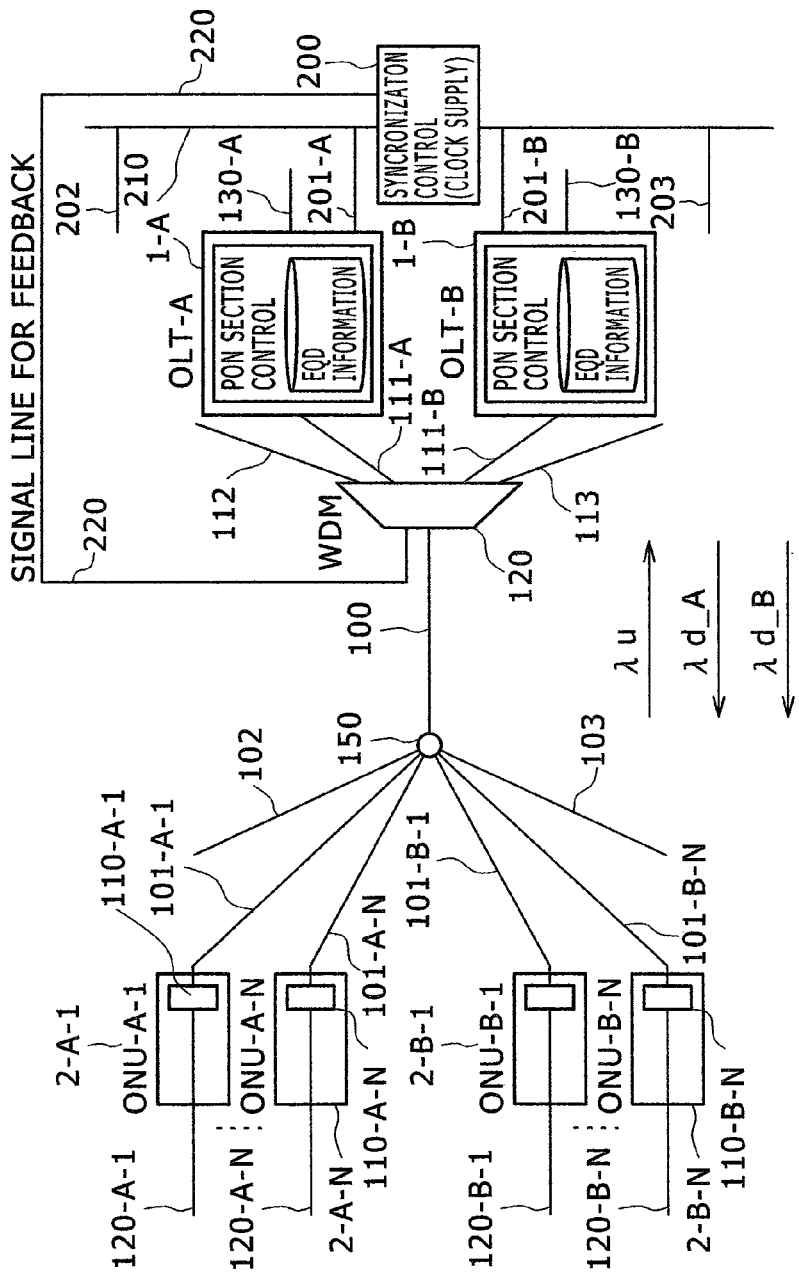
FIG. 7 is a view illustrating a system construction when the system shown in FIG. 3 has been expanded to strictly adjust the clock timing.

FIG. 7 depicts a system construction when the system shown in FIG. 3 has been further expanded so that the timing is further strictly adjusted. If the PON system sharing the optical fiber 100 has a bit rate of 1 Gbps to a few Gbps of the conventional GE-PON or G-PON, about 1 nanosecond is required to make the clock synchronized with an accuracy of 1 bit, and if the PON system is IEEE 802.3av (10 Gbps E-PON) or 10 Gbps PON of ITU-T, which is currently discussed to be the standard, control is needed to be performed with an accuracy of more than about 100 picoseconds with respect to the clock synchronization at the bit level. In order to control under high accuracy, a structure that performs fine adjustment while viewing the state of the transmitted clock as well as transmission of the clock from the synchronization control unit 200 to all of the ONUs is required. FIG. 7 illustrates an aspect in which a signal line 220 for feedback is added as a line for clock monitoring to perform fine adjustment. This function is required to use the system described above with reference to FIG. 3 in a case where the receiving timing of the uplink signal as well as the downstream signal desire to be strictly adjusted. For example, all of the PON-IFs sharing the optical fiber are operated at the same clock when the upstream bands desire to be maximally utilized. As seen from the OLT, it is required to instruct the transmission timing within an accuracy of 1 bit by an optical signal with respect to all of the ONUs. At this time, even though clock synchronization is needed at the level of 1 ns, clock control is generally difficult to perform with such high accuracy due to inconsistency of signal processing time at the PON-IF or expansion and contraction of the optical fiber when DBA notification is conducted from the OLT to the ONU on the basis of the conventional ranging function. Most of all, it may be said that it is actually impossible to make the clocks comply with the high-speed clock with respect to the operation clock between the OLTs (PON system) because the processing time is different for each and every OLT. Accordingly, fast clock synchronization may be achieved by actually monitoring the communication clock of each PON to correct the errors with the feedback circuit as introduced in the exemplary embodiment.

As a consequence, the synchronization control unit 200 is changed to have the feedback function as well as the function of clock generation and notification. FIG. 8 depicts a construction of the synchronization control unit 200 which further includes a feedback function. The clock signal generated by the clock generating unit 830 is transmitted from nc interfaces which are interfaces for clock signals (810-1 to 810-*nc*) to nc OLTs. The clock is transmitted through lines 201-1 to 201-*nc*, each of which connects each OLT to the synchronization control unit 200. Meanwhile, the clock transmitted in the PON section from the OLT-A (1-A), the OLT-B (1-B), and the other OLTs, is returned to the synchronization control unit 200 by the lines 220 for feedback at the time of having passed the WDM 120. The feedback signal inputted from the lines 220 shown in FIG. 8, which has plural downstream wavelengths, is split by the WDM 850 for each and every wavelength, and then O/E converted with respect to the clock generating units 820-1 to 820-*nw* so that the serial data is extracted. The operation for stabilizing the clock of the clock reproduction unit 820 is identical to that described above with reference to FIGS. 5 and 6, and therefore repetitive descriptions will be omitted. The clock signal extracted from the serial data of the clock reproduction unit 820 is transmitted to the clock comparing unit 840. The clock comparing unit 840 detects the difference between the transmitted clock signal and the reference clock, and the clock correcting unit 842 determines the amount of correction for each and every clock lines 810-1 to 810-*nc*. The corrected value obtained therein is notified from the clock correcting unit 842 to each of the interfaces 810-1 to 810-*nc*, and the correction-processed clock is outputted to each clock line 201 by each interface, respectively. In a case where control is conducted with high accuracy, there is high possibility that each clock transmitted from each OLT in the PON section slightly varies its timing when the clock is unilaterally transmitted from the synchronization control unit 200. This is why it is difficult to completely synchronize the signal from each device due to the delay in processing of each block in the OLT or difference in clock transmission time in the OLT circuit, which occurs when different types of PONs are disposed. Utilization of the feedback mechanism shown in the exemplary embodiment may identify the degree of a shift in the signals actually transmitted in the PON section, so that influence-corrected signal may be transmitted. Accordingly, it may be possible to finely adjust the transmitted clock.

The shift correction completes an important role in association with the ranging process. Because the reference point of the ranging is determined by each OLT, however, the reference point of the ranging at the startup time of the OLT is thereafter treated as a reference point under operation, time (timing) when a ranging request is transmitted from each OLT to the ONU under the control is required to be as accurate as possible for a stable operation. Further, the amount of variation in transmission delay due to expansion and/or contraction of the optical fiber needs to be assumed on the order of a few nanoseconds. When there is the shift of 1 bit in the reference point, the shift of the round trip time observed when the PONs having the same bit rate are disposed is only on the order of a few bits. Upon transmission of upstream frame, a guard time is placed in the upstream signal taking into consideration a shift of the response timing from the ONU and time necessary for startup of a laser for transmitting an upstream signal (a few to a few tens of bits as a current bit value), so that this variation may be absorbed. Of course, in case of high bit rate, time interval per band control unit (1 bit) is minute, and therefore, fine control is required using the feedback line for control with the same bit numbers.

Clock adjustment upon initiation of the ranging is necessary, in particular, when PONs having different speeds (for example, PONs whose communication speeds are 10 Gbps and 2.5 Gbps, respectively) are disposed. The number of bits that may be transmitted at 10 Gbps in the unit time is four times of 2.5 Gbps. Accordingly, in a case where the clock synchronization is conducted with accuracy at the low bit rate side, a time shift corresponding to one bit of clock has an influence of 4 bits when being recalculated as the clock at the high speed side. Generally, even though the guard band is placed considering the variation in the reference point of the ranging (that is, an error of the set EqD), more guard bands than necessary should be prepared to transmit high bit rate signals, and this may lead to lowering band availability.

In order to achieve synchronization with the clock at the high speed side, the PONs having different speeds are connected to avoid the above problems. Hereinafter, specific examples are described with respect to a case of G-PON. High speed clock is mixed at the location where low speed clock is shifted to conduct transmission and receipt of data in a case where PONs having different speeds coexist. That is, the bit location representing the data (such as boundary of 8 KHz frame) should be adjusted by shifting the high-speed clock (in case of 10 Gbps and 2.5 Gbps) by a bit number of four times. However, it reduces the difference between transmission and receipt phases of low-speed bit rate upon downstream frame transmission to send high-speed clocks to PONs operating at low speed to generate 2.5 Gbp clock phase so that the clocks primarily synchronized at a high-speed bit level become ¼ times, thus making it possible to determine the ranging reference location with good accuracy.

Further, the construction of the synchronization control unit 200 in the system shown in FIG. 6 includes a clock generating unit 830 and interfaces 810-1 to 810-*nc* among the construction blocks shown in FIG. 8, CPU for controlling the clock generating unit 830 and the interfaces 810-1 to 810-*nc*, a memory, and a control interface.

Figure 9:
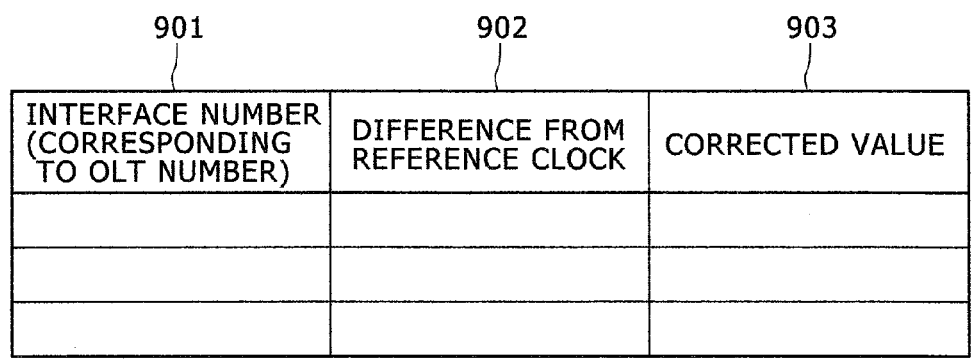
FIG. 9 is a view illustrating a construction example of a table retained in an adjustment information database shown in FIG. 8.

A method may be considered that retains a table in an output adjusting unit shown in FIG. 8 as an information database for adjusting clock phase. FIG. 9 depicts a construction example of a table retained in the adjustment information database shown in FIG. 8. A difference 902 from the reference clock and a corrected value 903 upon transmission with respect to the reference clock, which are calculated for each and every line ID 901 that shows a clock transmission line 810, are retained correspondingly. Since the clock is always fed back, the table may be rewritten whenever the table has any variation. Specifically, when a PLL is used as each OLT with respect to the external clock, an error may occur on the order of one to a few clocks at the time when the optical signal is transmitted. Here, it is preferable to use the clock as it is which is notified from the synchronization control unit to each OLT without the PLL to perform high-bit rate data transmission (see FIG. 5A). In a case where a specific OLT becomes the master to control the clock, it is preferable that the clock is extracted upon transmission of the optical signal in the master OLT and the extracted clock is notified to the other disposed OLTs. The OLTs that have received the clock use the clock without the PLL, as the in-device clock, as it is.

Figure 10:
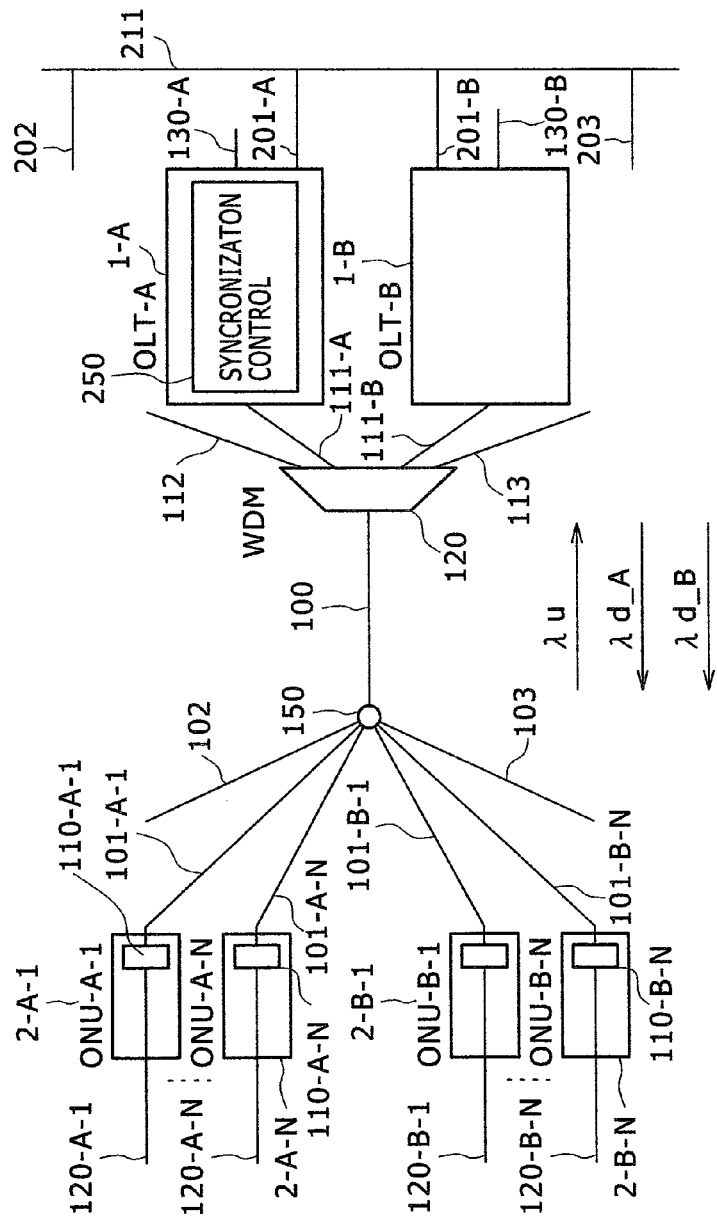
FIG. 10 is a view illustrating a system construction when the synchronization control unit 200 shown in FIGS. 5A and 5B has been provided in a specific OLT (OLT-A (1-A) herein)

FIG. 10 depicts a system construction where the synchronization control unit 200 shown in FIG. 3 is provided in a specific OLT (OLT-A (1-A) herein). Providing the synchronization control unit 200 in the OLT-A enables the entire PON system to be made compact compared to a case where the synchronization control unit 200 is positioned outside the OLT-A. This allows the size of the circuit for controlling the PON system to be reduced, thus making it possible to lower costs. Also, integration of the control function prevents inconsistent efficiency of the transmission process or external noises that may be caused upon communication with external devices, thus making it possible to improve accuracy of control. In particular, this effect may be anticipated in a case where this function is mounted in the OLT which operates at the maximal bit rate among the disposed PONs.

In this case, the function of the synchronization control unit 250 is identical to that provided outside as shown in FIG. 3. The OLT-A (1-A) generates a clock through its own frequency oscillator. The OLT-A (1-A) has a function of transferring its own clock to other OLTs like the synchronization control unit 200 shown in FIG. 3, in addition to a function of communicating clock information with the ONU through the downlink signal. The device construction of the other OLTs besides the OLT-A (1-A) is as shown in FIG. 4.

Figure 11:
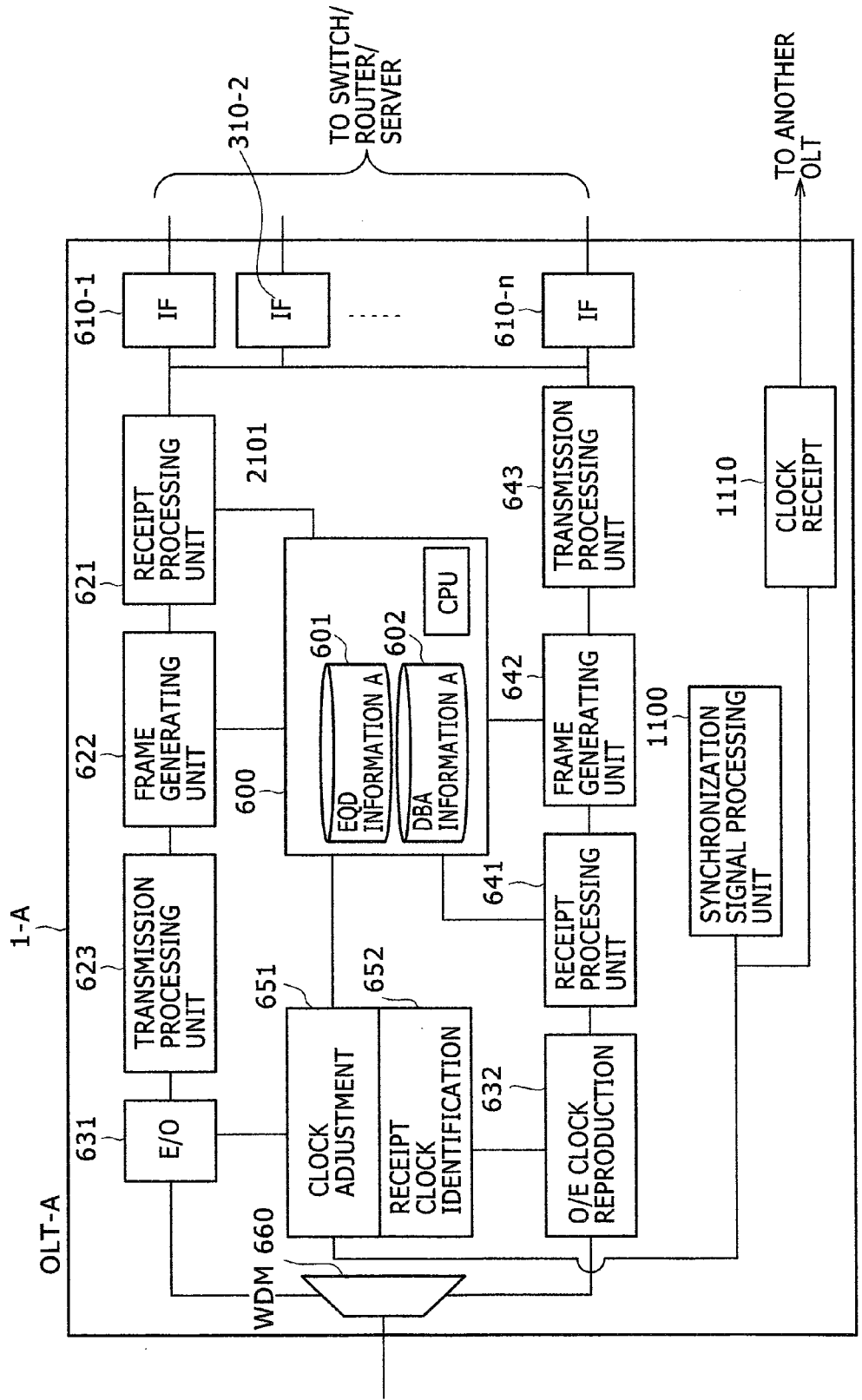
FIG. 11 is a view illustrating a block construction of the OLT-A (1-A) shown in FIG. 10.

FIG. 11 shows a block construction of the OLT-A (1-A) shown in FIG. 10. In this case, the synchronization signal processing unit 670 shown in FIG. 4 is replaced with a synchronization control unit 1100. A clock generating unit 1101 inside the synchronization processing unit 1100 has a function as shown in FIG. 8. A timing generating unit 1102 determines timing information to be notified to other OLTs with respect to the clock received from the clock generating unit 1101 and transmits the determined timing information from the clock signal interface 110. The clock signal is split as much as the number of disposed OLTs. This split point may exist inside the interface unit 1110, or may be implemented as an external connector or splitting circuit (this is merely a slight difference in mounting, and a variation may also be made with respect to FIG. 8).

Figure 12:
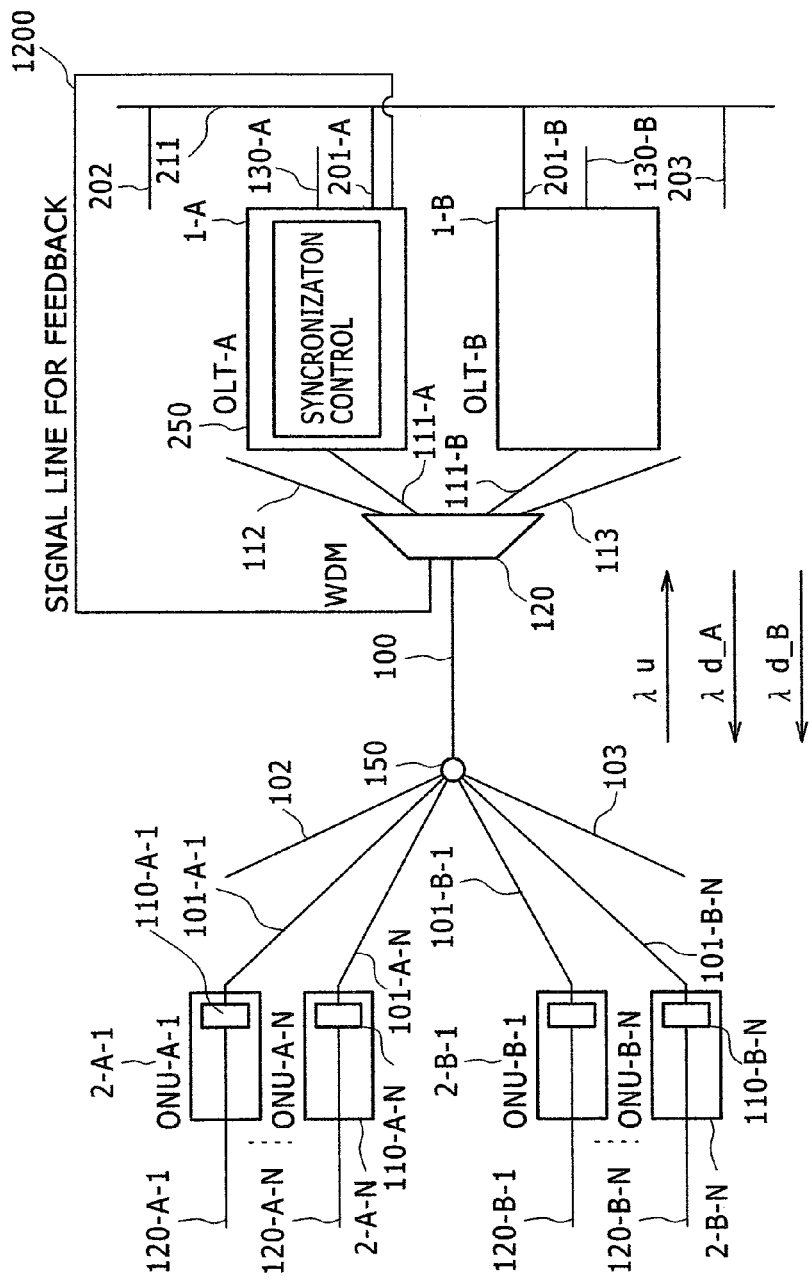
FIG. 12 is a view illustrating a system construction when a feedback line 1200 for clocks is added to the construction shown in FIG. 10.

FIG. 12 is a systemic construction view when a feedback line 1200 of a clock is added to the construction of FIG. 10. The operation of disposed OLTs other than the OLT-A (1-A) is similar to that of the system shown in FIG. 10.

Figure 13:
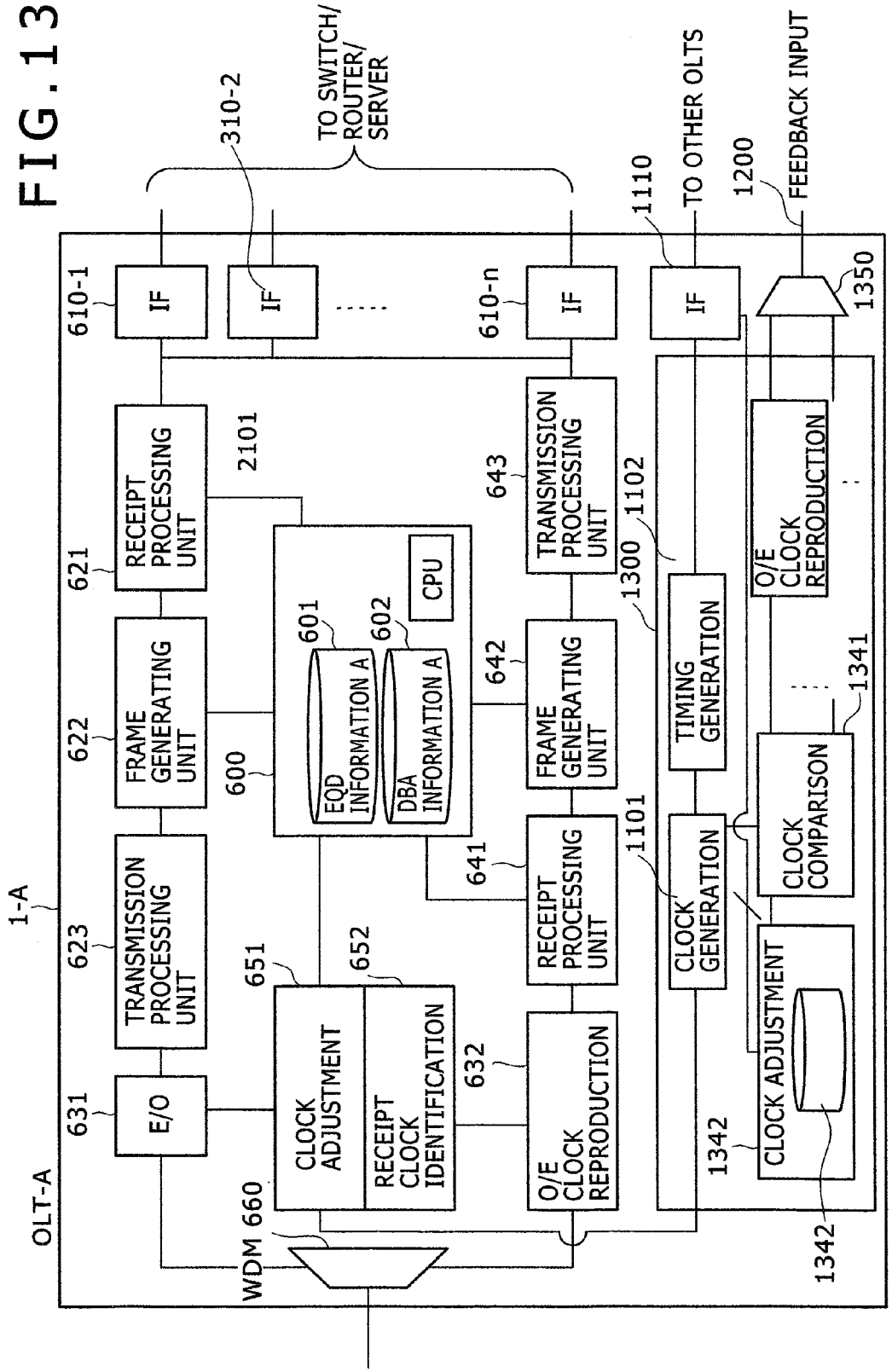
FIG. 13 is a view illustrating a block construction of the OLT-A (1-A) shown in FIG. 12.

FIG. 13 is a block diagram of the OLT-A (1-A) of the system shown in FIG. 12. The function of the synchronization processing unit 1100 is equal to that shown in FIG. 8. That is, the clock signal generated by the clock generating unit 1101 is transmitted from the interface 1110 for clock signal to nc OLTs. Here, the clock is transferred through the lines 201-1 to 201-*nc*, each of which connects each OLT to the synchronization processing unit 1100. Meanwhile, the clocks transmitted in the PON section from the OLT-A (1-A), the OLT-B (1-B), and the other OLTs are returned to the synchronization processing unit 1100 by the line 1200 for feedback at the time of having passed the WDM 120. The feedback signal entered from the line 1200 shown in FIG. 12 includes plural downstream wavelengths, and therefore, the feedback signal is split for each and every wavelength by the WDM 1350 and then O/E converted by the clock extracting units 1320-1 to 1320-*nw*, so that serial data are extracted. The clock signal extracted from the serial data is transmitted from the clock extracting unit 1320 to a clock comparing unit 1341. The clock comparing unit 1341 detects a difference from the reference clock and a clock correcting unit 1342 determines the amount of correction for each and every clock line 1310-1 to 1310-*nc*. The amount of correction (or corrected value) obtained herein is notified from the clock correcting unit 1342 to each interface 1110-1 to 1110-*nc*, and each interface outputs the corrected clock to each clock line 210. Providing the synchronization control unit 200 inside the OLT-A enables the entire PON system to be made compact compared to a case where the synchronization control unit 200 is positioned outside the OLT-A. This allows the size of the circuit for controlling the PON system to be reduced, thus making it possible to lower costs. Also, integration of the control function prevents inconsistent efficiency in the transmission process or external noises that may be caused upon communication with external devices, thus making it possible to improve accuracy of the control. In particular, this effect may be anticipated in a case where this function is mounted in the OLT which operates at the maximal bit rate among the disposed PONs. Further, a basic construction of the clock corrected value database is as shown in FIG. 9.

Clock synchronization between OLTs is a process required to be used for transmission of the downstream signals from the OLT, a case where DBA results are collected in the individual OLT, or a case of collecting information generated as a frame for downstream transmission for final transmission control. The latter digital signal process may be adjusted at a bit buffer (receiving data buffer for clock timing adjustment) provided in the PON-IF of the OLT, and may be implemented through a bus or communication cable that connects between devices without using optical signals.

It is important where a wavelength for downstream signals is shared by disposed PONs during clock synchronization for downstream signals. In this case, the transmission clocks for the overall OLTs need to be unified to effectively multiplex the downstream frame from each OLT so as to effectively utilize the downstream band and to allow the ONU 2 to exactly receive information prior to each ONU 2.

Meanwhile, when the wavelengths for the upstream signals to be used by plural disposed PONs is equal to each other, and the downstream wavelengths are different from each other for each PON, synchronization of the downstream signal is not needed over the optical fiber. This is why it is important herein that overlapping of signals or difference in clock when the uplink signals are multiplexed do not occur, that is, OLTs receive the upstream signals. Clocks returned to the OLTs are considered to be varied from a fact that branch line optical fibers from the splitter to the ONU2 respectively have different installation conditions as well as environments such as expansion and/or contraction of optical fibers or operation temperature of the ONUs (this is associated with stability of wavelengths of the laser, and therefore, optical transmission characteristics may vary as wavelengths are changed, which in turn affects the clocks). It is impossible to completely remove it from the OLT side. Accordingly, it is needed for this case that the OLT 1 should refer to the receiving clock from the ONU 2 to vary the transmitting clock of the downstream signal with respect to the ONU 2. Here, it is sufficient to refer to the result of phase confirmation of the upstream frame under ranging process or operation to obtain the clock information of the upstream signal. Since the phase information extracts the transmission clock timing on a per-bit basis with respect to the timing expected by the OLT, the information may be used not only for EqD correction for ONU 2 but also for minute adjustment of the upstream signal clock using the downstream frame transmission at the OLT side.

Figure 56:
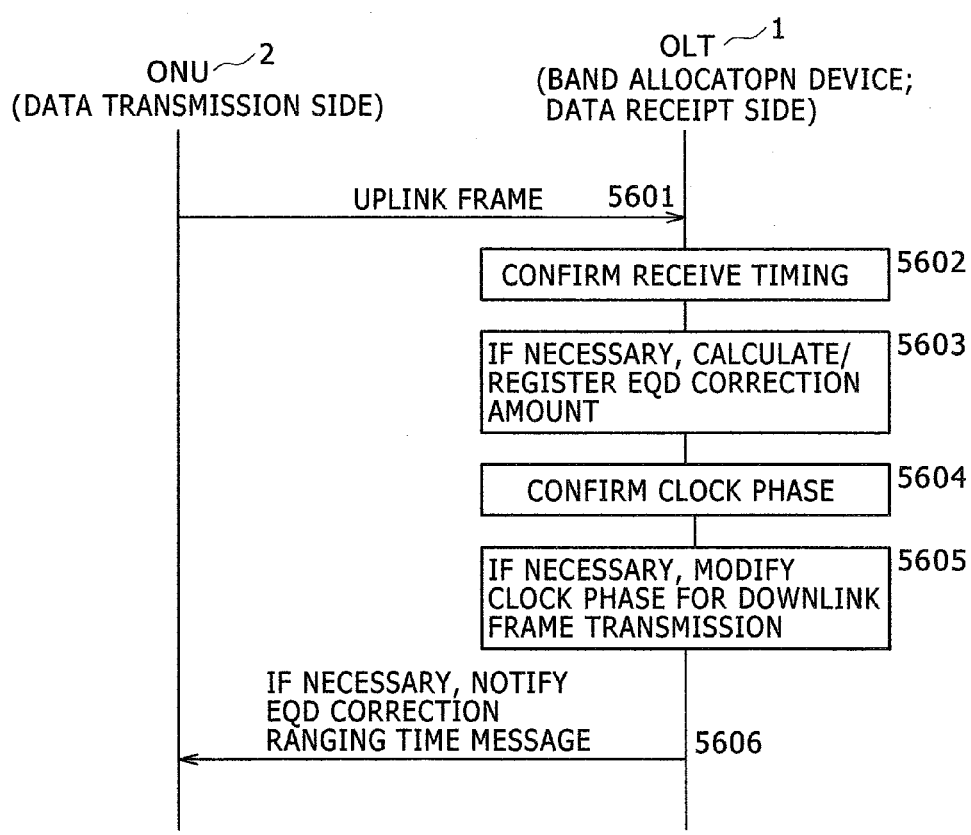
FIG. 56 is a view illustrating a sequence of a transmission/receipt timing correcting process between ONU2s whose upstream transmission timing has been changed due to expansion and/or contraction of branch fibers.

FIG. 56 depicts the above-mentioned operation. FIG. 56 shows an order of a transmission/receipt timing correction process between the OLT 1 and the ONU 2 in which the upstream transmission timing has been varied by expansion and contraction of the branch fiber. If the change of phase is detected by phase confirmation upon receipt 5602 with respect to an upstream signal, the OLT 1 determines whether the phase is within an acceptable range or not. Here, "acceptable range" is not based on a regulation in the conventional PON (8 bits in 1.2 Gbps, or the like), but based on the conditions such as setup of DBA control period in operating the disposed systems or avoidance of signal overlapping between PON interfaces. If necessary, change in EqD setup is transferred to the ONU 2. Also, clock phase is extracted from the upstream frame 5601 that is received at the same time. In a case where the clock of the upstream signal is shifted with respect to the other upstream signal clocks over the optical fiber, clock phase correction 5605 is conducted in addition to EqD correction 5603.

Of course, it is needed to receive the upstream frame in compliance with the timing of DBA processing between OLTs. It is required to make an operation while performing correction in clock phrase or freight arrival timing within any constant acceptable range to meet this condition. The minute adjustment described herein is a necessary function to facilitate this operation. As will be described next, there may be a possibility that all of the ONU 2s under the control of the corresponding OLT are needed to adjust EqD and clock phase in a case where transmission/receipt timing has been varied due to difficulty in terms of DBA control. As a result, there could be considered a case where the EqD needs to be adjusted with respect to all of the disposed systems.

Also, clock synchronization for downstream signal transmission is necessary in a case where the entire downstream communications share the same wavelength in all of the PONs and the entire upstream communications share the same wavelengths, respectively. It is common to prepare a guard time with respect to the upstream signals because the upstream signals become burst signals that serve to achieve synchronization upon receipt for each frame. Clock phase adjustment is conducted for each upstream frame using the guard time. Timing when a frame is received for each frame may be understood at the OLT side. Simultaneously, this may be responded by preparing a memory that retains phase information of the clock shifting the upstream frame from each ONU. For this case, it is difficult for the branch fiber to unify the upstream signal clocks from each of the different ONUs, and it is useful to reduce the guard time as much as possible to be capable of effectively utilizing the band.

Figure 57:
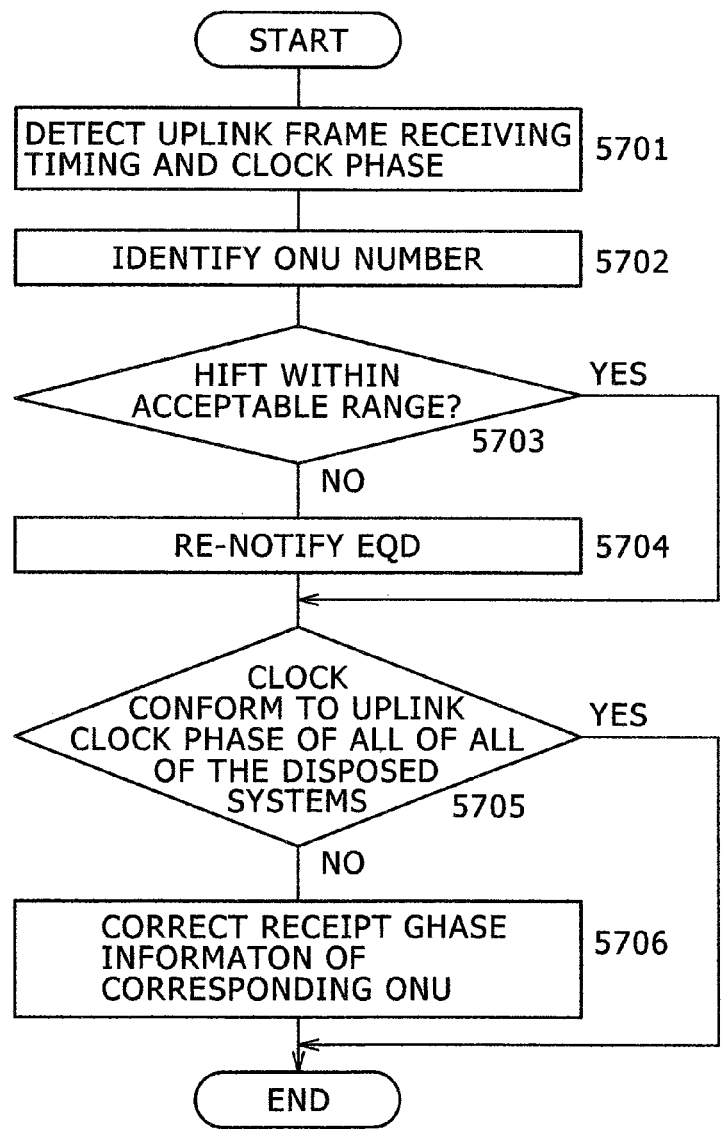
FIG. 57 is a flowchart illustrating a process of an OLT when all of the PONs uses a common wavelength with respect to upstream and downstream.

FIG. 57 is a flowchart illustrating a process in the OLT in a case where the upstream, downstream, and all of the PONs have a common wavelength. Upon receipt of the upstream frame, if the receiving timing and clock phase are detected 5701, an error is detected from expected value of the timing and phase together with ONU identifier included in the frame 5702. The processes 5703 and 5704 for EqD correction are omitted here because their characteristics are the same as those in the existing operations. In a case where the clock phase is shifted, ONU identifier firstly obtained from the upstream frame is combined, and database for receiving clock phase is referred to, so that the receiving clock information of the corresponding ONU is corrected as necessary (if the shift exceeds an acceptable range) 5706.

After clock synchronization is accomplished by the above-mentioned exemplary embodiments, response timing from an individual ONU for an instruction from an OLT is controlled so as not to overlap when a signal passes through the optical fiber 100. The method is different depending on the setup conditions of the DBA period, however, a case where the DBA period of the entire OLTs is set identically will be firstly described as the most basic exemplary embodiment.

In a case where a bandwidth intends to be shared by plural disposed PONs, the most basic method is to make the timing of calculating the DBA period and the assigned amount of DBA bandwidth be identical. That is, adjustment is made between OLTs with respect to a bandwidth shared at a specific time width from a specific time with bandwidth requests from the entire ONUs gathered. Accordingly, timing clock having the same period as the DBA period is generated separately from the clock for bit phase synchronization when the reference clock is supplied, and then supplied to each OLT. By doing so, the length of period responding to the band instruction from the OLT and the timing of the period boundary agree with common DBA processing period setups that are all managed by the OLT side (synchronization control unit 200 or 1100) with respect to the control period of the upstream signal transmitted from the entire ONUs, and therefore, it becomes easy to share the bandwidth assignment information by the entire OLTs, thus leading to easiness in DBA control.

Below, the response time from the entire ONUs as a basic parameter to unify the DBA calculation timing in the entire system will be explained. The conventional single PON system has been used to determine equivalent delay (EqD) parameters. Further, DBA results should be notified from all of the OLTs to ONUs under the control of the OLTs at a common timing (That means that DBA results in each OLT shared by the entire OLTs) and the response signal from the ONU should be time-division multiplexingly received at the OLT side in order to instruct the transmission timing with respect to the entire ONUs. Accordingly, the entire PON systems sharing the optical fiber 100 need to have a common logical distance (which indicates the response distance (time) when represented by a temporal expression). This logical distance is measured at a time when the physical distance of the PON section, and delay of signal processing in the ONU and OLT are summed. In the conventional PON, processing time after receiving a signal from the OLT is adapted to be long in the ONU located near the OLT and in contrast, the processing time is adapted to be relatively short in the ONU located far from the OLT, so that response time to an instruction from the OLT becomes constant, in order to make the transmission timing from different ONUs constant according to the difference in distance from each ONU to different branch line fiber 101, 102, or 103 and difference in processing time in the ONU. The difference in length of fibers for OLT connections 111, 112, and 113 should be considered in addition to unevenness in length of glance fibers 101, 102, and 103 in the system according to the present invention.

There are two methods considered to implement the above process. One method carries out a two-step adjustment including: adjusting the logical distance with respect to an ONU group under the control of each OLT; and then adjusting the difference in logical distance which is different from each OLT particularly to utilize the conventional OLT functions. The other method is to determine the common logical distance with respect to the entire system by intensively measuring the logical distance of all of the ONUs by any OLT or other special devices equipped outside the OLTs or inside one of the OLTs. The former method may utilize the conventional distance measuring mechanism at the individual PON system level, and therefore, development costs may be reduced. The latter method has an advantage in that it can be easily managed because database concentrates on one place although it needs to configure a new distance measuring system.

Figure 14:
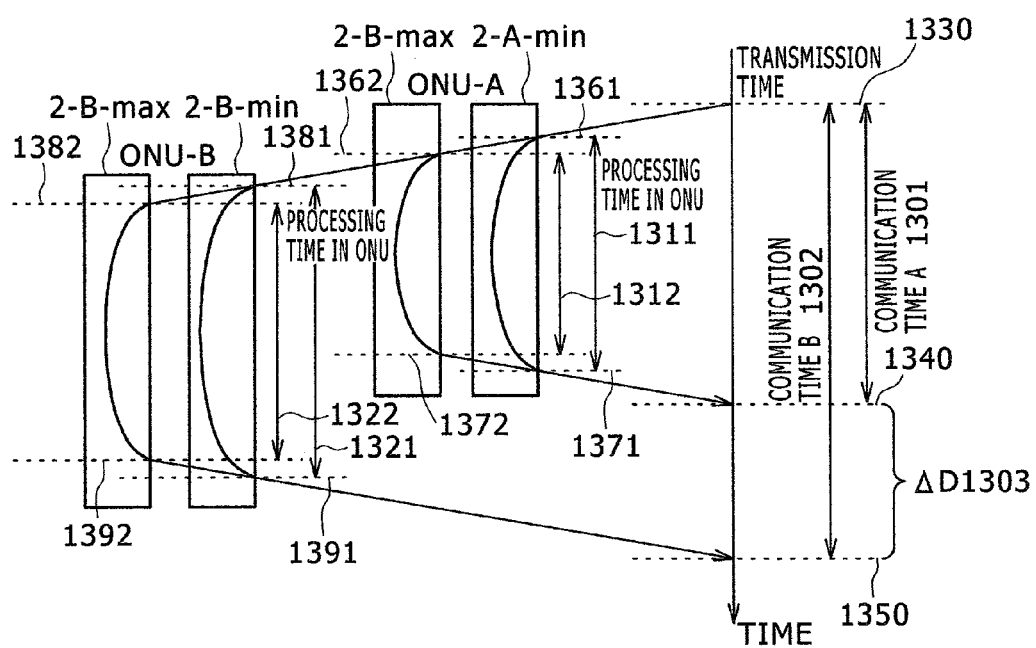
FIG. 14 is a conceptual view illustrating distance difference when each PON has a different logical distance.

FIG. 14 is a conceptual view illustrating a distance difference in a case where each PON has a different logical distance. It is assumed in FIG. 14 that ONUs belonging to the OLT-A (1-A) are gathered at the location closer to the OLT-A than those belonging to the OLT-B (1-B). The ONU-A (2-A-min) is an ONU which is under the control of the OLT-A and located closest to the OLT-A (1-A), and the ONU-A (2-B-max) is an ONU which is under the control of the OLT-B and located furthest away from the OLT-B. FIG. 14 depicts a signal flow when a response request (for example, ranging or serial number request, or the like) was transmitted from the OLT-A (1-A) and the OLT-B (1-B) to the ONU-A and the ONU-B. A downlink signal transmitted from the OLT-A (1-A) at the time 1330 arrives at the ONU (2-A-min) located nearest the OLT-A (1-A) at the time 1361 as shown in FIG. 13 in a case of output time of the messages (response request) from both OLTs are the same.

Here, the ONU-A (2-A-min) waits for a constant time until a response is made to the OLT-A (1-A) according to the EqD notified from the OLT-A (1-A). Processing time 1311 in the ONU-A (2-A-min) is a time including the overall signal processing times in the ONU and the EqD notified to the ONU. When the ONU-A (2-A-min) transmits an upstream signal according to the timing instructed to the OLT-A (1-A) at time 1371, the OLT-A (1-A) receives the uplink signal at time 1340. Detailed descriptions on parameter definition regarding the upstream signal, including the EqD, is assumed in the exemplary embodiment to follow the recommendation of G. 984.3 (non-patent document). While the ONU-A (2-A-min) waits, the signal from the OLT-A (1-A) reaches the ONU-A (2-A-max), and the ONU-A (2-A-max) transmits the upstream signal to the OLT-A (1-A) at time 1372 after the processing time 1312 including the EqD notified from the OLT-A (1-A). In a case where the OLT-A (1-A) performs transmission instructions to the whole ONU-As at the same time, the time 1340 when the OLT-A (1-A) receives the signal is the same among the ONU-As.

This is true for the OLT-B (1-B). The signal transmitted from the OLT-B (1-B) at the transmission time 1330 is received at times 1381 and 1382 with respect to the ONU-B (2-B-min) and the ONU-B (2-B-max). The ONU-B (2-B-min) and the ONU-B (2-B-max) transmit a response message to the OLT-B at times 1391 and 1392 after the stand-by times 1321 and 1322, respectively. The OLT-B simultaneously receives the signal from both ONU-Bs at time 1350.

In the conventional PON system, setup of processing time in the ONUs is given as EqD, and the ONU-A (2-A-min) is set to have a larger value by a value corresponding to the difference between the processing times 1311 and 1312 in the ONU than the ONU-A (2-A-max). In the ONU-B, likewise, the EqD notified from the OLT-B to the ONU-B (2-B-min) uses a larger value than the EqD of the ONU-B (2-B-max) by a value corresponding to the difference between the processing times 1321 and 1322 in the ONU.

In the state shown in FIG. 14, there is a case where signals are overlapped according to the logical distance up to the ONU in a case where plural OLTs receive upstream signals from the ONUs under their control. This logical distance needs to be adjusted herein between the OLTs (between disposed PON systems).

Figure 15:
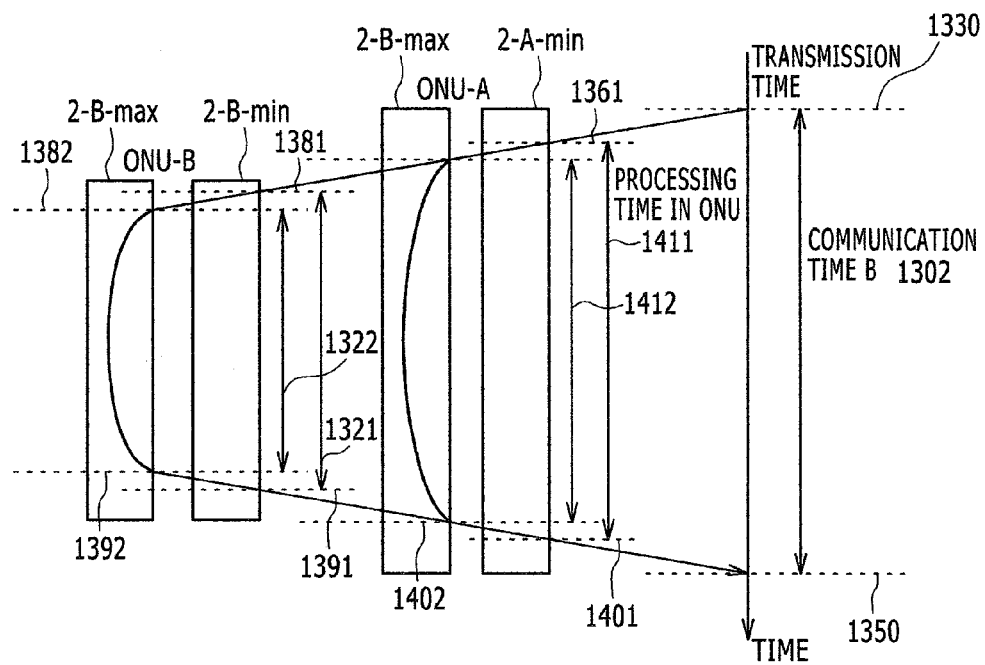
FIG. 15 is a view illustrating transmission timing of a PON upstream signal when logical distance has been adjusted in the state shown in FIG. 14.

FIG. 15 depicts a transmission timing of a PON upstream signal when the logical distance is adjusted with respect to the state shown in FIG. 14. Logical distance is set therein with respect to the entire PONs based on the ONU located furthest from the OLT. Because the ONU-B (2-B-max) is located further than the ONU-A (2-A-max) in the case shown in FIG. 15, the setup value of the OLT-A is calculated to get the suitable value to unify the logical distance with the logical distance set by the OLT-B.

The EqD setup of the ONU-B from the OLT-B has the same order as that of the EqD setup of the conventional ONU in case of FIG. 14. With respect to the ONU-A, the EqD value set to each ONU-A is corrected taking into consideration the difference between the logical distance set by the OLT-A and the logical distance set by the OLT-B, that is, the difference between the communication time A1301 and the communication time B1320. Because the relative difference in distance between the ONU-As is given by the OLT-A as shown in FIG. 14, it is preferable to add a constant value that corresponds to ΔD1303 to the entire ONU-As. By doing so, processing time in the ONU-A (2-A-min) becomes processing time 1411 obtained by adding processing time 1311 in the ONU to ΔD1303. Similarly, processing time in the ONU-A (2-A-max) becomes processing time 1412. As a consequence, a response from all of the ONUs arrives at all of the OLTs at time 1350 at the same time in a case where the entire OLTs issue transmission instruction to the entire ONUs at transmission time 1330 in this system.

Figure 16:
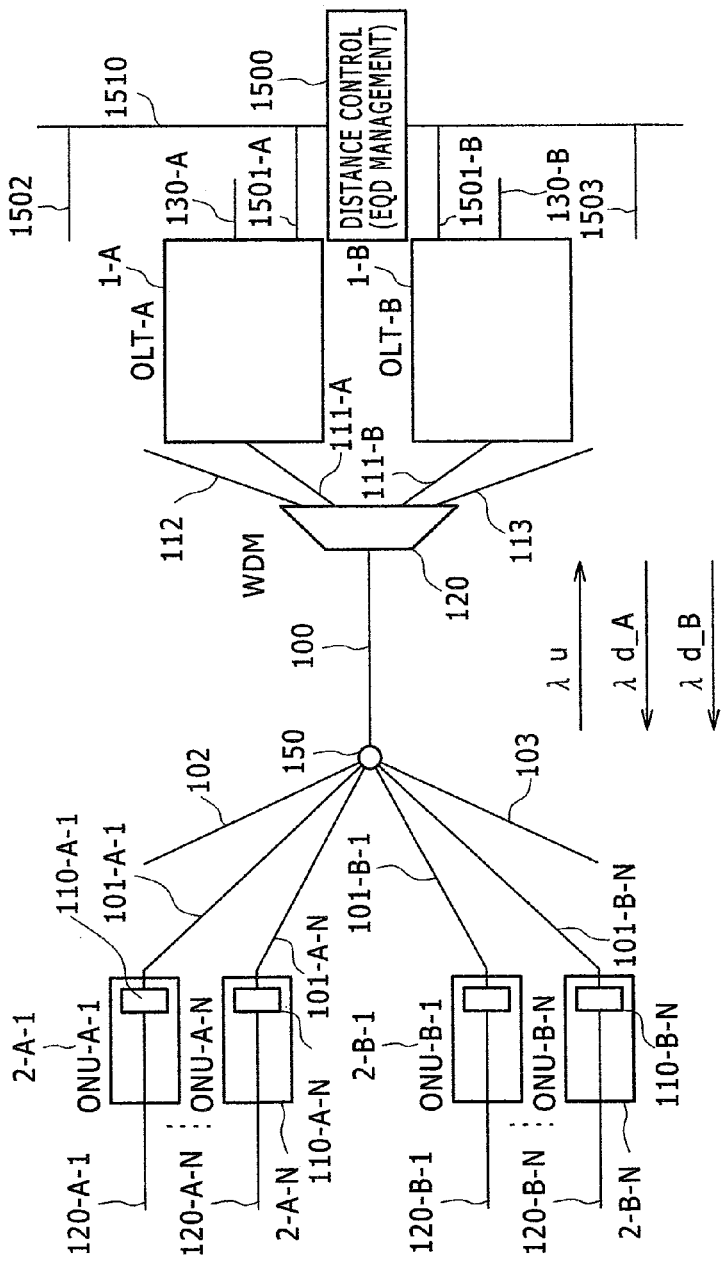
FIG. 16 is a view illustrating a method of managing a bandwidth allocation condition between OLTs by providing a distance control unit 1500 outside the system shown in FIG. 1.

FIG. 16 depicts a method of supporting a band allocation situation between the OLTs by providing a distance control unit 1500 outside the system shown in FIG. 1. The distance control unit 1500 is provided behind the OLT, and each OLT is connected to lines for clock supplies 1501-A, 1501-B, 1502, 1503, and 1510 through the distance control unit 1500. The distance control unit 1500 includes a logical distance management table 1800 (FIG. 19A). On the other hand, the OLT includes an EqD correction information DB 1601 (refer to FIG. 17) for retaining corrected values of distance information. A distance information processing unit 670 in the distance control unit 1500 (FIG. 18) refers to the logical distance management table (delay DB) to produce the difference in the delay amounts between the OLTs. The amount of correction for logical distance adjustment between PON systems is notified to each OLT based on the amount of delay that may have been obtained.

Figure 17:
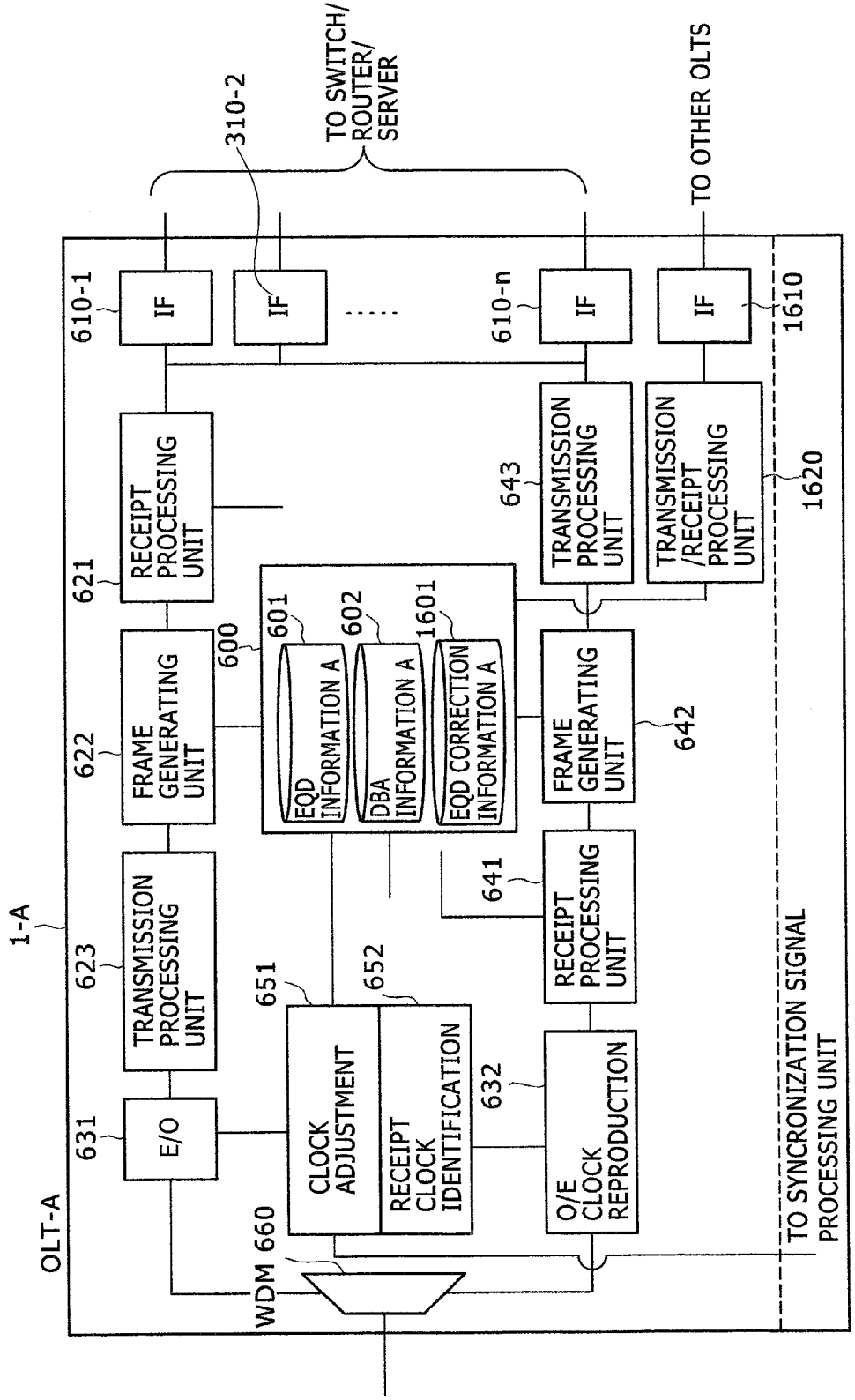
FIG. 17 is a view illustrating a block construction of the OLT-A (1-A) of the system shown in FIG. 16.

FIG. 17 depicts a block construction of the OLT-A (1-A) in the system shown in FIG. 15. The OLT-A (1-A) includes an interface with an optical fiber 111-A on the PON section side (ANI side). A WDM 660 plays a role as the interface herein. The WDM 660 is used to split wavelengths of an upstream signal and a downstream signal, and provided separately from the WDM 120 for connecting between the OLTs as shown in FIG. 16. Ethernet (registered trademark), 10 Gbps Ethernet (registered trademark), and a TDM interface whose representative example includes T1 and E1 may be used as the interface 610 on the carrier network side (SNI side) of the OLT-A 610-1 to 610-n.

Process of downstream signals from the OLT-A (1-A) is as follows, for example, in the case of using Ethernet (registered trademark) as the interface. To begin with, when a signal is transmitted to the interfaces 610-1 to 610-n, the signal is subjected to a synchronization process in the interface 610 to terminate the protocol. The receiving processing unit 621 determines the destination in the PON section of the downstream frame based on the head information of received downstream frame. That is, it is determined whether the destination is located before a specific ONU or plural ONUs, or information that should be terminated by the OLT (that should be transferred to a CPU provided in a PON control unit of the OLT). Also, the receipt processing unit 621 performs a header process such as conversion, addition, and deletion of address information, as necessary, in response to the destination (and source) information or type of received data. Here, the destination (and source) information includes logical path information such as VLAN tag or MPLS label as well as MAC and IP beginning route information. The information to be transferred to the CPU is transmitted to the PON control unit 600 and the data to be sent to the ONU is transmitted to the downstream frame generating unit 622. The downstream frame generating unit 622 makes frames for downstream transmission based on the frame received from the receipt processing unit 621 and the information from the PON control unit 600. Here, the information from the PON control unit 600 includes DBA information notified to the ONU or control information (for example, PLOAM messages and the line in G. 984.3) for performing control and management of the PON section. The control information is generally inserted into the header of a downstream frame, however, may also be inserted into the payload of the frame in a case where the ONU may be recognized for a specific use such as vendor-specific messages (the frame format is not limited in the present invention). The transmission processing unit 623 buffers the frames generated by the downlink frame generating unit 622, and reads it according to the priority of the frame information, the state of the destination ONU, and processing performance, and the E/O converting unit 631 converts it into a optical signal and transmits it according to transmission clocks.

The following operation is performed with respect to upstream signals. When an O/E conversion unit 632 receives an upstream wavelength signal split by the WDM 660, serial data is reproduced based on the signal. The transmission clock of the upstream signal is extracted based on the reproduced signal. The received data is serial/parallel converted according to the reproduced clock and then frame synchronization for the upstream frame is carried out. At this time, the reproduced clock is received at a timing instructed upon transmission of the downstream frame with respect to the ONU prior to receipt of the upstream frame by the OLT-A (1-A). The instructed timing is retained in the DBA information A included in the PON control unit 600 of the OLT-A (1-A) until the receipt of the upstream frame, and it is identified whether the upstream frame is received at a right timing upon receipt thereof. This is conducted by comparing and referring to the received clock information and the DBA information 602 with respect to the receiving clock identifying unit 652. At this time, if the timing is shifted from expected one, the EqD information A 601 retained in the PON section control unit 600 is updated, and the EqD information before the ONU is inserted into the header of the downstream frame to correct the logical distance. The receipt processing unit 641 identifies whether it is data that should be transmitted to the SNI or terminated at the PON control unit 600 based on the header information of the received frame similarly to the process of the downstream frame. In addition, the receipt processing unit 641 performs addition, conversion, and deletion of destination information according to the setup of path information based on the header information of the received frame. The upstream frame generating unit 642 generates the header and payload of a frame transmitted from the PON control unit 600 and the receipt processing unit 641 to the SNI and transmits the generated header and payload to the transmission processing unit 643. The upstream frame generating unit 642 buffers the generated frame, reads it according to priority of frame information, state of destination ONU, and treatment performance, and transmits data through the SNI-sided interface 610.

The interface 1610 connected with the distance control unit 1500 is an interface for receiving EqD correction information that is generated and supplied by the distance control unit 1500. For example, Ethernet (registered trademark) or other interfaces may be used as the interface. Of course, an independent interface (i.e. protocol) may be used for cooperation between devices. The EqD correction amount information is transferred to the PON control unit 600 via a transmission/receipt processing unit 1620 and stored in the EqD correction information database 1601. Here, EqD values for the entire system are generated from the EqD information A 601 and the EqD correction information A 1601 with respect to each ONU. The EqD generated herein is stored in the header of the downstream transmission frame and notified to each ONU. Also, the EqD values are referred to by the clock adjustment unit 651. The clock adjusting unit 651 has a function of managing a difference in clock phase between the downlink signal and the uplink signal.

Thereafter, receiving timing of the upstream signal is obtained or EqD is readjusted in case of the difference in clock on the basis of the EqD set herein.

Figure 18:
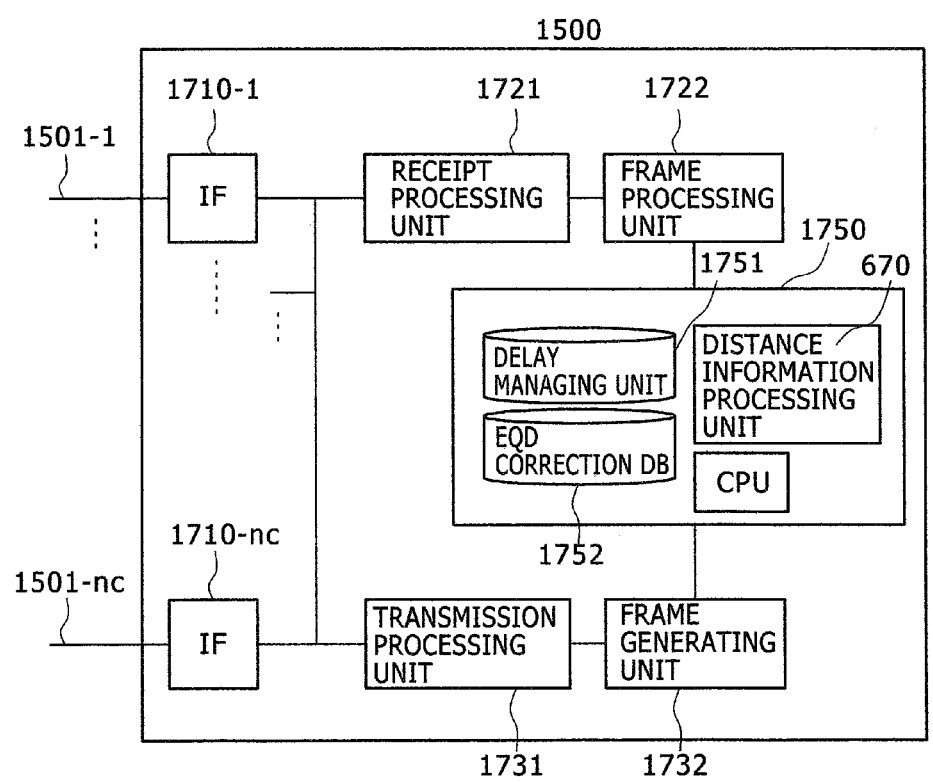
FIG. 18 is a view illustrating a block construction of the distance control unit 1500 of the system shown in FIG. 16.

FIG. 18 depicts a block construction of the distance control unit 1500 in the system shown in FIG. 16. The distance control unit 1500 includes a communication interface with Ethernet (registered trademark), 10 Gbps Ethernet (registered trademark), or a TDM interface whose representative example is T1 and E1, or an independent interface on the OLT side (Network Node Interface or Network Network Interface (NNI) side).

A signal process flow of the distance control unit 1500 is as follows, for example, in a case where Ethernet (registered trademark) is used as the interface between the OLTs. To begin with, when a signal is entered to the interfaces 1501-1 to 1501-*nc*, the signal is subjected to a synchronization process in the interface 1710 to terminate the protocol. The receipt processing unit 1721 identifies the OLT, which is the object of the response time information that is stored in the frame based on the header information of the received frame. The receipt processing unit 1721 extracts the OLT identification information or received data (delay time). Here, the OLT identification information may employ logical path information such as VLAN tag or MPLS label as well as MAC and IP beginning route information. The extracted information is transferred to the delay managing unit 1750 to calculate the logical distance between PONs. The downstream frame generating unit 622 creates an EqD corrected value notification frame that includes a destination OLT identifier in the header information based on the information stored in the EqD correction DB 1752 of the delay managing unit 1750. The correction information is generally inserted into the payload of the frame, however, may be stored in the payload of the frame in a case where an ONU may be recognized for a specific purpose such as vendorspecific OAM messages.

In a case where the uplink frame receiving timing is shifted from the expected (predetermined) value with respect to each OLT, EqD is corrected with respect to each OLT, and simultaneously, the logical distance of the corrected result (logical distance up to the ONU located furthest away) is notified to the distance control unit 1500. The distance control unit 1500 stores the received EqD information in the delay DB 1751 and recalculates the EqD corrected value in each OLT based on the value. The mechanism for the conventional PON may be employed as the mechanism that corrects the EqD parameter. In a case where the transmission timing from the ONU is greatly shifted from the set value, the logical distance needs to be reset including the values stored in the distance control unit 1500. In a case where the amount of correction of expected value is small, adjustment may be made by processing only the inside of the OLT, and at this time, using it only with the conventional function has a merit in that developing costs are reduced. In addition, the recalculation of the EqD corrected value may be made by notifying the timing when the EqD correction is performed to the individual OLT as well as periodically notifying the EqD information from the distance control unit 1500 to each OLT and using the results. Because distance measuring information may be collected from each OLT for each DBA period through the polling process, fine adjustment may be performed correspondingly, thus making it possible to always monitor distance variation. For example, variation in distance information is not useful when the EqD correction inside of the OLT cannot be conducted efficiently to support the continuity of communication, such as rapid (large) change that is difficult to follow by OLT itself occurs, and as a result, this causes the data to disappear.

FIGS. 19A and 19B depict an example of a construction of a database including information that should be retained to adjust the logical distance between PON systems as described in FIGS. 16 to 18.

FIGS. 19A and 19B show a table construction that is retained in each PON system, that is, each OLT.

A table 1800 includes EqD 1802 and the other information such as flag 1803 at each ONU to correct a relative distance difference between the identifier 1801 of the ONU under the control of each OLT and the ONU. For example, it is considered to mount a flag that represents whether the ONU is effective (active) or not with respect to the other flags.

FIG. 19B depicts a table to retain the amount of correction for EqD 1811 when being compared with the reference PON. The logical distance may be seen with respect to refereeing all of the disposed PON systems by using the correction amount of EqD of the table 1810 and the EqD setup values of the EqD 1802 stored in the table 1800. The logical distance is a relative value for the reference value of the entire system. This value is set as EqD for each ONU.

FIG. 20 depicts a constructional example of a table for adjusting the arrival time of the upstream frame, which is a response from ONTs to each OLT, between the OLTs by intensively managing the response time in the entire OLTs. The EqD corrected value management table 1900 is retained in the delay managing unit 1750 included in the distance control unit 1500 shown in FIG. 18. The EqD corrected value management table 1900 includes the identifier 1901 of each OLT, the response delay time notified from each OLT, that is, the logical distance 1902 from each OLT to the ONU located furthest from the OLT, and each corresponding amount of delay value to be corrected 1903. It becomes possible to set equivalent delay parameters uniform over all of the systems sharing the optical fiber based on distance measuring information individually obtained from each OLT through this table. In addition, a method may be taken as an example of a calculating method of delay corrected values, which selects the one having the largest delay among response time notifications from the OLT and sets it as a reference value. As another method, it may be possible to calculate the corrected values for each OLT on the basis of any constant value that is larger than the amount of delay actually measured.

Figure 21:
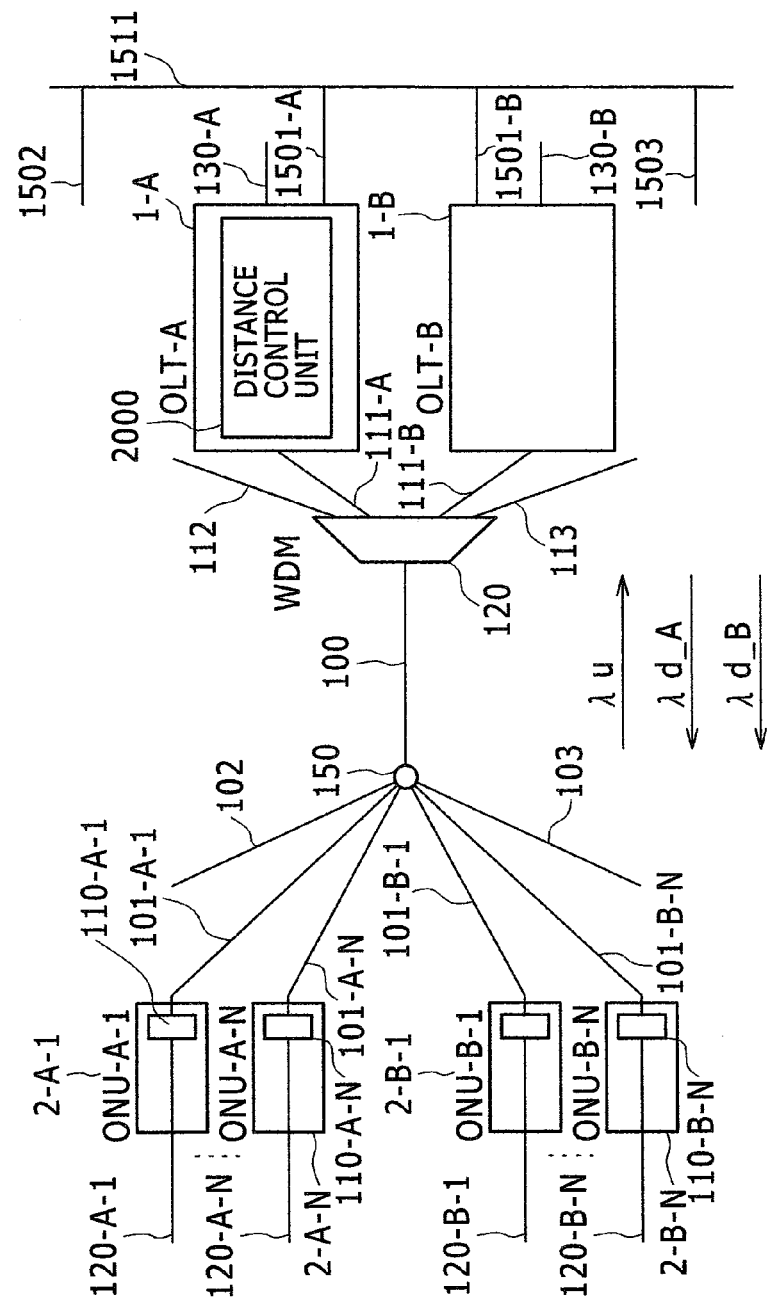
FIG. 21 is a view illustrating a system construction when the distance control unit 1500 shown in FIG. 16 that has been provided in a specific OLT (OLT-A (1-A) herein)

FIG. 21 depicts a system construction when the distance control unit 1500 shown in FIG. 16 is provided inside a specific OLT (OLT-A (1-A) herein). Providing the distance control unit 2000 inside the OLT-A enables the entire PON system to be made compact compared to a case where the distance control unit 2000 is provided outside the OLT-A. This allows the size of circuit for controlling the PON system to be reduced, thus making it possible to lower costs. And, integration of the control function may avoid uncertainty such as inconsistent efficiency in the transmission process or external noises that may be caused when communicating with external devices, thus making it possible to have accurate control. In particular, this effect may be anticipated when this function is added to the OLT that operates at the maximum bit rate among the disposed PONs.

In this case, the basic function of the distance control unit 2000 is equal to that when the distance control unit 2000 is positioned outside the OLT-A as shown in FIG. 16. The OLT-A has a function of transferring its own clock to the other OLTs like the distance control unit 1500 shown in FIG. 16, in addition to a function of generating a clock by its own frequency oscillator to communicate clock information with the ONU through the downstream signal.

In this case, the device construction of the other OLTs than the OLT-A (1-A) is equal to that shown in FIG. 17.

Figure 22:
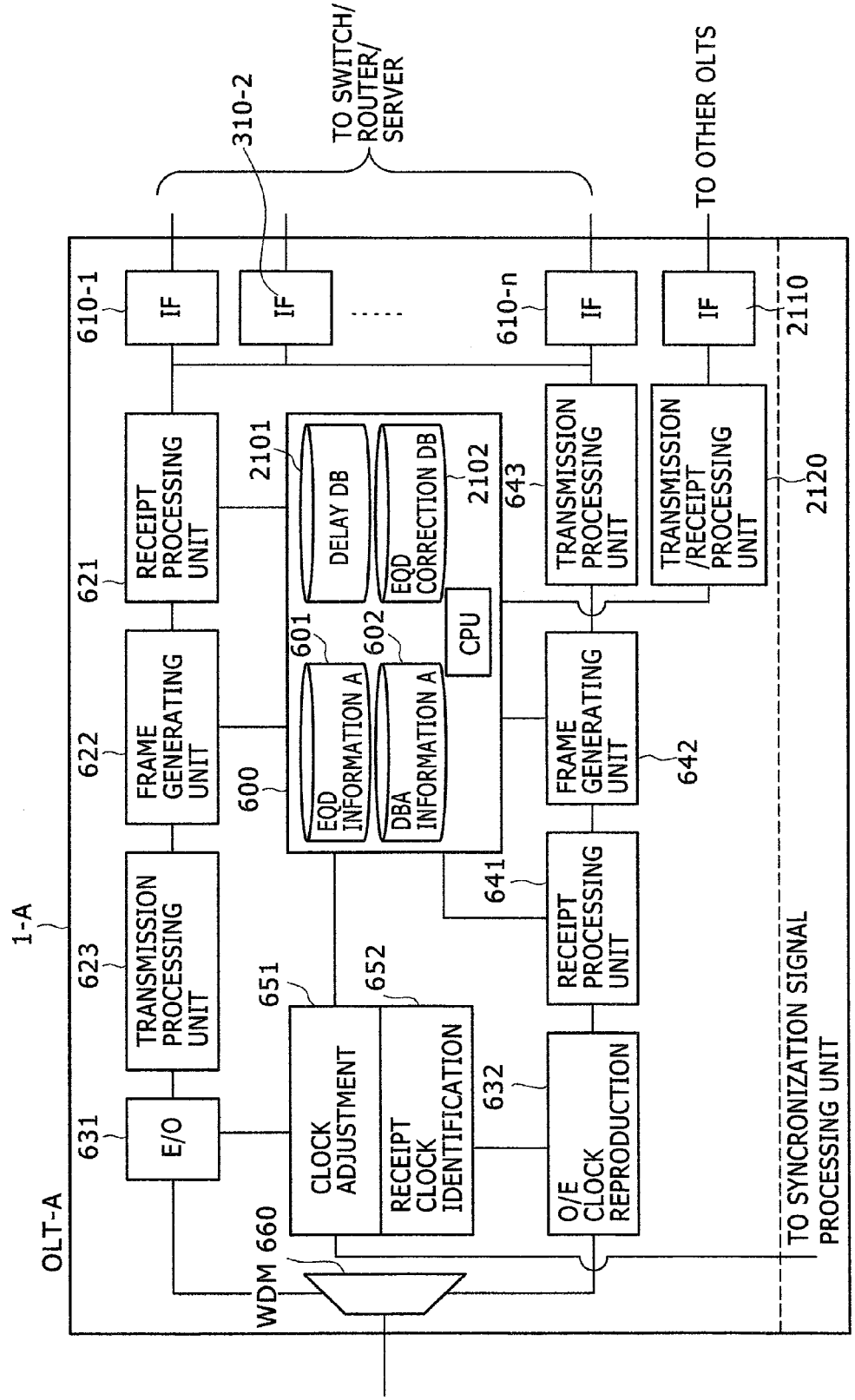
FIG. 22 is a view illustrating a block construction of the OLT-A (1-A) shown in FIG. 20.

FIG. 22 depicts a block construction of the OLT-A (1-A) shown in FIG. 21. In this case, the PON control unit 600 shown in FIG. 17 includes a delay DB 2101 and an EqD correction DB 2102. The PON control unit 600 stores the delay information collected from an individual OLT in the delay DB 2101 and calculates the EqD correction amount that should be notified to each OLT, including the PON control unit 600 in the OLT-A if necessary, based on the information. The calculated result is transmitted through the delay information communication interface 2110. The delay information notification is split as many as the number of disposed OLTs. The split point may be implemented by an external connector or split circuit even though being existent inside the interface 2110.

This construction may perform the same operation as in the exemplary embodiment of FIG. 16 by storing the table shown in FIGS. 19 and 20 in the delay DB 2101 and the EqD correction DB 2102.

A method of intensively managing the delay information by the distance control unit 1500 that is provided inside or outside the OLT has been described so far. A method of notifying the delay information by each OLT to others may be considered as the distance control method. Next, another example of the embodiment will be exemplified. In this case, constructions of the system and the device are identical to those shown in FIGS. 21 and 22. Hereinafter, database included in the PON control unit of each OLT will be described.

FIGS. 23A and 23B depict an example of a construction of a database including information that should be retained to adjust the logical distance between PON systems as described above with reference to FIGS. 21 and 22. FIGS. 23A and 23B depict a table construction that is retained in each PON system, that is, each OLT. A table 2200 includes EqD 2202 and the other information such as flag 2203 at each ONU to correct a relative distance difference between the identifier 2201 of the ONU under the control of each OLT and the ONU. For example, it is considered to mount a flag that represents whether the ONU is effective (active) or not with respect to the other flags.

FIG. 23B depicts a table equipped in OLTs to retain the EqD corrected value 2211 when being compared with the reference PON. The logical distance may be seen with respect to referencing all of the disposed PON systems by using EqD corrected values of the table 2210 and the EqD setup values of the table 2200. The logical distance is a relative value for the reference value of the entire system. This value is set as EqD for each ONU. The EqD correction information 1601 retains the table as shown in FIGS. 19A and 19B.

FIGS. 24A and 24B depict a construction example of the delay DB 2101. The table 2310 retains an OLT identifier 2311 for identifying a reference OLT. This enables each OLT to identify an OLT which is subjected to a comparison of arrival time in case of measuring the logical distance from the ONU and determining EqD. The OLT-ID 2301 that is uniquely set to the system is required for this comparison. Each OLT stores the OLT-ID 2301 set thereto therein. FIGS. 24A and 24B represent an example in which the identifier of the device is registered as the field 2312 in the table 2210. The EqD corrected value managing table 2300 is equal to the table retained in the delay managing unit 1750 provided in the distance control unit 1500 shown in FIG. 20. The EqD corrected value managing table 2300 includes the identifier 2301 of each OLT, the response delay time notified from each OLT, that is, the logical distance 2302 from each OLT to the ONU located furthest from the OLT, and each corresponding delay corrected value 2303. In addition, the one having the largest delay is selected and used among response time notifications from the OLT with respect to calculation of the delay corrected value. Or, it may be possible to calculate corrected values for each OLT by setting any constant value larger than the amount of delay measured actually measured as a reference value. In the exemplary embodiment, an OLT measures the distance up to the ONU under its control and grasps the maximal distance in disposed group including the other OLTs connected thereto. The additional installment of OLTs is easy because this information has been studied autonomously. Also, the size of the hardware design may be suppressed such as the amount of memory use or circuits because the database retained in an individual OLT becomes small compared to the intensive management.

In a case where an upstream signal wavelength is shared, transmission permission timing needs to be controlled with respect to the ONU so that the upstream signals from the entire ONUs are not overlapped over the optical fiber 100. The response time of the overall PON sections may be grasped by the above-mentioned clock synchronization and EqD adjustment between the PONs. Control of boundary of DBA period and control of DBA period field are necessary between the PON systems to conduct an integrated DBA control over the entire system. An operation of the entire system is as described above with reference to FIG. 2. Hereinafter, a band control method of time-multiplexing the uplink signals between the PON systems will be described.

Figure 25:
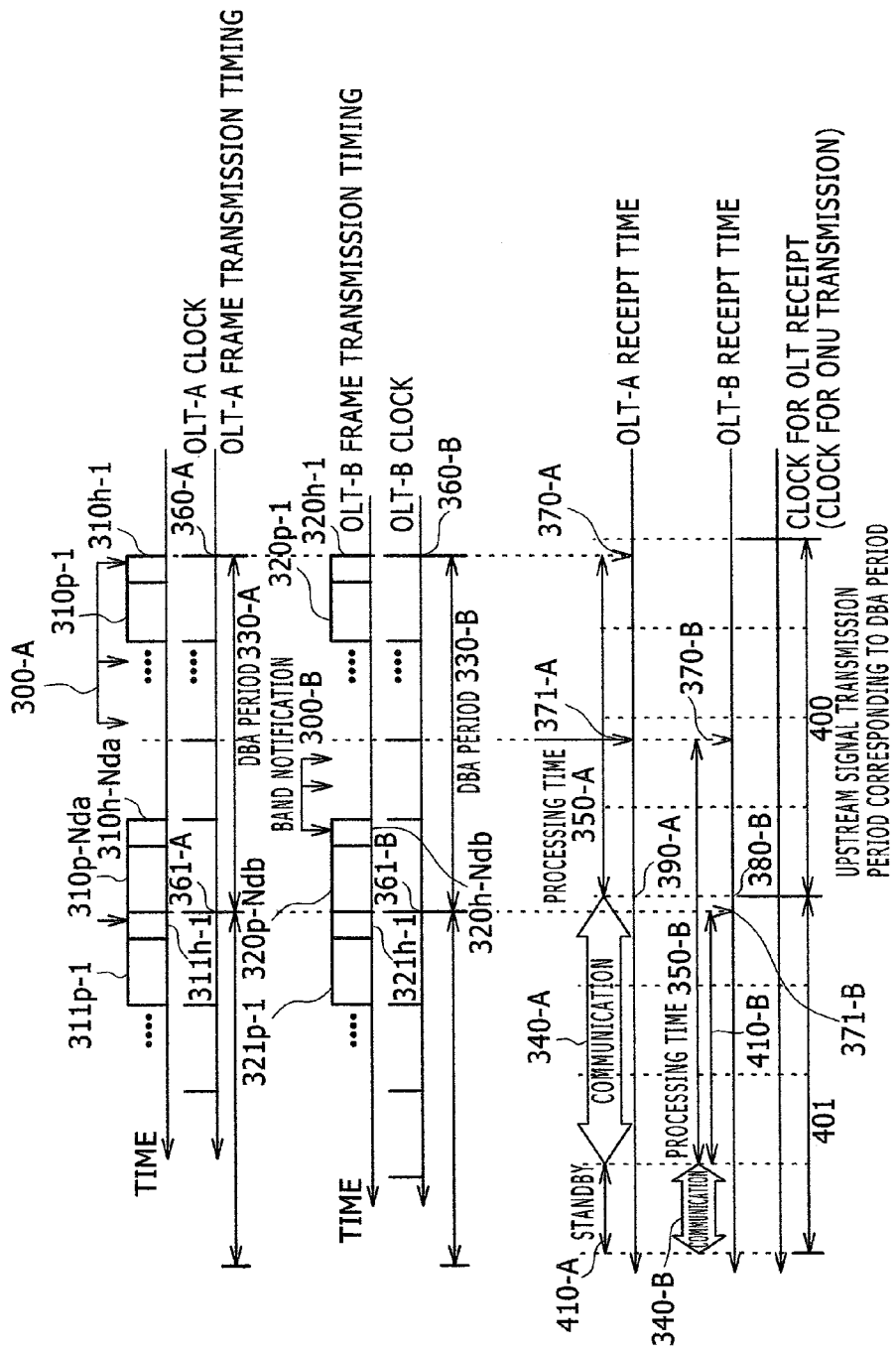
FIG. 25 is a view illustrating a state in which an upstream communication bandwidth over a shared fiber is time-divided between PONs with respect to the PON-disposed system of FIG. 1.

FIG. 25 depicts a state of having time-divided upstream communication bandwidth over a shared optical fiber between the PONs with respect to the PON disposed system shown in FIG. 1. For ease of descriptions, two systems including OLT-A (1-A) and OLT-B (1-B) will be described as an example. Actually, any numbers of PONs may be disposed, and the descriptions may be easily applied to this case, too.

In the individual PON section, there is set a response time as a system that is calculated by each OLT from the distance from each ONU under the control of the OLT to the OLT and response processing time for a message from the OLT in each ONU. This system response time is determined by a signal arrival time that comes with the distance between the OLT and the ONU (optical fiber length) and information processing time required for an electrical signal process from receipt of a downstream signal to transmission of an upstream signal as its response in the ONU. Generally, the distance from the OLT to the individual ONU is not constant but have a predetermined distribution. Accordingly, delay time (equivalent delay; EqD) which is different for each ONU is set so that the response timing from all of the ONUs is equal to the response instruction from the OLT in order to adjust the difference in distance between the ONUs so that the OLT may receive the correct signals from the ONU under its control.

Upon receiving an upstream data transmission request from the ONU under the control at a certain timing, the OLT determines the amount of transmission of the upstream signal for each ONU based on the request band. If the amount of transmission for each ONU, corresponding information is loaded on a downstream signal to be notified to all of the ONUs, and the ONUs transmit the permitted amount of transmission with an upstream signal. This series of processes are a PON-specific control method that is called "DBA".

The upper half of FIG. 25 depicts timing when downstream frames are transmitted to ONUs that belong to each OLT from OLT-A (1-A) and OLT-B (1-B). The temporal axis is shown from right to left of the drawing, wherein a more rapid process is conducted at the right side. Frames shown in the right side are transmitted more quickly. Scales marked in parallel with the temporal axis refer to a period of 125 microseconds, for example, in case of G-PON at the boundary of period for timing control that performs periodic frame transmission. It is generally difficult to control DBA on a per-125 microseconds basis (hereinafter, per-basic period frame) in view of CPU performance, and the DBA control is performed with plural basic period frames bundled. In FIG. 25, time 330-A from time 360-A to time 361-A and time 330-B from time 360-B to time 361-B, respectively, represent a DBA control period for OLT-A (1-A) and OLT-B (1-B). It is assumed herein that the 125 microsecond period timing and DBA period timing are supplied to both OLTs in addition to the clock synchronization and EqD adjustment, so that the DBA period has been synchronized. Accordingly, times 360-A and 360-B come to have the same timing, and the DBA periods 330-A and 330-B come to have the same period.

Under conditions where a response time of the ONU is uniform over all of the system, upstream signals from the ONU may be time-division multiplexed by adjusting the DBA instruction timing on the OLT side. The OLT-A (1-A) and the OLT-B (1-B) transmit downstream frames at different wavelengths from each other. Frame 310-1 that is composed of header 310*h*-1 and payload 310*p*-1 to frame 310-Nda, and frame 320-1 to frame 320-Ndb are included in one DBA period (period for band notification from OLT to ONU).

The band notification for ONU that is managed by each OLT is transmitted as header information of the downstream frame. In FIG. 25, as an example, the band notification 300-A from the OLT-A and the band notification 300-B from the OLT-B to the ONU are allocated to the front part of the DBA period 330-A (that is, 330-B) and the rear part of the DBA period 330-B, respectively. In this case, it is represented that DBA calculation period is unified in the entire system. It is, however, bandwidth allocation timing is different for each system.

Lower half of FIG. 25 represents a time when the band instruction reaches the ONU and a time when upstream signals are received to each OLT when seen from the temporal axis in the OLT-A (1-A) and the OLT-B (1-B). The frame having the band notification 300-A from the OLT-A (1-A) as the header information arrives at the ONU-A from the time 370-A to the time 371-A. The ONU-A transmits uplink frames to the OLT-A after a constant stand-by time according to the logical distance notified from the OLT-A. The processing time 350-A includes the transmission delay time of the uplink signal and processing time in the ONU. The response time seen from the OLT-A is a time from time 360-A to time 390-A. This is applied for the OLT-B; the response time is from the time 360-B to 390-B.

By this process, the upstream signals in the DBA period 401 that is instructed at the DBA period 330-A (330-B) may be normally received without overlap occurring. At the communication time 340-A used by the OLT-A (1-A), the standby time 410-B may be allocated to the OLT-B (1-B), and at the communication time 340-B, the standby time 410-A may be allocated to the OLT-A (1-A).

FIGS. 26A and 26B depict a construction example of a bandwidth allocation table retained by the OLT. The bandwidth allocation information calculated in the PON control unit 600 based on a bandwidth request from the ONU under the control of the OLT and an upstream bandwidth allocation state of the other PONs is stored in the table shown in FIGS. 26A and 26B. The OLT reads the entry of the table in the upstream bandwidth instruction timing that may have been allocated to the OLT, loads it on the head information of the downstream frame, and transmits it to the ONU under its control. FIG. 26A depicts a construction example of a table in a case where a band is allocated by the OLT in such a manner to follow existing recommendations with respect to a band control ID 2501 (generally, association with ONU ID is made upon setup/start of ONU) that is managed by the OLT within an upstream communication time allocated to the OLT.

The allocation band 2502 is yielded based on the amount of allocation of upstream transmission time for each OLT that may be obtainable on the basis of (1) a communication request from the ONU under the control of OLT and (2) mutual communication between the DBA control units 2600 (refer to FIG. 27) or OLTs. The other information 2503 is considered to be used to represent, for example, entry management (valid or invalid) of the bandwidth control ID 2501 according to allocation condition in the DBA period (whether completed or non-allocated) or service use condition. The present invention is not particularly restricted to a certain method of using the flag. FIG. 26B depicts a table construction when the OLT determines an upstream communication bandwidth (time slot) allocated thereto and allocates a valid band to the ONU under its control only within the range. In the instruction within the communication time 2505 regarding the bandwidth control ID 2501, an effective value is set to the allocation bandwidth 2502 so that transmission permission is issued to the corresponding ONU. A zero bandwidth is allocated to the ONU under the control of the OLT to stop the communication in the time when the other ONUs should conduct communication, that is, stand-by time 2506. Data from the bandwidth allocation amount 2502 is transmitted to the ONU from the band allocation location 2504 in response to the instruction from the OLT based on the table. In addition, although not shown herein, it is also possible to specify the allocation start time (location) 2504 and the allocation end time (location) besides the combination of allocation start time 2504 and allocation bandwidth 2502 with respect to the timing instruction of the upstream communication. In the latter case, the allocation end time may be stored instead of the field of the allocation bandwidth 2502.

The construction itself of the band allocation table is equal to that of the conventional PON system, except that applicable upstream bandwidth assumed for DBA calculation is varied with each DBA period in the present invention, whereas applicable upstream bandwidth always corresponds to all of the DBA period in the prior art. There are considered plural methods as a mounting method. For example, there may be provided, for example, a method of performing table access only during a necessary time by reading a table and controlling the timing, and a method of performing table access similarly to the prior art in the DBA period by placing a zero bandwidth with respect to an entry that is accessed other than the bandwidth allocation timing. For example, the table shown in FIG. 26A and the table shown in FIG. 26B may be applied to the former method and the latter method, respectively. In the former, the size of hardware may be small since it is to prepare memory space as much as the number of entries of the band control ID 2501 that is subjected to its band control. Also, the operation mechanism of DBA itself may be equal to that of the conventional system, and therefore, this has an effect of being capable of reducing development costs. The latter method can realize desired operations by keeping the table extraction period constant to control DBA according to the conventional mechanism. Even though allocation upstream communication time is changed for each OLT, it is sufficient to select a corresponding bandwidth control ID 2501 to set permissible communication data amount for necessary entry, and it is not necessary to rewrite the registration order of the entry itself.

Accordingly, system designing is relatively easy.

Figure 27:
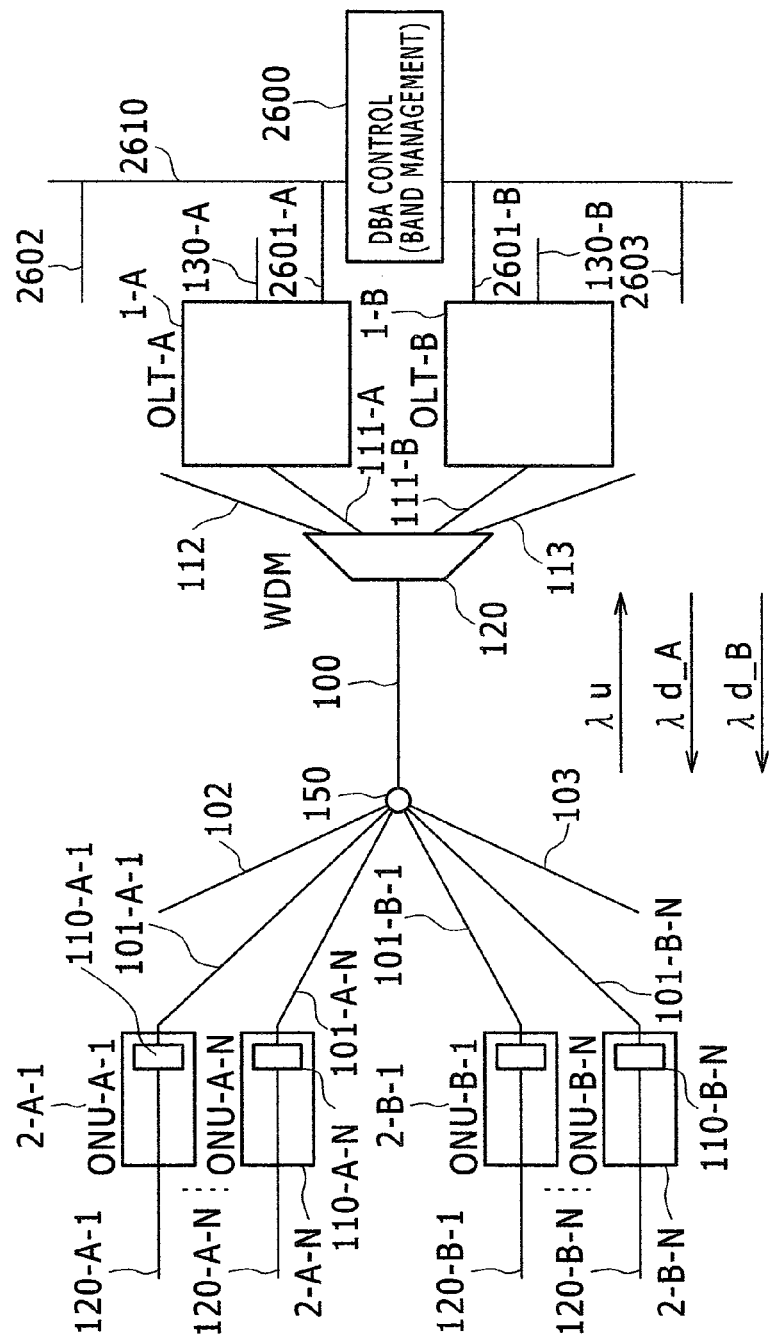
FIG. 27 is a view illustrating a method of managing a bandwidth allocation state between OLTs by providing a DBA control unit outside the system shown in FIG. 1.
Figure 28:
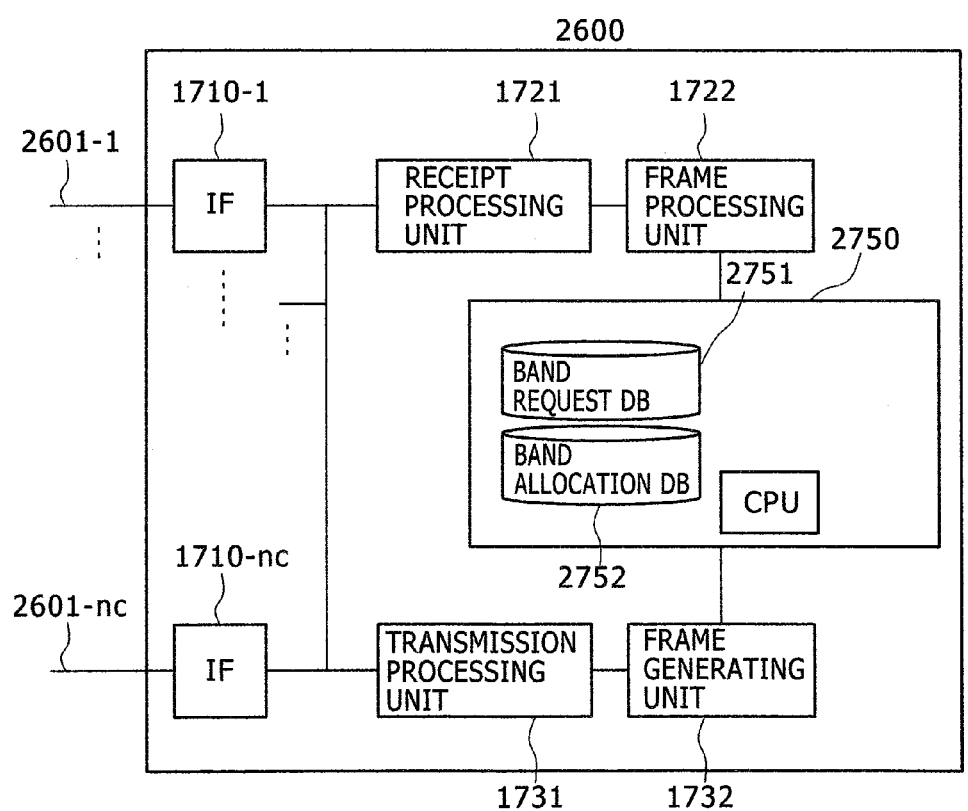
FIG. 28 is a view illustrating a block construction of a DBA control unit 2600 of the system shown in FIG. 27.

FIG. 27 depicts a method of managing a bandwidth allocation condition between OLTs by providing a DBA control unit outside the system shown in FIG. 1. The DBA control unit 2600 is provided behind the OLT, and connected to each OLT through each of lines for DBA control 2601-A, 2601-B, 2602, 2603, and 2610. The DBA control unit 2600 includes a bandwidth allocation management DB 2752 (FIG. 28). The OLT includes a bandwidth information DB 602 (refer to FIGS. 26A and 26B). The DBA control unit 2600 refers to the bandwidth allocation management DB 2752 and notifies bandwidth allocation information to each OLT. In addition, the lines for DBA control may be shared with the lines 1501, 1502, 1503, and 1510 for notifying logical distance control information.

FIG. 28 depicts a block construction of the DBA control unit 2600 shown in FIG. 27. The DBA control unit 2600 includes a communication interface such as Ethernet (registered trademark), 10 Gbps Ethernet (registered trademark), and a TDM interface whose representative example includes T1 and E1, or an independent interface on the OLT side (NNI side).

A signal process order of the DBA control unit 2600 is equal to the following flow in a case where Ethernet (registered trademark) is used as the interface. To begin with, when a signal is entered to interfaces 2601-1 to 2601-*nc*, the signal is subjected to a synchronization process in the interface 2710 to terminate the protocol. The receipt processing unit 2721 identifies the OLT which is an object of bandwidth request information stored in the frame based on the header information of the received frame. The receipt processing unit 2721 extracts OLT identification information or receiving data (bandwidth request). Here, information on MAC or IP beginning route as well as logical path information such as VLAN tag or MPLS label may be used as the OLT identification information. The extracted information for adjusting upstream bands that may be used at the individual PON is transferred to the bandwidth management unit 2750. The downstream frame generating unit 622 makes a usable bandwidth notification frame including destination OLT identifier in the header information based on information stored in the bandwidth allocation management DB 2752 of the bandwidth managing unit 2750. The bandwidth information is generally inserted into the payload of the frame, however, may be stored in the payload of the frame in a case where an ONU may be recognized with respect to a specific use such as vendor-specific message and the like. Here, the bandwidth information includes transmission start timing, or a combination of transmission start timing and transmission end timing.

The construction of the functional blocks for OLTs is identical to that shown in FIG. 17 in the exemplary embodiment. In FIG. 17, the interface for notifying bandwidth information and the transmission/receipt processing unit may be replaced with the logical distance information notification interface and the transmission/receipt processing unit, respectively. These interfaces may include both functions or separately include each of both functions. Such a difference in mounting does not have an effect on the point of the present invention.

FIGS. 29A and 29B depict a construction example of a table for calculating a use bandwidth of each OLT in the DBA control unit 2600. The band request management table 2800 is retained in the bandwidth management unit 2750 included in the DBA control unit 2600 shown in FIG. 28. The bandwidth request management table 2800 includes an identifier 2801 of each OLT, a request bandwidth 2802 notified from each OLT, a priority 2803 for each OLT, and a flag 2804. The priority 2803 and the flag 2804 are optional. The priority 2803 may be used in a case where the sum of the request bandwidth 2802 from all of the OLTs exceed an acceptable band of a line. Use of upstream bandwidth is sequentially permitted from the OLT having high priority on the basis of the priority set for each OLT. Also, it is possible to distribute bandwidth permitted at the ratio of corresponding to the priority. The flag 2804 may be used to identify the state of each entry such as whether or not allocation is made on each OLT, or whether bandwidth allocation has been complete for a certain OLT in a case where band for the OLT is allocated with the bandwidth separated into a few periods. Also, it may be possible to separate the type into a fixed rate communication having high priority and a best effort communication having low priority from each OLT to receive a standby request in order to effectively use bands. An example of a table construction for this case is shown in FIG. 29B. It is possible to firstly secure bands for fixed rate communication with respect to bandwidth calculation in the DBA control unit including the information for each type 2805.

FIGS. 30A and 30B depict a construction example of a bandwidth allocation table for managing use bandwidth of each OLT in the DBA control unit. The band allocation management table 2900 is retained in the bandwidth managing unit 2750 included in the DBA control unit 2600 shown in FIG. 28. The bandwidth allocation management table 2900 includes an identifier 2901 for each OLT, and a request band 2902 notified from each OLT. Also, it may be possible to separate the type into a fixed rate communication having high priority and a best effort communication having low priority from each OLT to receive a standby request in order to effectively use bandwidth. An example of a table construction for this case is shown in FIG. 30B. It is possible to firstly allocate bandwidth for fixed rate communication to each OLT including the information for each type 2903. FIGS. 29A and 29B depict a construction of a table for storing information notified from the OLT, and FIGS. 30A and 30B depict a table for retaining allocation of bandwidth that is produced by the DBA control unit 2600 based on the information shown in FIGS. 29A and 29B. With respect to the OLT receiving a bandwidth request, the priority 2803 or the type 2805 is considered and then the allocation band is determined. Allocation of bandwidth is set as shown in FIG. 30A with respect to each OLT. In a case where the type 2805 is given, bandwidth for each type are retained as shown in FIG. 30B. Information on the table shown in FIGS. 30A and 30B is notified to each OLT together with yielded conditions. In a case where the conditions have been yielded for each type, bandwidth permitted for each type are notified. It is inevitable to retain the information to realize the DBA control. Actually, this table is prepared in two pieces, so that a bandwidth request for the next period from the OLT is written on the bandwidth request storing table (FIGS. 29A and 29B) while DBA calculation is conducted based on the bandwidth request stored in one table (FIGS. 29A and 29B). Respective of the bandwidth notification, also, while permitted bands are calculated by a DBA function and written on a part of a bandwidth allocation information table (FIGS. 30A and 30B) prepared in two pieces, allocation information completed to be written on the other part of the bandwidth allocation information is read out and notified to each OLT.

In addition, it is preferable to explicitly provide a bandwidth which may use each OLT, that is, communication variation range, to information to be notified to the OLT. In FIGS. 30A and 30B, the allocation start time 2904, the allocation bandwidth 2902, and the time slot that each OLT may use are determined. It may also be possible to determine the time slot by providing the allocation start time 2904 and the allocation end time other than the combination described above, which is not shown. It is not necessary to explicitly instruct the time slot from the DBA control unit 2600, which is not to use a table that does not include the allocation start time 2904. At this time, it is sufficient to sequentially allocate the upstream bandwidth from the head of the applicable bandwidth based on a predetermined order such as priority of OLT or bandwidth request arrival order from the OLT.

Even though it has been described to assume two-step process in which a request is notified to the DBA control unit after information has been collected from the ONU under the control of OLT, it may be possible to directly notify a bandwidth request from the ONU to the DBA control unit so that the DBA control unit directly determines band allocation for the entire ONUs. A construction example of the bandwidth allocation management table in the DBA control unit 2600 for this case is shown in FIG. 31. The basic construction of the table is identical to that shown in FIG. 26A, except that the corresponding OLT identifier 3001 is stored in the table as a destination notifying the bandwidth allocation information to an individual ONU. To construct this table, each OLT collects the bandwidth request from the ONU under its control and transmits the information to the DBA control unit 2600. The DBA control unit 2600 collects band requests from all of the ONUs sharing a trunk line optical fiber of the ODN, produces a permitted bandwidth for each ONU, and stores the result to the bandwidth allocation (management) table. Because DBA process is distributed for each OLT in the former, the size of memory necessary for each device (OLT) is reduced, thus leading to an effect in terms of device size or necessary costs. In the distributed processing, also, the function required for each device is mostly based on the existing specifications, thus providing a merit that has little effect on the existing device. In the latter, the DBA information is integrally managed and this makes it difficult to create a shift of operation between PON Interfaces (PONIFs) in the system. Since the DBA control unit 2600 may determine the former information, the guard time may be small which offsets instability of operations that should be set after taking into consideration of the operational accuracy in an individual OLT when being compared with a case of distribution management. Accordingly, it is possible to use the upstream bandwidth more effectively.

Figure 32:
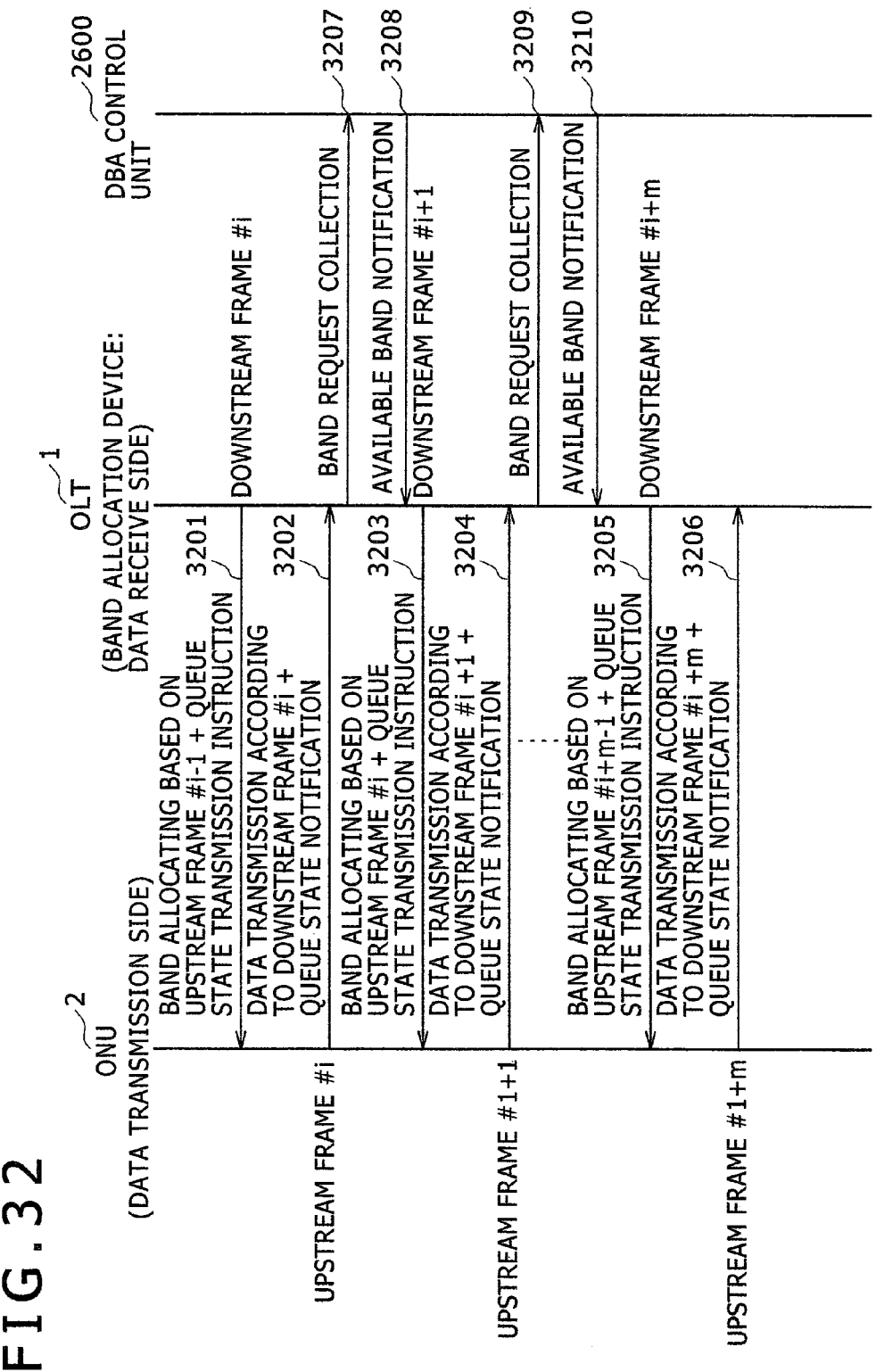
FIG. 32 is a flowchart illustrating a processing order of a DBA control method in the system shown in FIG. 27.

FIG. 32 is a flowchart illustrating a processing order of a DBA control method in the system shown in FIG. 27. A basic flow of the DBA processing will be described herein using the DBA control unit 2600. For easiness of descriptions, the descriptions will be made assuming that each of OLT 1 and ONU 2 represents plural devices. A frame #i (3201) from the OLT 1 to the ONU 2 includes bandwidth permission information produced based on a bandwidth request included in an upstream frame that is received from the ONU 2 prior to the frame #i (3201). By the upstream frame #i (3202), the ONU requests an upstream transmission bandwidth at the next period with respect to the OLT 1 on the basis of the transmission standby information amount that is accumulated in its upstream transmission queue. The OLT condenses the request from the ONU under its control and notifies the total band required to the PON managing the OLT to the DBA control unit 2600 (3207). The DBA control unit 2600 arranges the bandwidth requests from the entire OLTs in the table shown in FIGS. 29A and 29B, calculates the bandwidth allocation amount based on the information, and stores the result in the table shown in FIGS. 30A and 30B. The bandwidth calculated by the DBA control unit 2600 is notified from the frame 3208 to each OLT. The OLT calculates the bandwidth allocation amount for the ONU under its control based on the information from the DBA control unit 2600 and stores it in the bandwidth allocation information table therein. Thereafter, permitted band is transmitted to the ONU based on the table.

In FIG. 32, control timing of bandwidth information is different according to unevenness of distance up to each ONU that is included in the system and setup of DBA period for each PON. For example, assuming that the DBA period is set to be equal for all of the OLTs and the distance to all of the ONUs is roughly the same as a basic case, when an individual OLT in a period collects the requests from the ONUs under its control, the OLT condenses them in the DBA control unit 2600 at the next period. At the next period thereto, bandwidth permission amount is calculated for each OLT with respect to the DBA control unit 2600, and at the next period, calculation result is notified to each OLT. Each OLT calculates the allocation amount to the ONU under its control in a bandwidth first given thereto, and at still the next period, downstream frame including band instruction before the ONU are transmitted.

In a case where band allocation is intensively conducted on the DBA control unit 2600, it is possible to further shorten time until bandwidth allocation is determined after a band request is transmitted from the ONU. As soon as the OLT 1 receives a request from the ONU 2, the OLT 1 notifies it to the DBA control unit 2600. The DBA control unit 2600 calculates bandwidth allocation for the entire ONUs at the stage (at the next period) roughly provided with the request from the ONU. At the next period, calculation result is notified to the ONU.

Figure 33:
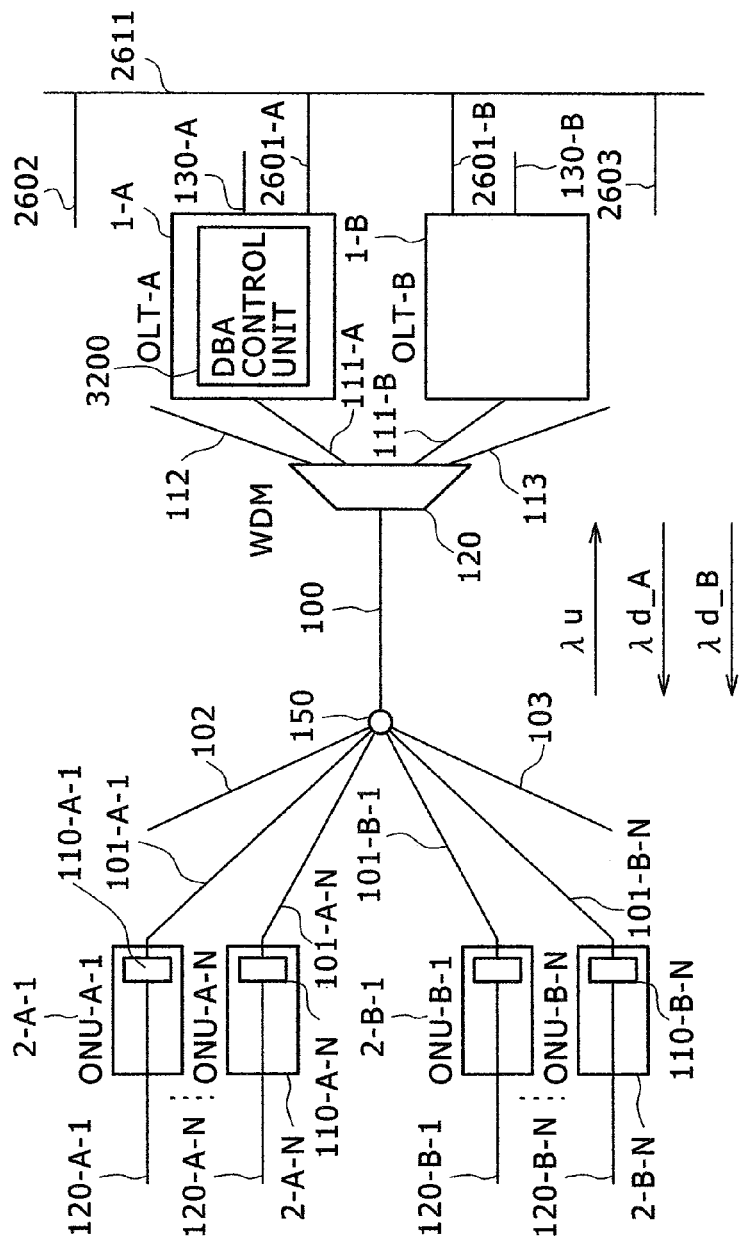
FIG. 33 is a view illustrating a system construction when the DBA control unit 2600 shown in FIG. 27 may have been provided in a specific OLT (OLT-A (1-A) herein)

FIG. 33 depicts a system construction when the DBA control unit 2600 shown in FIG. 27 may have been provided in a certain OLT (OLT-A (1-A) herein). In this case, basic functions of the DBA control unit 2600 are equal to those when it is provided outside the OLT as shown in FIG. 27. The OLT-A (1-A) generates a clock by its frequency transmitter, and has a function of transferring the clock to the other OLTs similarly to the DBA control unit 2600 shown in FIG. 27, in addition to a function of communication clock information with the ONU through a downstream signal. In this case, device construction of the other OLTs than the OLT-A (1-A) is identical to that shown in FIG. 17.

Figure 34:
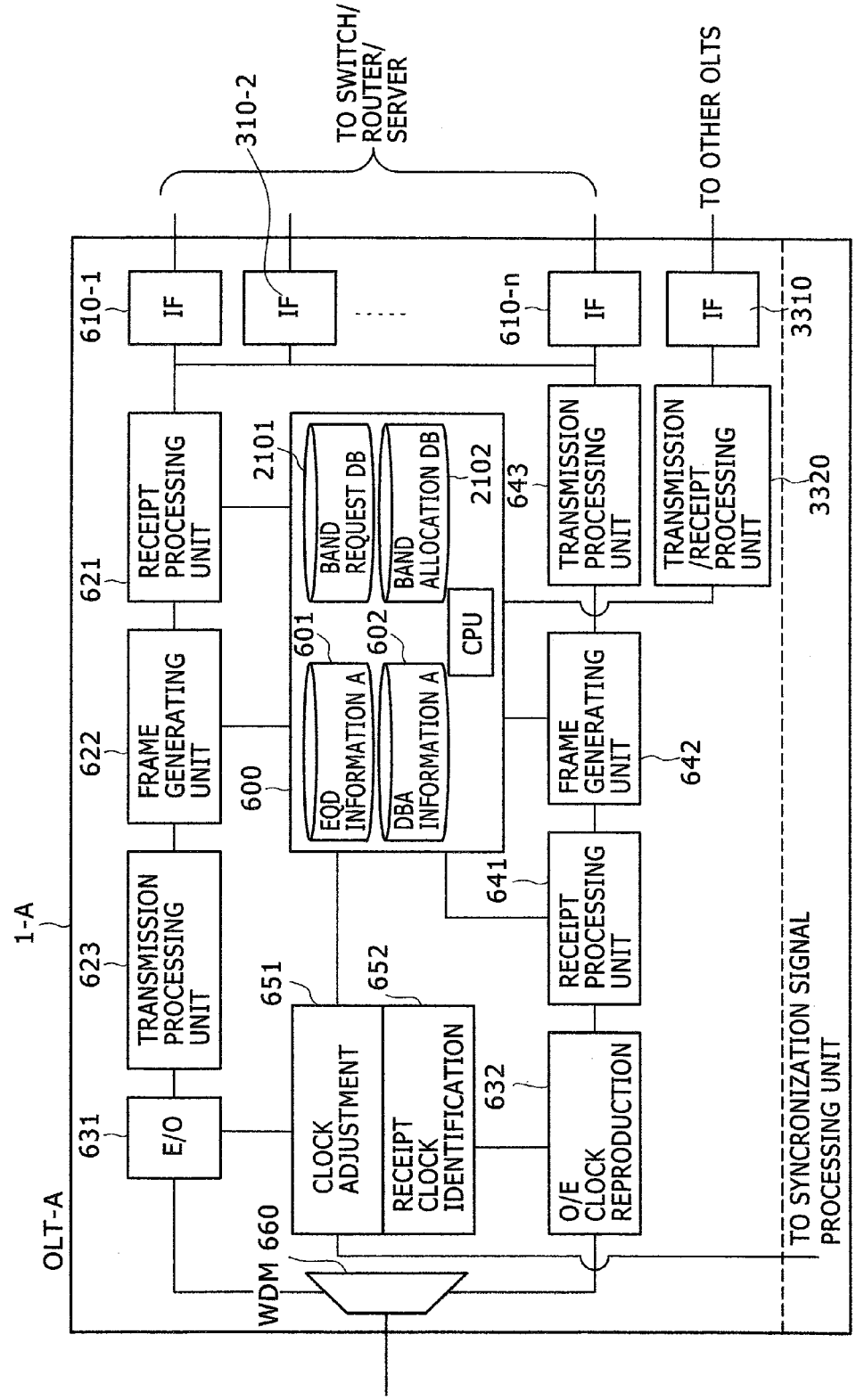
FIG. 34 is a view illustrating a block construction of the OLT-A (1-A) shown in FIG. 33.

FIG. 34 depicts a block construction of the OLT-A (1-A) shown in FIG. 33. In this case, the PON control unit 600 shown in FIG. 17 includes a bandwidth request DB 2101 and a bandwidth allocation DB 2102. The PON control unit 600 retains band request information collected from each OLT in the bandwidth request DB 2101, and calculates the bandwidth allocation amount that should be notified to each OLT based on the information. The calculation result is transmitted through the bandwidth information communication interface 3310. Delay information notification is split as much as the number of disposed OLTs. The split point may be existent inside the interface 3310, or implemented as an external connector or a splitting circuit.

In this configuration, tables stored in the bandwidth request DB and the bandwidth allocation DB, respectively, are identical to the tables retained in the DBA control unit of the system. Further, the order of bandwidth control is identical to the order shown in FIG. 32 except that the OLT-A (1-A) is replaced with the DBA control unit. Providing the synchronization control unit 200 inside the OLT-A enables the entire PON system to be made compact compared to a case where the synchronization control unit 200 is positioned outside the OLT-A. This allows the size of circuit for controlling the PON system to be reduced, thus making it possible to reduce costs. Further, integrating control functions prevents inconsistent efficiency of the transmission process or external noises caused when performing communication with external devices, thus making it possible to improve accuracy of control. In particular, this effect may be anticipated in a case where this function is mounted in the OLT that operates at the maximum bit rate.

With respect to DBA control, a case is considered where OLTs notify band allocation information to each other. In this case, the construction of system and device is identical to that described above with reference to FIGS. 21 and 22. Database retained in the PON control unit of each OLT will be described hereinafter.

FIGS. 35A and 35B depict an example of a database construction for autonomously sharing a band allocation condition between PON systems. FIGS. 35A and 35B show a table construction that is retained in each PON system, which is in each OLT. The basic functions of the table 3400 are identical to those shown in FIG. 30A. The table 3400 includes a summed value 3402 of bandwidth allocated to the ONUs under the control of the OLT, the start location 3403 of the bandwidth, priority 3404 between the OLTs in the bandwidth allocation process, and the maximum value 3405 that may be allocated to each OLT. The priority 3404 is required to perform an autonomous process, and this may be allocated upon setup of the system and frequently updated according to previous band use situation. If bandwidth allocation is conducted independently on the ONU under the control of the OLT having each optical fiber, there could be possibility that upstream signals are overlapped, thus failing to make communications. A DBA process is performed therein, and the priority for each OLT is referred to, which is set in the table. If bandwidth allocation process is not ended for the OLT having higher priority than the OLT, bandwidth allocation stands by without performing. If there are only OLTs having lower priority than the OLT, the bandwidth is calculated which is used by the ONU under the control of the OLT, and the calculation result is registered in the table shown in FIGS. 35A and 35B and simultaneously notified to the other OLTs. Further, the maximum applicable band is an option that may be set so that the bandwidth are not monopolized by a certain OLT alone.

FIG. 35B depicts a table for grasping the bandwidth allocation order of each OLT for each DBA period and the band that may be remained and allocated at that time by the OLT. In a case where the autonomous band allocation is conducted, it is needed to maintain the priority of the OLT in the device. The priority may be registered by an administrator upon start of the system, and the mutual priority may be varied dynamically according to lapse of the bandwidth allocation process (accumulated use bands or right-before band use condition). The remaining band amount 3411 is needed to calculate the bandwidth allocation amount to the ONU. In a case where the total value of the request bandwidth from the ONU exceeds the remaining bandwidth 3411, a possible amount of bandwidth is allocated to the ONU at the ratio of corresponding to the request. In addition, in a case where the maximum band 3405 is set, the same process is performed. In a case where the remaining bandwidth is smaller than the maximum applicable band 3405, the bandwidth allocation process is performed firstly for the remaining bandwidth. The bandwidth allocation process itself may be performed by either of the conventional PON or the method according to the present invention, which has been described so far.

In the exemplary embodiment, the OLT manages the bandwidth allocation to the ONU under its control and bandwidth use conditions in the disposed group that includes the other OLTs connected to each other. The information is autonomously studied, so that additional installment of OLTs is easy. Further, since the database retained in the individual OLT becomes smaller when being compared with the intensive management, the use amount of memory or size of designing hardware such as circuits may be suppressed.

Figure 36:
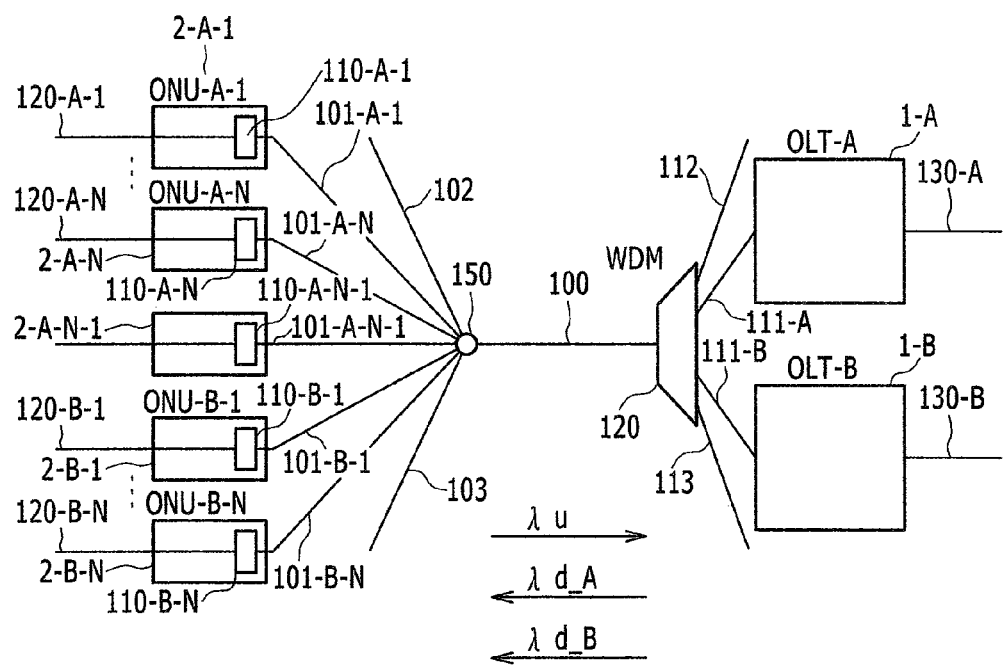
FIG. 36 is a view illustrating a state in which an ONU under the control of the OLT-A (1-A) is added to the system shown in FIG. 1.

FIG. 36 depicts a state where ONUs under the control of the OLT-A (1-A) have been added to the system shown in FIG. 1. The ONU-A-N+1 (2-A-N+1) is split from a splitter 150 at the optical fiber 101-A-N+1. Because of being under the control of the OLT-A (1-A), a filter 110-A-N+1 is identical to the ONU-A-1 to ONU-A-N. If connection to the ONU-A-N+1 is detected, the OLT-A (1-A) initiates a startup process of the ONU-A_N+1. In particular herein, a ranging process will be described as the representative. In a case where a control message is transferred in the environment when other systems coexist with respect to a certain ONU upon the startup control, the same method may be applicable, and therefore, the description will be not limited in terms of use case.

Figure 37:
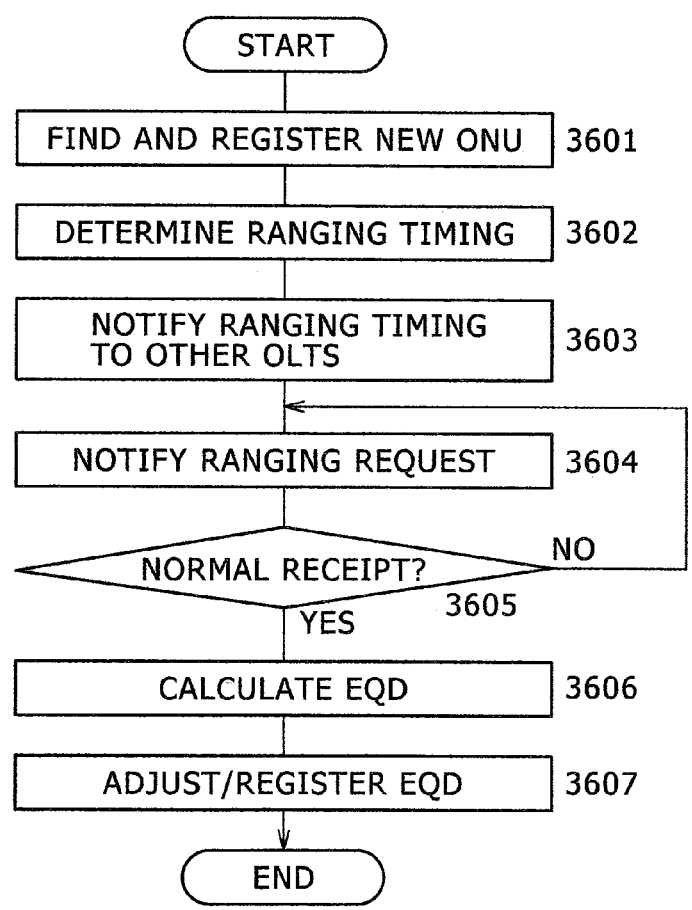
FIG. 37 is a flowchart illustrating a ranging processing part of the OLT-A (1-A)

FIG. 37 is a flowchart illustrating a ranging process in the OLT-A (1-A). If it is detected that an ONU is newly connected, registration and connection environment setup of the ONU are initiated.

Or, this is also true for a case where the setup initiation is instructed through management software (3601). With respect to the new ONU, synchronization of downstream signals, obtaining of frame header information, and transmission/registration of ONU identification numbers for OLT are performed on the ONU side.

If the ONU identifier is registered, a ranging process is conducted that measures the logical distance of an optical line section from communication time between the OLT and the ONU.

If a ranging request is transmitted from the OLT-A (1-A) to the new ONU for requesting a response, however, a signal is transmitted from another ONU to another OLT, there could be possibility of losing a signal from the ONU under start.

This is why the distance to the ONU newly connected is unclear yet, and therefore, the OLT-A (1-A) may not expect having received a response from the ONU at which timing after transmitting a ranging request therefrom.

After determining the timing of ranging (3602) and before transmitting a ranging request, a communication stop is notified to the entire OLTs, each having an optical fiber 100. Subsequently, a ranging request is notified (3604), and it is identified whether it is possible to normally receive a response to the ranging request or not (3605) to determine the logical distance (3606). EqD determined herein considers only the ONUs belonging to the OLT-A. In actually, however, the logical distance of all the ONUs sharing the optical fiber should be considered. After EqD is determined, parameter adjustment is performed referring to the EqD information retained in another OLT (3607). The present invention features a process of notifying the ranging timing to the other OLTs (3603) and an EqD adjustment process 3607 in the entire system. The process 3607 will be described below.

Figure 38:
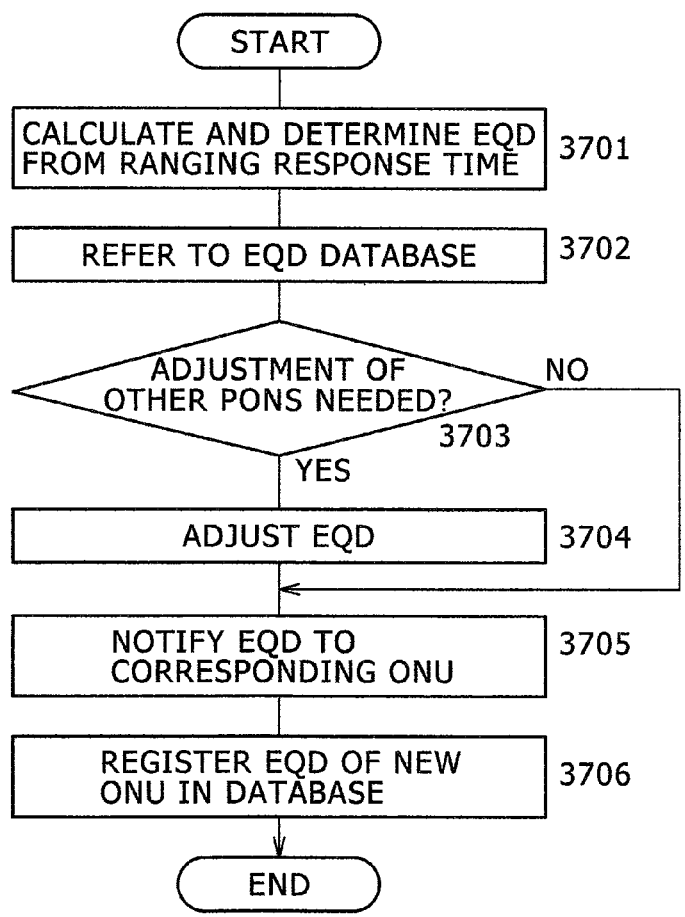
FIG. 38 is a flowchart illustrating a process in the OLT-A (1-A) from receipt of a ranging response to determination of EqD.

FIG. 38 is a flowchart illustrating a process from receipt of a ranging response to EqD determination. The EqD calculated from the ranging response with respect to the process 3701 is a relative value when the object is the ONU under the control of the OLT-A. The EqD database registered in the system is referred to in order to adjust the entire system (3702). The EqD database is retained in the PON control unit of the OLT. In a case where the distance to the ONU newly registered is shorter than the value set in the system as the referred result, the EqD set to the new ONU may be corrected with reference to the value set in the system. In the meanwhile, for example, in a case where the new ONU is positioned farthest in the system, logical distance setup of the entire system needs to be varied according to the newly registered ONU. These series of processes become process 3703 and 3704.

After the logical distance in the system and the EqD to be set to the ONU are all determined, the EqD setup value is notified to the ONU (3705). Further, the EqD notified to the new ONU is registered in the EqD information DB 601 included in the PON control unit 600 of the OLT.

This flowchart features the process 3702 of referring to the EqD information DB 601, the EqD adjustment process 3704, and a process of reflecting the setup value to the new ONU onto the database of the entire system. These processes are necessary to set the logical distance integrated in the entire disposed system. Unifying logical distances with other disposed PON interfaces, which may not be obtained in a single PON interface, may be done by setting the EqD according to the distance to the ONU that has been set longest in the system. This allows the period of DBA control and boundary (start, end) timing of the period to be unified, thus making it possible to perform the DBA control that is interlocked in the entire system.

Figure 39:
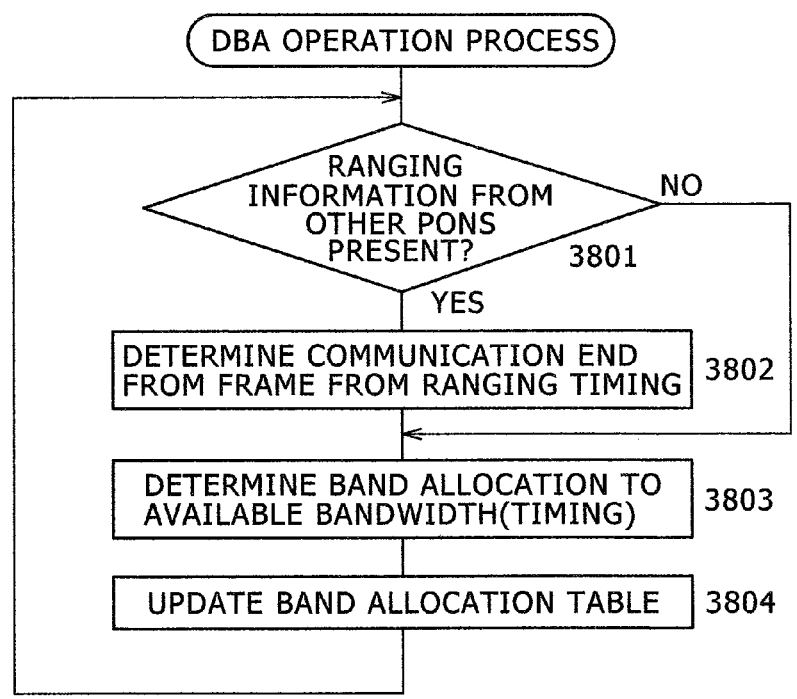
FIG. 39 is a flowchart illustrating a process corresponding to a ranging start notification from another OLT.

FIG. 39 is a flowchart illustrating a process of corresponding to a ranging start notification form another OLT in OLT bandwidth control. When ranging information is received from another PON (OLT) (3801), the allocation band from the OLT to all of the ONUs under the control of the OLT becomes zero according to the ranging timing (3802). Next, band allocation is conducted on the ONU under the control of the OLT in the timing available with the ranging avoided (3803). The calculation result is registered in the bandwidth allocation management table in the DBA control unit, and the table is referenced upon generation of the downstream frame and notified to the ONU. The overlapping of upstream signals may be prevented upon ranging by notifying the ranging timing between the OLTs. The time taken for ranging is allocated, for example, 2 frames in case of G-PON having an optical fiber of 20 km (ITU-T Recommendation G 984. 3, "Gigabit-capable Passive Optical Networks (G-PON): Transmission Convergence Layer Specification"). After notification of ranging process is received from another OLT, allocation of upstream communication bandwidth is stopped with respect to the ONU under the control of the OLT in response to notification timing of the ranging frame released from the OLT. It is possible to avoid mutual interference between PON interfaces to effectively control upstream bands by mutually notifying the ranging timing in advance.

The flowchart represents an order in a case where the OLT is autonomously cooperated to perform bandwidth sharing. Further, the same order may be used even in a case where the ranging timing is included in the available bandwidth that is notified from the DBA control unit to each OLT. The present invention features the process 3802 of determining the upstream communication stop frame from the ranging timing and the process 3803 of performing the bandwidth allocation using available (remaining) bands.

The upstream bandwidth control method has been described so far in a case where the same DBA period is used in the disposed PON systems. Hereinafter, a case will be described where an optical fiber is shared by PONs each having the different DBA period.

In a case where the DBA period is different for each and every PON, each system gives a bandwidth permission to the ONU at any timing. However, it is needed that the signal transmission times are not overlapped between systems with respect to upstream signals from the ONU. It is extremely difficult for each system to always control signal arrangement between the systems with respect to the upstream band allocation while continuing bandwidth control at each constant DBA period in comparison with a case where the DBA period is unified. The following methods are considered to realize this.

The first method is to set the DBA periods to be an integer multiple between systems to be disposed. Upstream bandwidth management becomes easy to realize by constantly maintaining between plural devices processing time when a time period of collecting band requests and a time period of notifying the bandwidth allocation result by the DBA are agreed to each other. Also, since bandwidth allocation process is performed at the constant timing, there is an advantage that it is easy to make a reservation of a band for upstream communication, in a case where information, for example, such as TDM signals, whose communication timing and communication data size are likely to be fixed for each period, is included in the communication data.

Figure 40:
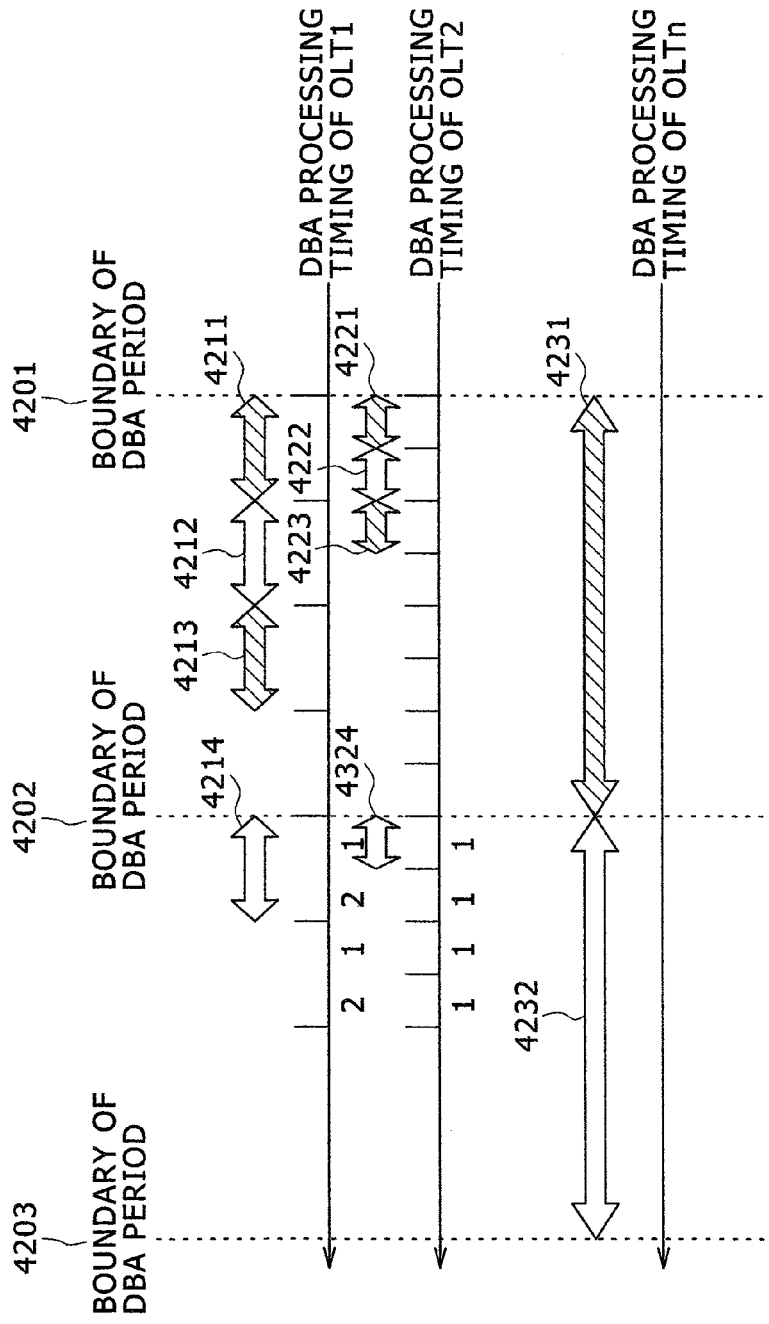
FIG. 40 is a view illustrating a bandwidth allocation method (calculation timing) for upstream communication according to a first method.

FIG. 40 depicts a bandwidth allocation method upon upstream communication according to a first method. An example of an upstream bandwidth use scheduling method is shown in a case where there are plural OLTs (n OLT herein) and the DBA control period is different for each OLT. The OLT1 counts bandwidth requests of the upstream signal received at the slot 4211, calculates the band at the slot 4212, and stores the result in the bandwidth allocation information database. The table is read out at the next time range 4213 and band-notified to the ONU, and the information is reflected at the next period 4214 and transmitted as an upstream signal from the ONU. The same cycle is executed on the PON having the different DBA period. Here, the EqD is adjusted considering that the time when the bandwidth instruction from the OLT is different in response to the communication distance of the optical fiber. For example, if bandwidth instruction transmitted to the time slot 4213 is reflected onto the slot 4214 with respect to the OLT2 and the instruction notified to the slot 4223 is reflected onto the slot 4224, the operation may be continued with a constant operation order maintained between the systems.

Figure 41:
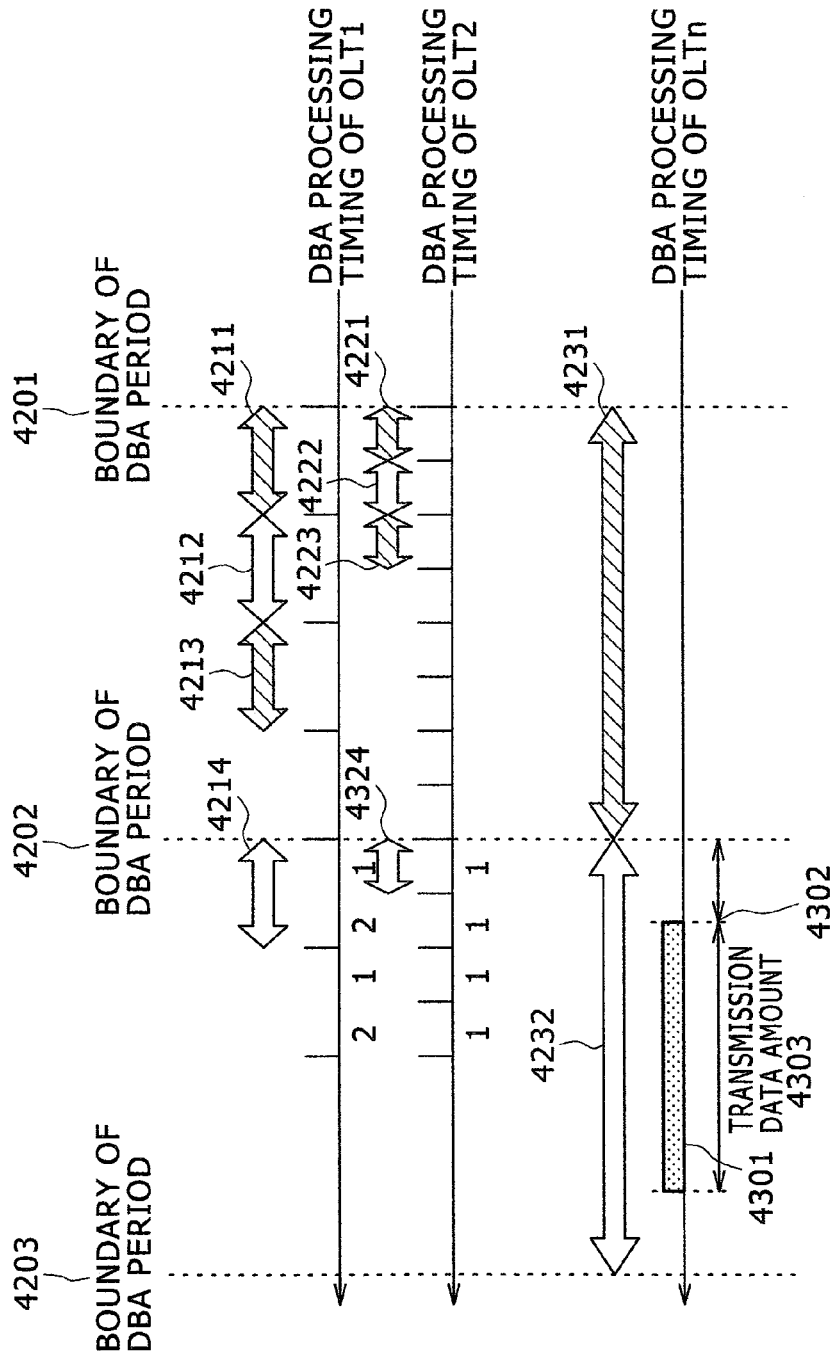
FIG. 41 is a view illustrating a bandwidth instruction form that may be allocated from an OLT to an ONU.
Figure 42:
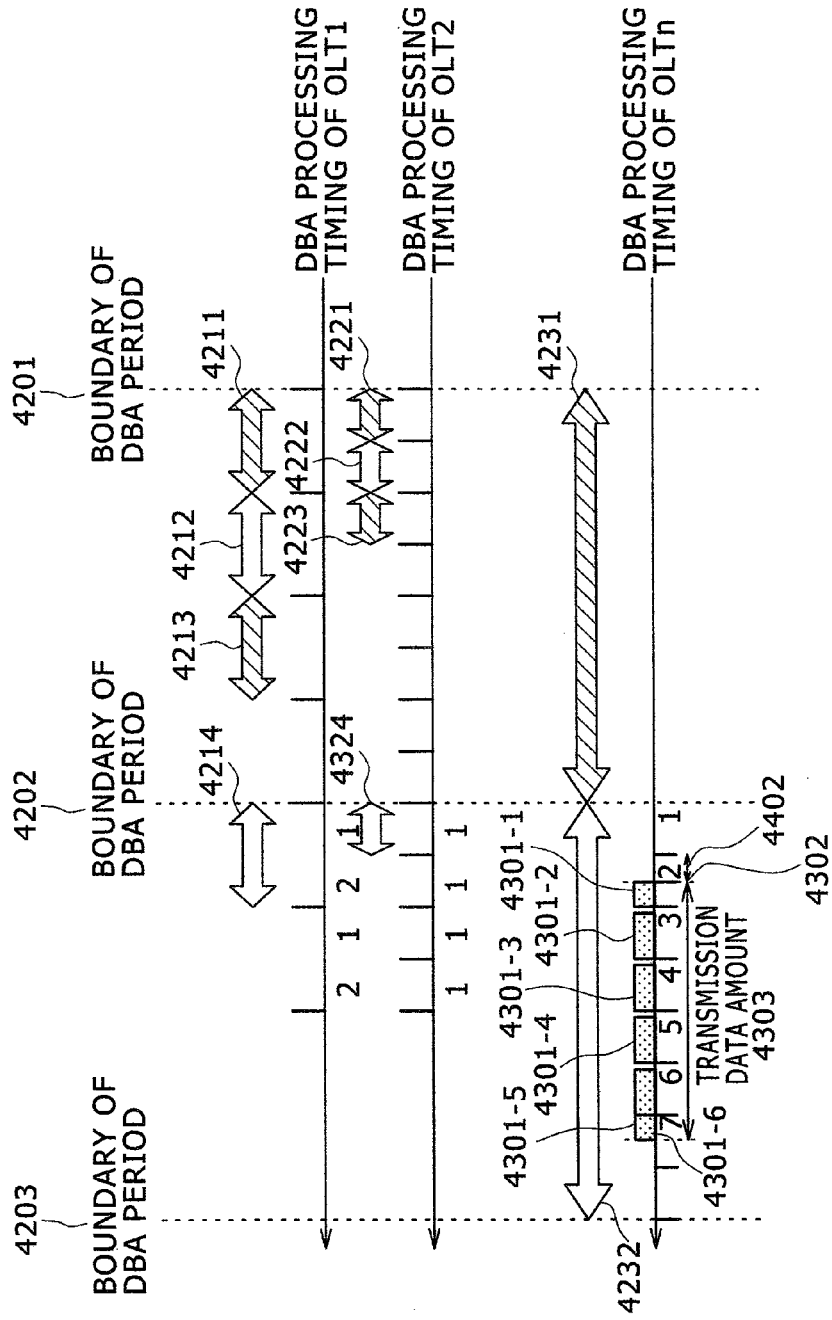
FIG. 42 is a view illustrating a bandwidth instruction form that may be allocated from an OLT to an ONU.

In FIG. 40, plural forms of bandwidth instructions are considered that may be allocated from the OLT to the ONU. One of them is an instruction of the transmission time and the amount of transmission data based on the receiving timing of the downstream frame (bandwidth instruction) in the ONU similarly to a case where DBA period is common (refer to FIGS. 26A and 26B). For this case, relative time up to 4203 is instructed, for example, based on the period boundary 4202 of the bandwidth control. In case of G-PON, the bandwidth is instructed to exceed the frame of 125 microseconds. That is, it is specified that transmission is initiated 580 microseconds after the period boundary 4202 to transmit 500 bytes. FIG. 41 shows an aspect, wherein the transmission timing 4301 instructed to the upstream bandwidth by the OLTn is allocated to cross plural basic frames of 125 microseconds. Another method is a method of instructing a bandwidth on the basis of arrival of a downstream frame of 125 microseconds every time. In this case, a counter for basic frames is provided in the DBA period to identify the DBA period, and the frame counter (that is, frame identifier) and bandwidth allocation location in the frame are notified. FIG. 42 depicts a bandwidth instruction method for this case. Data 4301 to be transmitted at an upstream bandwidth is divided into 4301-1 to 4301-6, an instruction for transmitting each of them is divided into six, and notified to the ONU. Specifically, an identifier (order number herein) is designated to a frame included in between 4202 and 4203 that are the maximum DBA periods, and the transmission location is designated in each frame. The transmission start location of the division frame 4301-1 corresponds to the time 4402 of the reference frame #2, and data is transmitted to the reference frame #2 therefrom as much as transmittable. In the division frames 4302-2 to 4302-6, the transmission start location is the head of each division frame. In the last division frame 4301-6, the end location is in the middle of the division frame. For example, it may be instructed that other data are transmitted thereafter.

A construction example of a bandwidth allocation information table shown in FIGS. 41 and 42 is shown in FIGS. 43A and 43B. A frame identifier 4501 is added to the basic band allocation information shown in FIGS. 26A and 26B. The frame identifier 4501 is notified to the ONU along with the bandwidth allocation start time and the band allocation amount (or, bandwidth allocation start time and bandwidth allocation end time). The ONU has an upstream frame counter, and recognizes the timing which should be transmitted next from the information. Further, the bandwidth allocation start time stores a relative time based on the start time of the frame counter for each OLT (that is, DBA period boundaries 4201, 4202, and 4203) in FIG. 41, and stores a relative location from the start time of the basic frame of 125 microseconds in FIG. 42. In addition, the frame identifier 4501 is not needed in FIG. 41.

Figure 44:
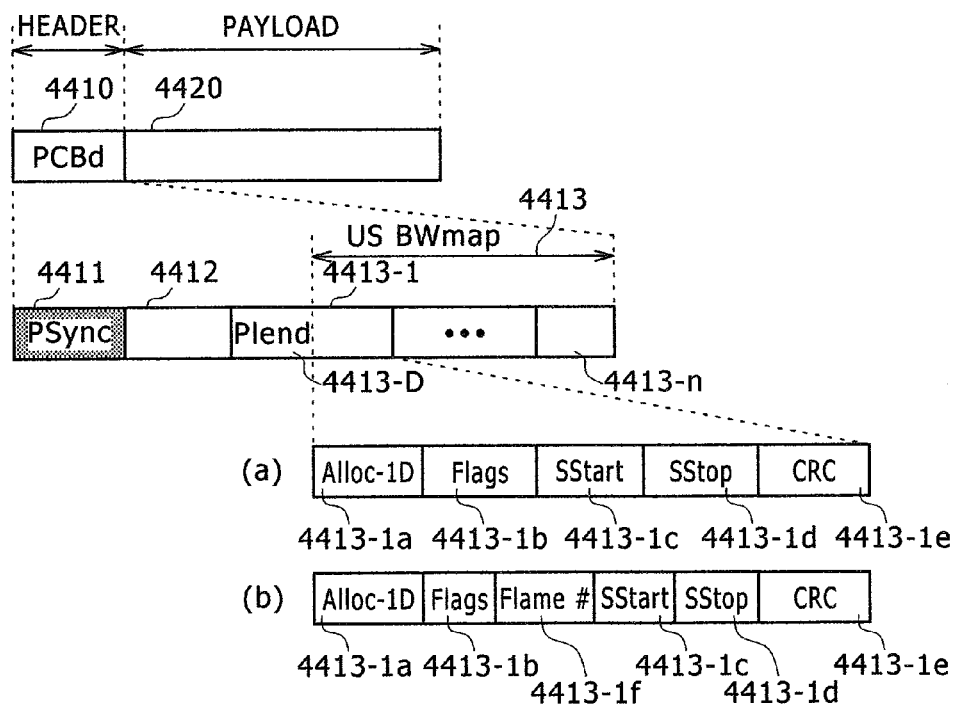
FIG. 44 is a view illustrating frame format including allocated upstream bandwidth information notified from an OLT to an ONU in case of FIGS. 41 and 42.

FIG. 44 depicts bandwidth information notified from the OLT to the ONU in FIGS. 41 and 42.

The downstream frame includes a header PDBd 4410 and a payload 4420. The header includes Psync 4411 which is a signal pattern for synchronizing optical signals and US BWmap (Upstream Bandwidth Map) 4413 for instructing bandwidth allocation at the next transmission period (DBA period) with respect to the individual ONU2. The other field 4412 includes an Ident (Identification) field that provides a message field PLOAMd (PLOAM for Downstream) for ONU activation, error detection, and other control, and a super frame counter (not shown) for plural basic frames used for encryption process. Further, the header 4410 includes a Plend (Payload Length Downstream) field that represents the number of Alloc-IDs (that is, this means providing the size of the header) instructing a bandwidth to the US BWmap.

US BWmap (4413-1 to 4413-*n*) includes Alloc-ID (4413-1*a*), Flags (4413-1*b*), Sstart (4413-1*c*), Sstop (4413-1*d*), and CRC (4413-1*e*) for each Alloc-ID. The Sstart (4413-1) represents the bandwidth allocation start time, that is, transmission start timing of data that is transmitted and controlled at the Alloc-ID. Further, the Sstop (4413-1*d*) is a field for instructing the bandwidth allocation end, that is transmission end timing.

The transmission timing is designated at the Sstart (4413-1*c*) and the Sstop (4413-1*d*) without being bound to the basic frame length (125 microseconds in GPON) to designate the bandwidth at the downstream frame in FIG. 41. The upper limit of the Sstart (4413-1*c*) and the Sstop (4413-1*d*) is within the length included in the DBA period boundaries 4202 to 4203, and this is represented by time or byte number.

In a case where bandwidth is instructed as shown in FIG. 42, the upper limit of the Sstart (4413-1) and the Sstop (4413-1*d*) becomes the time included in a basic frame (125 microseconds) or a value obtained by converting it by byte (38880 bytes in case of G-PON 2.4 Gbps). Instead, the frame number counter 4413-1*f* included in the DBA periods 4202 to 4203 is notified along with the bandwidth instruction as shown in FIG. 44, and the upstream frame is time-division multiple controlled as seen from the entire system.

Figure 45:
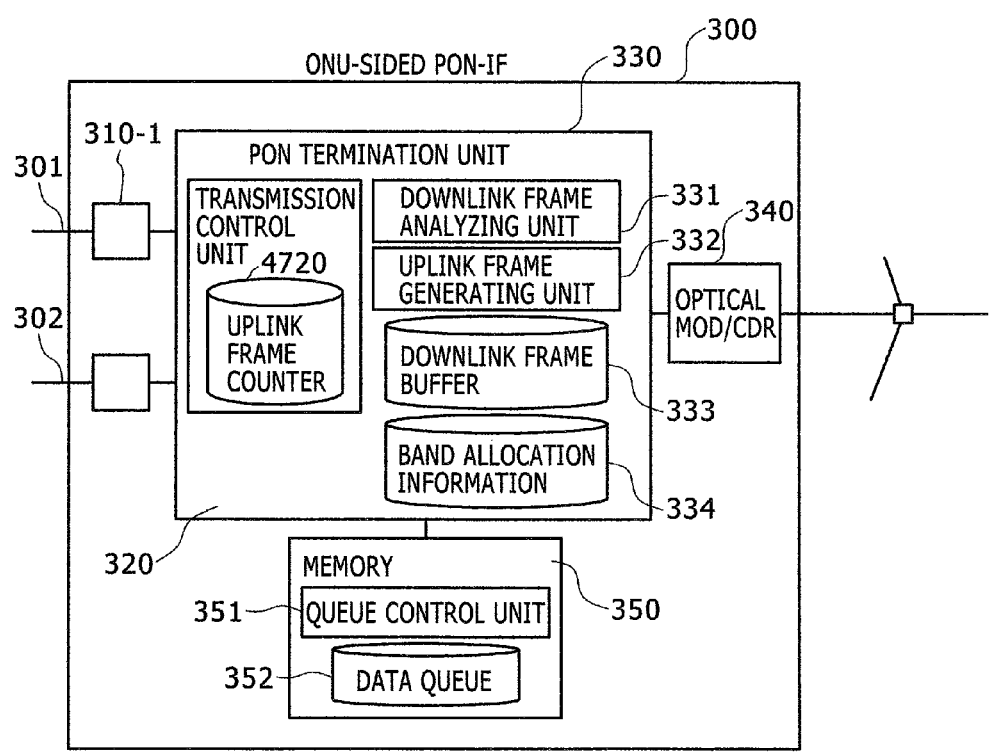
FIG. 45 is a functional block diagram illustrating an ONU to perform the band control shown in FIGS. 41 and 42.

FIG. 45 depicts a function block of an ONU for performing band control in FIGS. 41 and 42. This differs from the conventional basic construction in that an upstream frame counter 4720 is provided.

The ONU2 includes an optical module 340 that terminates the optical fiber, a PON terminating unit 330, a memory 350, an Ethernet line terminating unit 310 that accommodates an Ethernet line 301, and a TDM line terminating unit 320 that accommodates a TDM line 302.

The Ethernet line terminating unit 310 extracts an Ethernet frame from a signal entered through the Ethernet line 301 and notifies it to the PON terminating unit 330. The Ethernet frame extracted by the Ethernet line terminating unit 310 is stored at a data queue 351 of the memory 350. The data queue 352 is managed by a queue control unit 351 and read out according to an instruction notified from the upstream frame generating unit 332 of the PON terminating unit 330 to the memory 350. Further, the data queue 352 is reconstructed from the downstream frame received at the optical module 340.

The Ethernet frame is stored in a data queue (transmission queue) for downstream Ethernet frame provided in the data queue 352 of the memory 350. The downstream queue control unit included in the queue control unit 351 sequentially transmits the frame from the data queue to the Ethernet line terminating unit 310 in response to a reading instruction from the Ethernet line terminating unit 310.

The data queue 352 may be provided in the line terminating units 310 and 320, and the function of the PON-IF 300 is not affected if a primary signal transmission line is secured at the line terminating units 310 and 320. The PON-IF is a set of series of functional blocks configured over an ASIC, and this may employ any construction as long as the above-mentioned process may be executed.

A downlink frame analyzing unit 331 of the PON terminating unit 330 extracts Ethernet (and TDM data) from the downstream PON section communication frame accumulated in a downstream frame buffer 333, and reconstructs data with the format of being transmittable from the line terminating units 310 and 320. Further, the downstream frame analyzing unit 331 extracts device control information and band allocation information notified from the OLT1. The device control information is processed by a CPU connected to the inside or outside of the device. The bandwidth allocation (transmission permission to individual ONU2) information to the upstream frame is retained in a bandwidth allocation information database 334 provided in the PON terminating unit 330. The database is referred to from the upstream frame generating unit 332, and the transmission data amount (bandwidth allocation size) at the upstream frame is interlocked at the queue control unit 351 and used to control the reading amount of the data queue 352.

A transmission control unit 4710 is provided to transmit an upstream frame based on the bandwidth allocation information database 334. The transmission control unit 4710 has timings when a bandwidth control boundary comes and a frame counter among them, and an upstream frame is transmitted by a combination of the timing and information from the bandwidth allocation information database 334. The case of FIG. 42 includes the frame counter shown in FIG. 44 as bandwidth allocation information in addition to the case of FIG. 41. Accordingly, the information included in the bandwidth allocation information database 334 slightly differs between FIG. 41 and FIG. 42. In FIG. 41, the header provided to the data may be one even in a case where there are many data amounts because data is transmitted over plural frames. In contrast, the method shown in FIG. 42 needs to insert a header to a divided piece of the data when the frame is divided, and therefore, the method shown in FIG. 41 is more advantageous in terms of the use efficiency of transmission band. On one hand, in the case shown in FIG. 41, data frame is longer than physical layer frame (basic frame, that is, G-PON Encapsulation Method (GEM) frame in G-PON), and there is demanded a structure of managing the division number and frame length with respect to division upon transmission of the data and reproduction upon receipt over the basic frame. Since the entire data frame is completed in the basic frame in FIG. 42, frame generation and termination may be easily realized by existing structure.

In the exemplary embodiment of FIG. 41, the upstream frame counter in the ONU is reset at the reference period that is shared at the entire disposed systems, that is, at the time of DBA period boundaries 4201 and 4202. The counter is used to count the relative number of frames from the DBA period boundaries 4201 and 4202. It may be possible to suppress the amount of information upon transmission of the downstream frame since it is enough to notify only the amount of data transmission (bytes or bit number) and frame counter values that correspond to existing 125 microseconds when transmission time slot is designated from the OLT to the ONU to exceed the frame of 125 microseconds by using the frame counter. This is possible in performing a transmission timing instruction. The same effect is also true for the frame counter shown in FIG. 42. On the contrary, in the method of directly designating a relative location from the reference period boundary (DBA period boundaries 4201 and 4202 herein) without using the frame counter, the amount of data transmittable is large in comparison with one frame of 125 microseconds, and therefore, lots of bit numbers are needed to designate the transmission location.

Meanwhile, expanding the bit numbers designating the transmission start and the end location may be realized by the conventional structure.

The second method is a method of controlling upstream bandwidth at independent timing by each of disposed systems. This requires executing reservation of an upstream bandwidth while identifying conditions of another upstream bandwidth every period. A function necessary herein includes priority setting (described with reference to FIGS. 35A and 35B) for determining reservation order of an upstream bandwidth, a reference timing for identifying a bandwidth used by another system, and setting of a reference frame. The latter is a parameter that should be commonly determined in all of the OLTs in the system separately from the DBA period for each system, and the individual PON may map its DBA control timing and period with respect to the reference period by using this.

Figure 46:
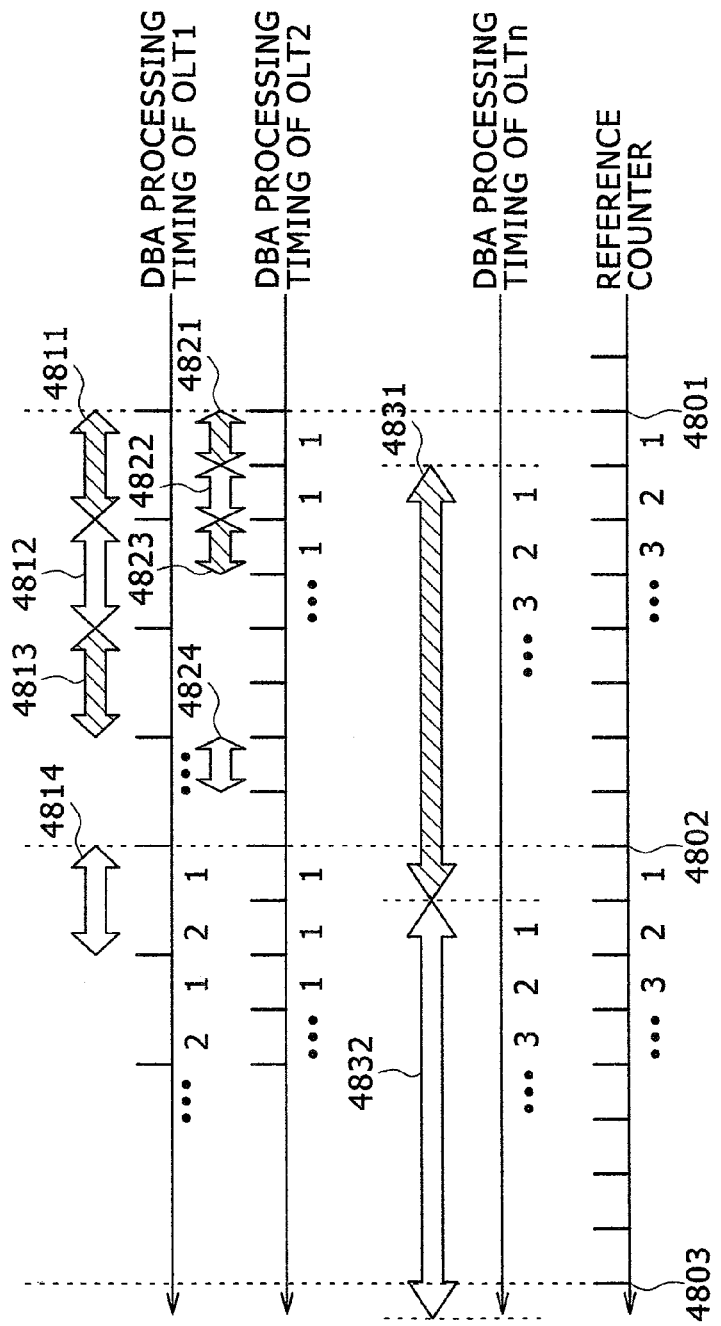
FIG. 46 is a view illustrating a bandwidth allocation method upon uplink communication according to the second method.

FIG. 46 depicts a bandwidth allocation method upon upstream communication according to a second method. There is illustrated an example of a use scheduling method of an upstream bandwidth in a case where plural OLTs (n OLTs herein) exist and the DBA control period is different in each OLT. An operation of OLT 1 and OLT 2 is as shown in FIG. 40. It is shown herein that upstream communication timing from each ONU managed by the OLT 1 and the OLT 2 is different. As mentioned above, EqD adjustment between the OLTs considering the communication distance of the optical fiber is not necessary in the second method.

Figure 47:
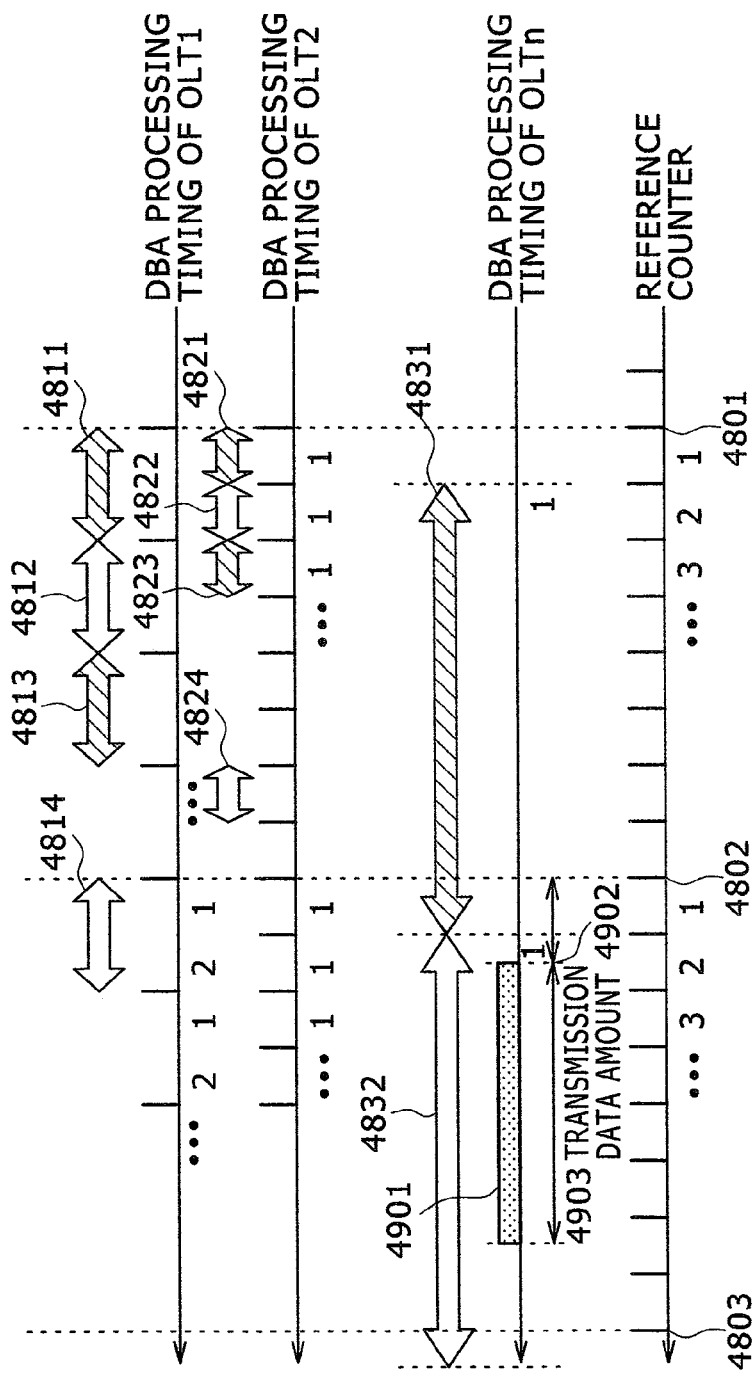
FIG. 47 is a view illustrating a bandwidth instruction form that may be allocated from an OLT to an ONU.
Figure 48:
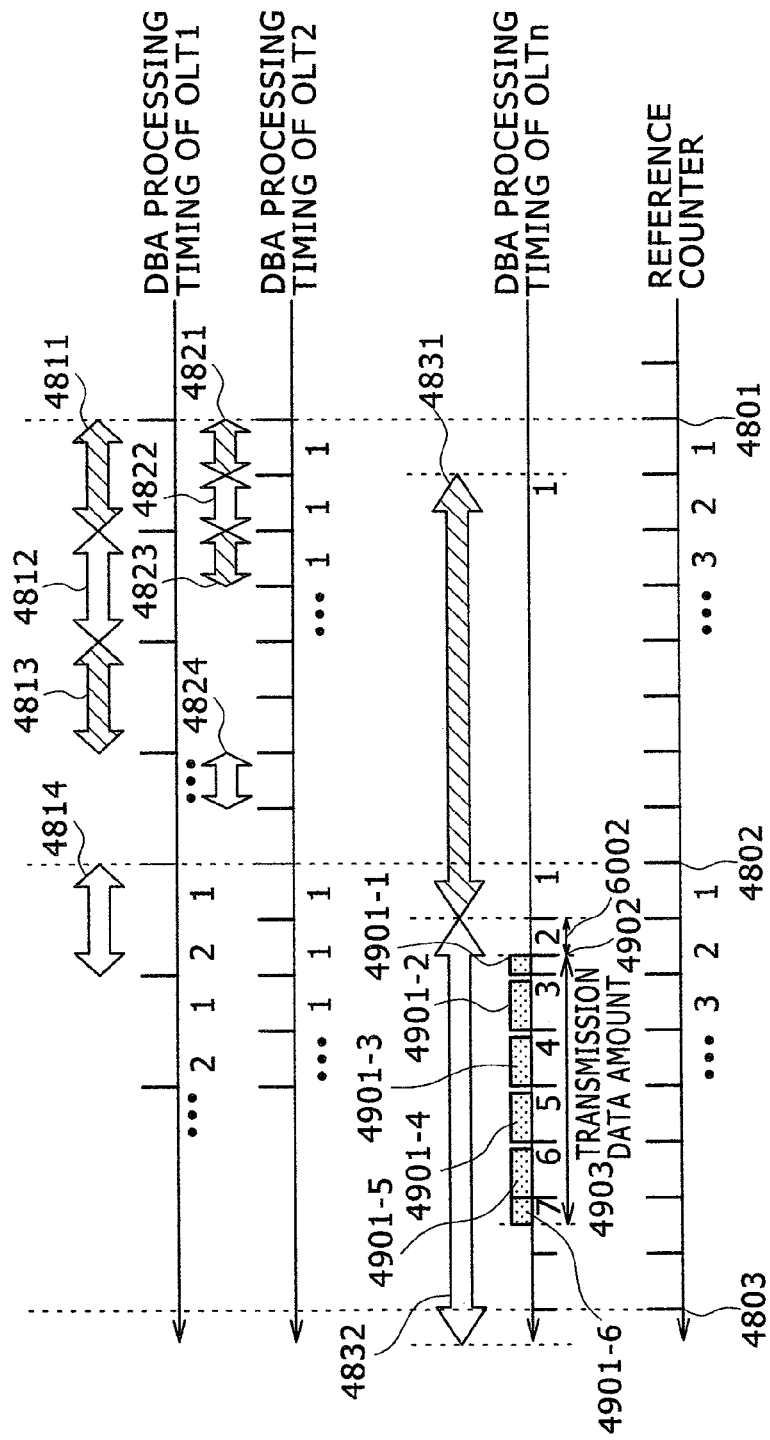
FIG. 48 is a view illustrating a bandwidth instruction form that may be allocated from an OLT to an ONU.

Even in FIG. 46, the form of bandwidth instructions that may be allocated from the OLT to the ONU may be provided in a plural. One of them is an instruction of transmission time and transmission data amount based on the downstream frame (bandwidth instruction) receiving timing in the ONU similarly to a case where the DBA periods are common (refer to FIGS. 26A and 26B). In this case, there does not exist a common period boundary unlike FIG. 40. Accordingly, the boundary of reference timing used, for example, as a common frame counter is shared by the entire OLTs, and a relative time is designated for that time. For example, in case of G-PON, the bandwidth is instructed to exceed 125 microsecond frame. That is, such a designation is performed that the common counter boundary 4801 or 4802 is set as the zero point and transmission is started after 580 microseconds to transmit 500 bytes. FIG. 47 represents this aspect. The transmission timing 4301 instructed to the upstream bandwidth by the OLTn is allocated to cross plural 125 microsecond basic frames. Another method is a method of instructing a band based on arrival of a downstream frame of 125 microseconds every time. In this case, a counter for basic frames is provided in the DBA period to identify the DBA period, and the frame counter (that is, frame identifier) and bandwidth allocation location in the frame are notified. FIG. 48 depicts a bandwidth instruction method for this case. Data 4901 to be transmitted at an upstream bandwidth is divided into 4901-1 to 4901-6, an instruction for transmitting each of them is divided into six, and notified to the ONU. Specifically, an identifier (common frame counter herein) is designated to a frame included in between 4802 and 4803 that are the common frame counter periods, and the transmission location is designated in each frame. The transmission start location of the division frame 4301-1 corresponds to the time 5002 of the reference frame #2, and data is transmitted to the reference frame #2 therefrom as much as transmittable. In the division frames 4902-2 to 4902-6, the transmission start location is the head of each division frame. In the last division frame 4901-6, the end location is in the middle of the division frame. For example, it may be instructed that other data are transmitted thereafter.

A construction example of a bandwidth allocation information table shown in FIGS. 47 and 48 is shown in FIGS. 49A and 49B. The table construction is as shown in FIGS. 43A and 43B. In FIG. 45, the bandwidth allocation location 5101 represents a relative time from the start time of the common frame counter, and does not require the frame identifier 5102. In FIG. 48, the bandwidth allocation location 5101 is a time from the start time of a basic frame of 125 microseconds and this is updated every basic frame. Also, the frame identifier 5102 is a counter of a reference frame, and is notified to the ONU together with the band allocation start time and the bandwidth allocation amount (or, bandwidth allocation start time and band allocation end time). The ONU has an upstream frame counter, and recognizes the timing which should be transmitted next from the information.

The bandwidth information notified from the OLT to the ONU is as shown in FIG. 44. What is indicated by each field is different as described above with reference to FIGS. 49A and 49B.

The construction as shown in FIG. 45 may also apply to the ONU function block. In FIGS. 49A and 49B, the frame counter becomes a counter of the common frame.

Since data is transmitted over plural frames in FIG. 47, the header provided to the data may be one even though there are lots of data amounts. On the contrary, the method shown in FIG. 48 may insert a header into a division piece of the data when the frame is divided, and therefore, the method of FIG. 41 is advantageous in terms of use efficiency of transmission bandwidth. In the meanwhile, in the case shown in FIG. 47, data frame is longer than the physical layer frame (basic frame, that is, GEM frame in G-PON), and a structure is in demand which can manage division numbers and frame length over the basic frame with respect to division upon transmission of the data and reproduction upon receipt of the data. Because the entire data frames are completed in the basic frame in FIG. 48, frame generation and termination may be easily realized by the structure according to the existing recommendations.

In the exemplary embodiment of FIG. 47, the upstream frame counter in the ONU is reset at the reference period shared by the entire disposed systems, that is, at the time of DBA period boundaries 4801 and 4802. The counter is used to count the relative number of frames from the DBA period boundaries 4201 and 4202. It may be possible to suppress the amount of information upon transmission of the downstream frame since it is enough to notify only the amount of data transmission (bytes or bit number) and frame counter values that correspond to existing 125 microseconds when transmission time slot is designated from the OLT to the ONU to exceed the frame of 125 microseconds by using the frame counter. This is possible in performing a transmission timing instruction. The same effect is also true for the frame counter shown in FIG. 48. On the contrary, in the method of directly designating a relative location from the reference period boundary (DBA period boundaries 4801 and 4802 herein) without using the frame counter, the amount of data transmittable is large in comparison with one frame of 125 microseconds, and therefore, lots of bit numbers are needed to designate the transmission location.

Meanwhile, expanding the bit numbers designating the transmission start and the end location may be realized by the conventional structure.

The first method may employ any one of intensive control of performing band allocation in the DBA control unit, two-step control of combining a DBA process for each OLT and adjustment between the OLTs in the DBA control unit, and a distribution control of autonomously transferring bandwidth reservation information between the OLTs to perform band reservation according to the OLT priority.

The system construction for the intensive control is identical to that when the DBA periods have been unified. Bandwidth allocation is calculated at the DBA period set for each OLT while upstream bandwidth use conditions are managed in the DBA control unit. The system construction in the two-step control is also identical to that when the DBA periods have been unified. The communication data amounts and communication timing (upstream bandwidth allocation location) that are available for each OLT are arranged and managed in the DBA control unit, and the bandwidth allocated to the ONU under the control of each OLT is managed for each OLT. The system construction in the distribution control is also equal to that in case of a single DBA period.

A key for realizing the above operations is a managing method of bandwidth allocation locations.

In a case where the DBA period is a single one, the entire OLTs perform the DBA control at the same period and the same timing, and therefore, a common reference may have been provided such as the arrival time of the downstream frame which is a reference of determining the upstream transmission timing, or transmittable period of the upstream bandwidth that is an object of the bandwidth allocation on the basis of that time. It is preferable to unify the DBA period boundaries in the system to effectively apply the first method. In this case, each OLT has a counter that manages the number of frames in its own DBA period. Simultaneously, it is effective when the OLT has a frame counter that operates at the longest DBA period so that it is used for identifying the system synchronization. By the information, the OLT may perform the bandwidth allocation on the ONU under its control while determining the allocation location of the upstream bandwidth reserved by another OLT.

The second method may be also realized by the whole forms, however, the distribution control may be considered to be most appropriate. In this case, the timing control which is a reference in the entire system is performed independently from the DBA period owned by each OLT. Therefore, a method may be used that distributes the counter long enough not to overlap in the system to all of the OLTs as a reference counter. When each OLT receives a reference counter transmitted from one of the disposed OLTs or DBA control unit, the OLT matches the counter with its DBA period and timing, and conforms with the upstream bandwidth used by another OLT in the system.

FIGS. 50A and 50B depict a construction example of a bandwidth usage condition management table retained in the DBA control unit in a case where the DBA period is different for each OLT in the first and second methods. The basic construction is identical to that shown in FIGS. 30A and 30B. A common counter 5101 is added as the bandwidth allocation location information to grasp the upstream bandwidth use timing between the OLTs. In a case where a frame counter is necessary in the first method (FIG. 44), the frame number (upstream frame number including the bandwidth allocation location) counted from the time of the DBA period boundaries 4201, 4202, and 4203 is stored. In the second method, methods of FIGS. 47 and 48 all require a common counter. For this case, a counter value common in the system is stored in the frame counter 5101, and notified to each OLT as the bandwidth allocation information.

Since each of the DBA periods becomes an integer multiple of the first method, the period of calculation and notification of the bandwidth allocation amount by the DBA is synchronized in the entire system.

Accordingly, it is relatively easy to design the system since it is easy to determine the use conditions of the upstream bandwidth and system operation patterns (overlapping method of the bandwidth allocation calculation) are limited.

In the second method, the DBA period or another timing is different for each OLT. Therefore, upstream bandwidth allocation conditions are determined from the upstream bandwidth information in which each OLT is mapped to the reference clock by supplying the reference clock and the reference period to each OLT.

Although the sharing algorithm of the bandwidth information is relatively complicated, the individual OLT may operate at the free timing (free DBA calculation period).

Since the first method requires the upstream transmission start timing on the ONU side, the first method requires the EqD to be adjusted between the systems like when the DBA period has been unified.

That is, in a case where the same transmission instruction is transmitted to the ONU by the entire systems (OLTs) at the same time, the EqD should be adjusted so that the upstream communication data observed over the trunk optical fiber is overlapped with the same timing. The adjustment method and effect of the EqD is equal to a case where the DBA period has been set identically.

The second method does not have to consider the EqD of the other system. However, when the DBA operation is mapped to the reference counter, the EqD is set so that the upstream signal from the ONU may be observed over the optical fiber at the timing of corresponding to mapping.

Accordingly, in the first method, a ranging method upon addition of a new ONU may employ the same method as a case where the DBA period has been set equally. The second method compares the EqD initial value that is a general ranging result with the receiving timing requested from the mapping information and then determines the corrected value of the EqD.

Figure 51:
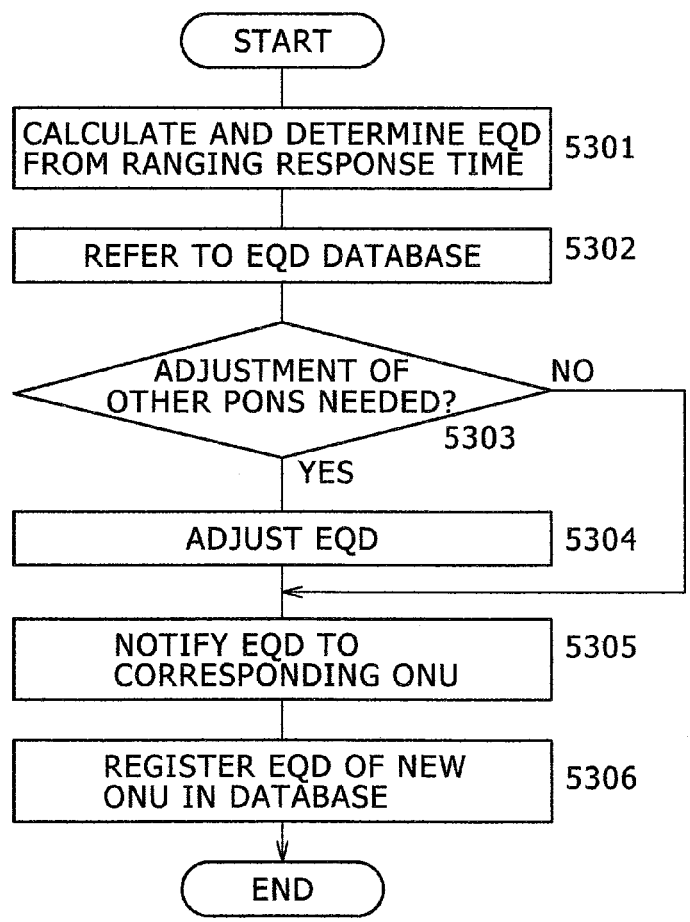
FIG. 51 is a flowchart illustrating a ranging process.

FIG. 51 depicts a flowchart of the ranging process in this case. The OLT performs ranging on the ONU under its control and obtains the longest one, that is, the distance that should be considered a reference of EqD calculation in the conventional ranging process (5301). Next, the OLT identifies mapping information with its DBA period setup and frame counter therein, and, as necessary, system common counter (5302) and determines response time (frame number) from the ONU corresponding to the bandwidth allocation from the OLT. If it is determined EqD adjustment is necessary as the comparison result (5303), the corrected value is yielded 5304 and EqD correction is notified to each ONU (5305).

The other operations are equal to those shown in FIG. 38.

In disposed systems where the downstream wavelengths are common and the upstream wavelengths are different, a PON downstream frame is shared between the disposed systems.

Figure 52:
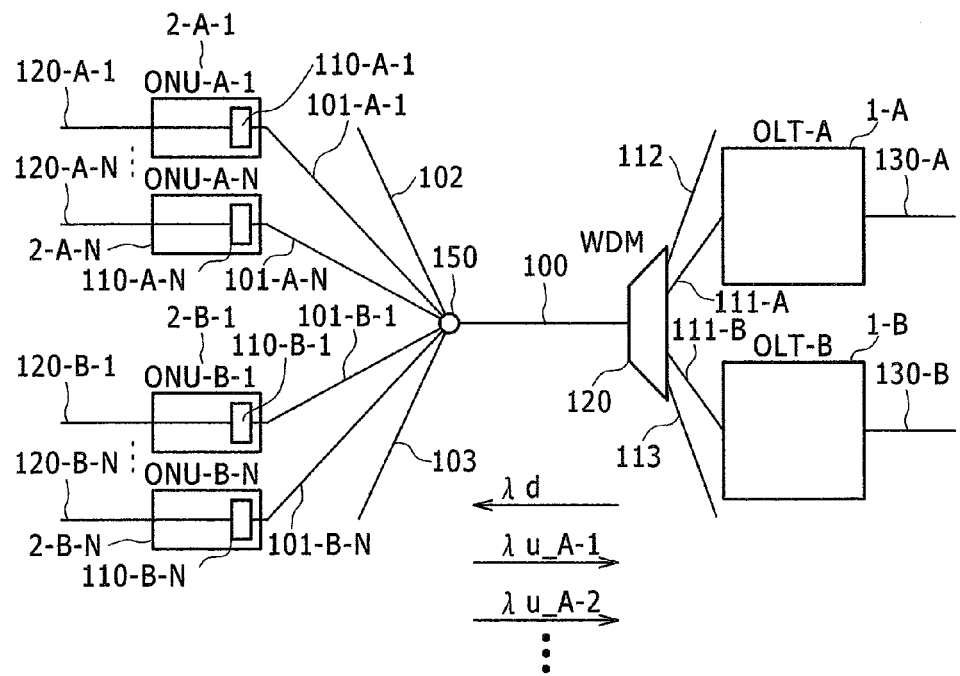
FIG. 52 is a view illustrating a system construction view when a downstream wavelength is shared and an upstream wavelength is different.

The basic construction of the system is as shown in FIG. 1, and only the wavelength allocation is different (FIG. 52).

In the system, the downstream signal from the OLT-A to the ONU under the control of the OLT-A uses the same wavelength for all of the PON interfaces. In the drawings, the wavelength is represented as λd. With respect to the uplink signal, the ONU transmits a signal to the OLT using the different wavelength for each PON interface (OLT), for example, at the wavelength λu(A) in case of the ONU under the control of the OLT-A and at the wavelength λu(B) in case of the ONU under the control of the OLT-B. The upstream signal from all of the ONUs is distributed to the OLT-A and the OLT-B at the same strength. The signal from each PON may be split from a fact that there is provided on the OLT side a filter for cutting the other wavelengths than the upstream wavelength used for each PON and there is provided near the WDM in FIG. 52 a spectral device for distributing destinations for each wavelength. Meanwhile, the downstream signal multiplexed by the WDM 120 is transferred to the ONU through the optical splitter 150 (this becomes an optical coupler for upstream signals) and branch line optical fibers 101-A-1 to 101-A-NA and 101-B-1 to 101-B-NB, each of which is connected to each ONU. The light distributed in all directions by the optical splitter arrives at each ONU at the same time. Therefore, the ONU comes to receive the signals from all of the OLTs. The ONU determines whether it is necessary information or not, for example using Port-ID, VLAN tag, or MAC address, header for PON section, L2 header, L3, or other identifiers included in the upper header.

It is considered that the optical fiber 100 is shared by plural OLTs. The description will be made using the OLT-A and OLT-B in the following exemplary embodiments. However, although the number of connection of the OLTs, that is, the number of PONs sharing the optical fiber 100 is increased, this may be applied without losing the features of the present invention. In this case, OLT connection optical fibers 112 and 113 are used for connection of still another OLT. Also, branch line optical fibers 102 and 103 are used in case of adding or moving ONUs managed by the above-mentioned new OLTs or ONUs managed by the OLT-A or OLT-B.

Figure 53:
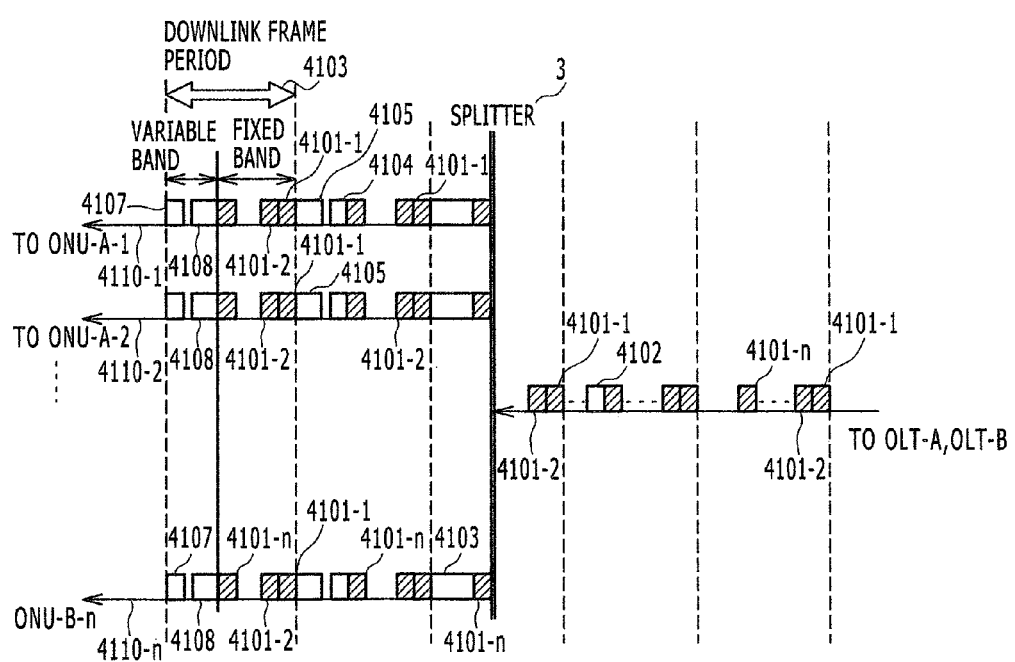
FIG. 53 is a view illustrating a downstream communication method using a time-division multiplexing method.

FIG. 53 depicts a downstream communication method using a time-division multiplexing method which is necessary to operate the system shown in FIG. 52. In the system shown in FIG. 52, all of the OLTs use the same wavelength for downstream signals from the OLT. Since it is impossible to identify the signal from each OLT by its wavelength in the ONU, which is on the receiving side, the signal is identified based on various header information included in the frame (refer to the descriptions of FIG. 52). The OLT performs time division multiplexing to start communication using the frame (GEM frame in GPON) including an identifier (Port-ID of the GEM header in GPON) for each destination in the downstream frame in order to conduct communication with plural ONUs. Herein, time-division communication is carried out with respect to communication with the whole ONUs sharing a single optical fiber. This applies to a case where there exist plural OLTs and each ONU is accommodated in different OLT.

In the conventional system, the OLT having different upstream wavelength has managed the communication conditions with only the ONU under its control when allocating a communication time to an individual ONU. Accordingly, the system should avoid the upstream communication time occupied by another OLT to prevent signal overlapping when band control is performed by an OLT.

FIG. 53 is a view illustrating a frame multiplexing method over a fiber upon transmission of a downstream frame from OLT 1 to ONU 2. FIG. 53 shows a state where a frame is transmitted from the right side to the left side. In the left part of FIG. 53, data transmitted earliest is represented. FIG. 53 also shows an example of an arranged state of frames which are transmitted late from the OLT 1 toward the right side. The dotted-line represents a basic frame period (for example, 125 microseconds).

The frame transmitted from each OLT 1 passes through the WDM and is multiplexed into a single fiber. In the drawing, 4101-1 to 4101-n, respectively, refer to transmission locations and sizes of the fixed bandwidth communication data transmitted toward ONU#1 to ONU2#n. The frame 4102 to frame 4107 refer to variable bandwidth data transmitted to each ONU 2. The variable bandwidth data is inserted to the OLT not to overlap the fixed bandwidth data upon multiplexing. Plural systems may be used over the same fiber even in a case where the same wavelength is used for downlink by transmitting a downstream frame in a time-division multiplexing method as shown in FIG. 53. This method may share an optical module in both new and old systems, and if this function is further prepared, this function may be used, for example, upon upgrade of the same system.

The clock synchronization method in the disposed PON systems is associated with control clocks of optical signals and circuits, but does not relate with allocation of wavelengths for communication.

Accordingly, this may be realized in the same methods as shown in FIGS. 3 to 13.

Figure 58:
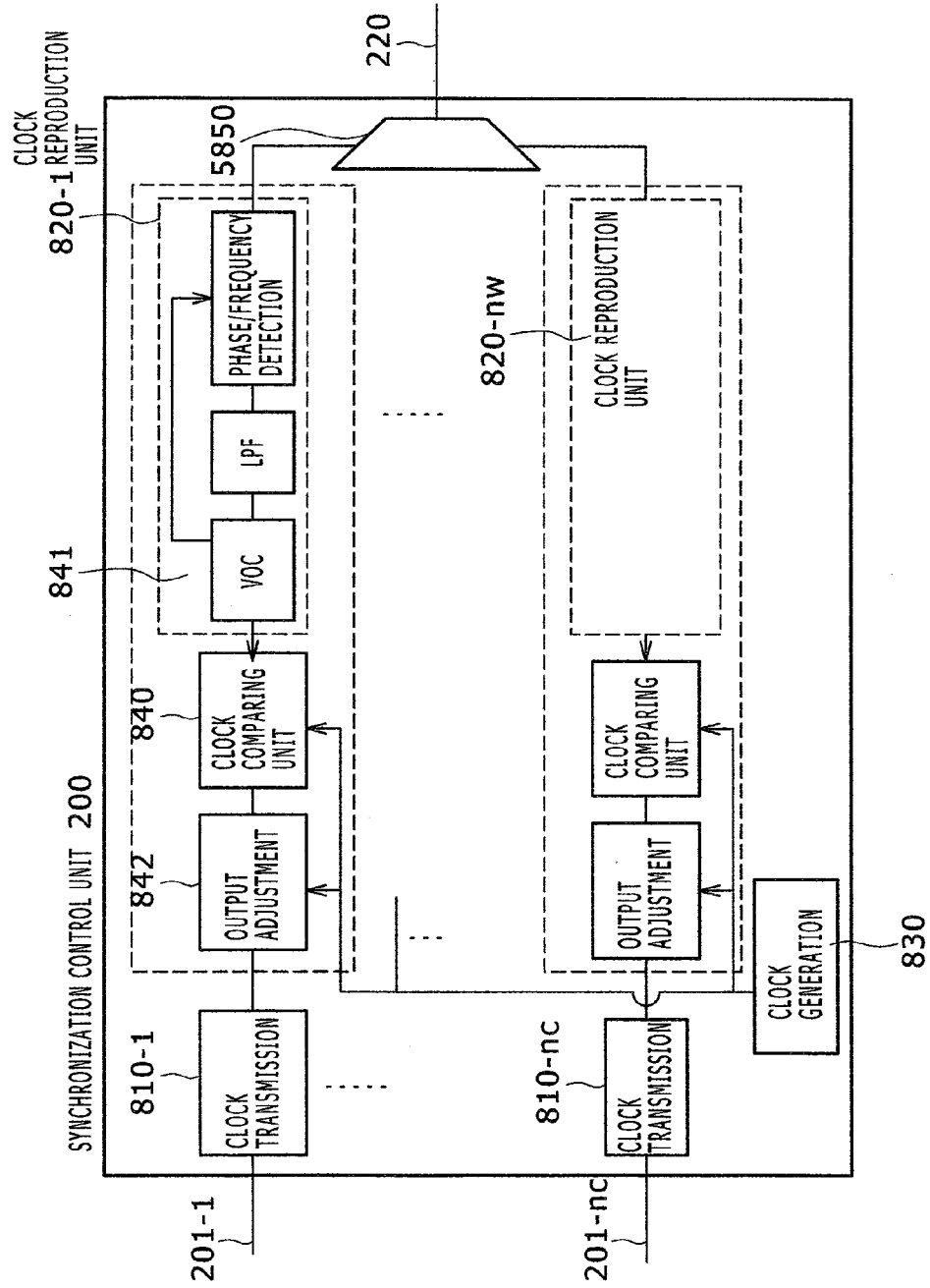
FIG. 58 is a view illustrating a structure of the clock synchronization control unit for a clock synchronization method when a downlink wavelength is shared.

FIG. 58 depicts a clock synchronization method in case of downstream wavelength sharing. When clocks are monitored with respect to a system that feeds back downstream signals from the OLT, a strength identifier 5850 is provided to identify the oscillation source OLT based on strength instead of the WDM 850 that has split signals for each wavelength in FIG. 8.

Figure 59:
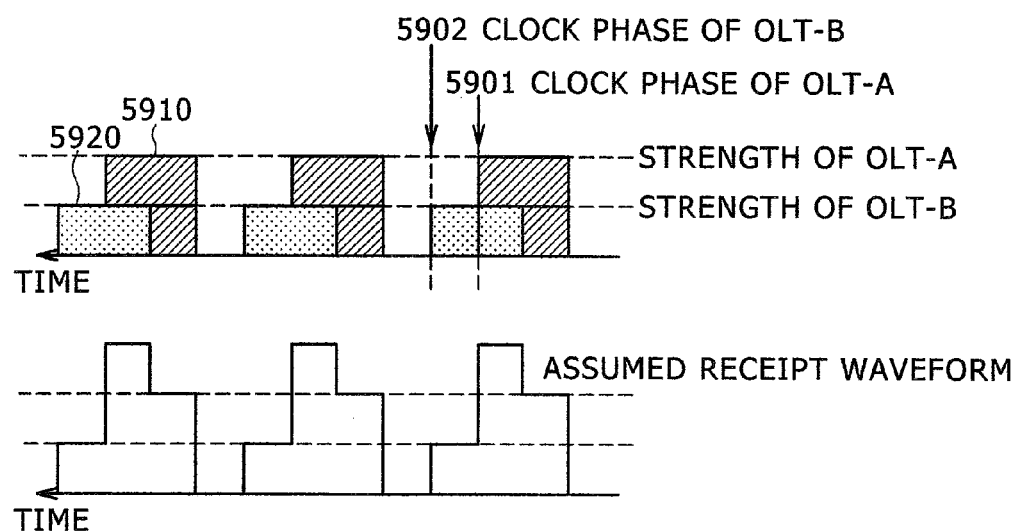
FIG. 59 is a view illustrating an example of a signal transmitted when the phase of a clock is extracted based on strength of the signal.

It is adapted to be capable of extracting the phase of a clock based on strength when signals are fed back by transmitting signals each having different strength in the stage of clock synchronization for each OLT. An example of a transmitted signal is shown in FIG. 59. The reference numeral 5910 refers to a transmission signal from the OLT-A, and the reference numeral refers to a transmission signal from the OLT-B. Since there is a difference between the signal strength 5931 of the OLT-A and the signal strength 5932 of the OLT-B, the phase of clock may be produced from the summed value of strength when optical signals are received.

In a case where downstream wavelengths are the same, accuracy may be improved by adapting clock signals from the ONU side as signals on the high-speed side in addition to synchronizing clocks transmitted from the OLT.

In descriptions regarding a case having different wavelengths, for example, ONUs for 10 Gbps transmission are operated using clock signals of the OLT for 10 Gbps to control clocks of ONUs for 1 Gbps using clock signals of the OLT for 1 Gbps. As mentioned above, it is important to accurately adjust location of a ranging reference point in the PON-disposed system. Here, difference in clocks of the ONUs for 1 Gbps is reduced by using 10 Gbps clocks for synchronization of the ONUs for 1 Gbps.

1 clock variation of 1 Gbps clocks may cause 10 clock variation when being recalculated by 10 Gbps clock conversion. Accordingly, guide bit setup may be made small considering clock variation of low-speed signals by using high-speed clocks even for synchronization and monitoring of low-speed clocks, and this leads to improvement in bandwidth usage efficiency as a whole. In this case, the ONU internally generates period signals for low-speed clocks for loading low-speed clocks onto high-speed clocks to map 1 Gbps signals to 10 Gbps clocks. When 1 Gbps data signals are loaded onto 10 Gbps clocks, signals are loaded on the 1 Gbps signals generated based on 10 Gbps signals inside the ONU and oscillated. And, the delimitation of generated 1 Gbps signals are adjusted to conform to timing of 1 Gbps period signals that come out before being notified together with 10 Gbps signals.

Figure 60:
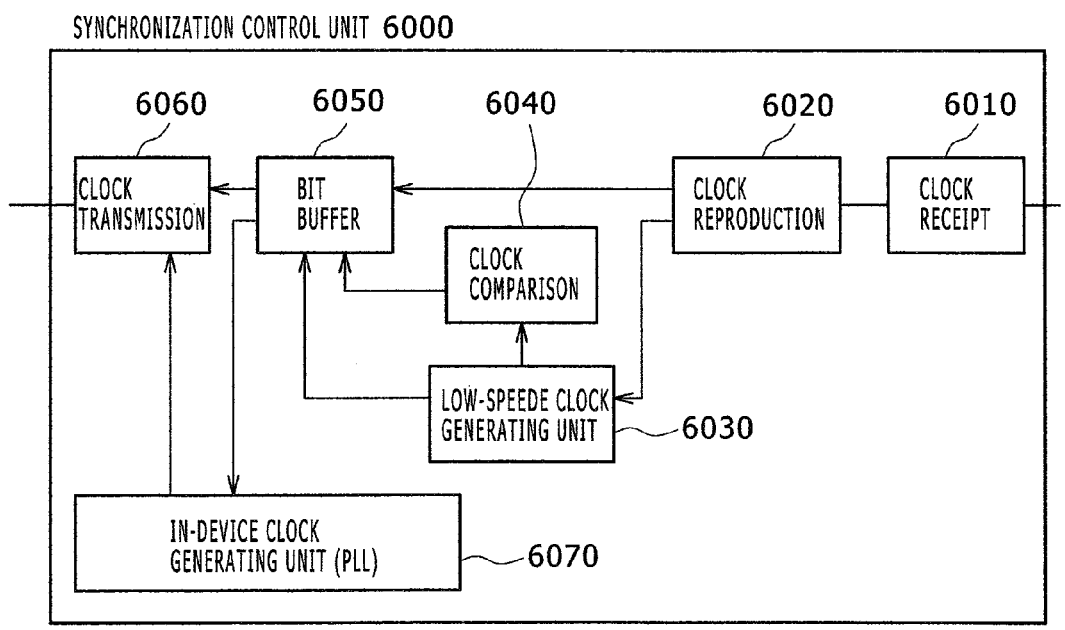
FIG. 60 is a block diagram illustrating an ONU when downstream wavelengths are the same.

A construction of the ONU is shown in FIG. 60. A synchronization control unit of the ONU is included in an optical module and a CDR unit (340 in FIG. 45). When receiving clock signals through a clock receiving unit 6010 (this may be considered as an interface with the optical module or the function of the optical module itself is also considered included) and an optical device, the PON control unit 6000 performs a phase extraction process and signal synchronization for clock reproduction. The clocks obtainable herein are then divided to be utilized as in-device clocks. In the exemplary embodiment, next, a low-speed clock generating unit 6030 generates low-speed clocks and a clock comparing unit 6040 conducts phase comparison with high-speed clocks. Phase information obtained herein is transferred to a bit buffer 6050. The bit buffer 6050 adjusts timing of low-speed clocks and high-speed clocks from the phase information. The low-speed clocks obtainable as a result are sent from the clock transmission interface to the device. The functions of the transmission interface may be included in the bit buffer, and this is not necessary to provide separately. This also applies to any drawings of the present invention. Although it has been described to generate clocks for device at low-speed clocks, the clocks for device may be generated at high-speed clocks.

Since wavelengths are different for each PON interface on the OLT side in a case where only downstream wavelengths are the same, each OLT may perform DBA control at any period and timing, and it is unnecessary to unify the logical distance for all of the disposed PONs. However, it is preferable to set the logical distance to have more margins than general PONS since there is a need of determining (adjusting) timing for time multiplexing transmission) transmission timing of downstream frames that notify uplink band allocation although the upstream frame transmission itself is performed at each different wavelength.

Two methods are considered for methods of transmitting downlink frames. One of them is to share headers of the entire downstream period frames and transmit information by time multiplexing data in the payload. The GPON shares PCBd headers (representative OLT is transmitted) and time-multiplexes timing when a GEM frame is inserted into the payload. For example, in case of G-PON, upstream communication (response) timing from an ONU is determined on the basis of arrival time of downstream period frame header PCBd. Accordingly, downstream bandwidth may be effectively used without a need of transmitting the same header from the entire OLTs. At this time, upstream band control information which is an instruction for ONU 2 included in the header is notified to the representative OLT that transmits the header in order to share the header in the entire OLTs.

Figure 54:
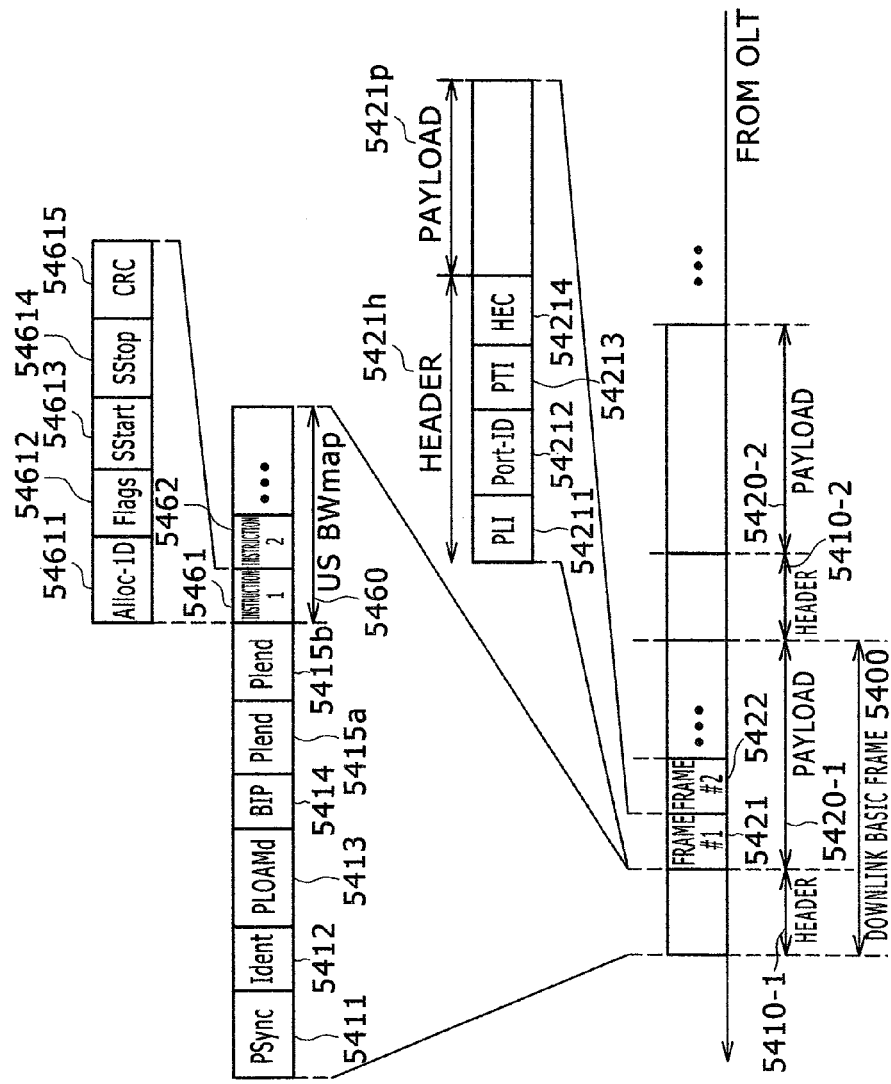
FIG. 54 is a view illustrating a downstream frame transmission method when a header is shared with respect to the entire downstream period frames.

FIG. 54 depicts a downstream frame transmission method when the entire headers of downstream period frames are shared. In this drawing, a method of configuring downstream frames will be described taking frames of GPON as an example. FIG. 54 shows a downstream frame construction itself of G-PON. Accordingly, the other parts than that associated with the exemplary embodiment will be excluded from descriptions.

The entire PON systems sharing the optical fiber utilize headers 5410-1 and 5410-2 (hereinafter, referred to as "5410") of a downstream frame 5400. Among them, PLOAMd 5413 and US BWmap 5460 include a message and a bandwidth instruction from plural OLTs but not a message and a bandwidth instruction from a single OLT like in the prior art. In addition, the PLOAMd 5413 is a field used for startup of ONUs, allocation of ONU-ID or Alloc-ID, or control of distance under operation or monitoring of errors. The US BWmap 5460 is used to notify timing of transmitting upstream frames to an individual ONU, and plural sets are generally inserted into this field, with a field group of 54611 to 54615 as one set. The Alloc-ID 54611 used herein is a parameter specifying the unit for bandwidth control, and this is allocated more than one for each ONU 2. Each OLT 1 notifies a bandwidth instruction for the ONU 2 under its control (that is, information to be inserted into the US BWmap field 5460) to the representative OLT that transmits the header. With respect to communication between OLTs, an effective frame format may be specified only in the device similarly to the inner frame, or this may be transferred using existing protocols such as Ethernet. There are lots of methods with respect to mounting, and therefore, using any method does not affect the spirit of the present invention.

One or plural frames (GEM frame in G-PON) is inserted in the payload 5420 of the downlink frame 5400. This frame is transmitted from each OLT to an ONU under the control of the OLT. Accordingly, in a case where an OLT transmits a downstream frame, the OLT divides transmission timing between OLTs and transmits the frame so as not to overlap a downstream frame transmitted from another OLT.

The detailed method has been already described above, and therefore, repetitive descriptions will be omitted. A frame of an individual ONU2 includes PLI (Payload Length Indicator) representing frame length, Port-ID for identifying a destination ONU 2, PTI (Payload Type Indicator) for identifying the type of information in the frame (for example, such as whether the information is data for maintenance or user's data), and an HEC field 54214 used for error correction code (ECC) of the header 5421h. The individual ONU2 may extract information therefrom of the downstream frame by allocating Port-ID to the individual ONU2 so as not to overlap between the entire systems sharing the optical fiber.

Upon transmission of frames in FIG. 54, (taking GPON as an example), transmission resource OLTs are different in the boundary of GEM frame. Since clocks are unified according to the above-mentioned clock synchronization method upon transmission of downstream signals, clocks may be expected to be synchronized with each other at a certain degree upon receipt in the ONU 2. By doing so, phase identification may be conducted for each GEM frame, and this may expect further stabilized operations. The following functions are provided to identify phase.

In the G-PON, the frame synchronization is identified according to whether HEC included in the header of a GEM frame may be taken or not, and in addition thereto, clock phase information is retained in the ONU side for each OLT number. This lets the OLT have a function for memorizing a clock phase (eye pattern receiving timing) when the signals from the ONUs are synchronized on the OLT side. Specifically, the amount of shifts in phase is maintained in the receiving unit to absorb the shift of clock phases when one clock signal is extracted. The method is not limited, however, there is a method of catching a location having optimal receiving sensitivity as the phase of the data by receiving a signal at plural receiving locations where a tiny amount of phases have been shifted compared to the phases of data signals upon achieving signal synchronization. In the G-PON, this method is used upon receipt of 1.2 G upstream signals. It removes any necessity of comparing and selecting plural receiving patterns for each data frame receipt to retain the optimal location obtainable in this case, thus making it possible to reduce the probability of losing synchronization.

Another method is to transmit a downstream frame from each OLT in the complete form and control transmission timing between OLTs so that signals do not overlap each other. For this case, it is not necessary to unify operation periods between OLTs. This may be used for a case where operation clocks for OLTs are different or OLTs having different information processing efficiency therein are disposed. Further, since the timing for TDM may be dynamically varied by communication between OLTs, this is effective, for example, in a case where plural PONs are disposed that have different frame formats such as G-PON and GE-PON. Because of not being specified, the timing for transmitting downstream information between OLTs is notified by the OLT even in this case, and there is required a structure that avoids overlapping between signals.

Figure 55:
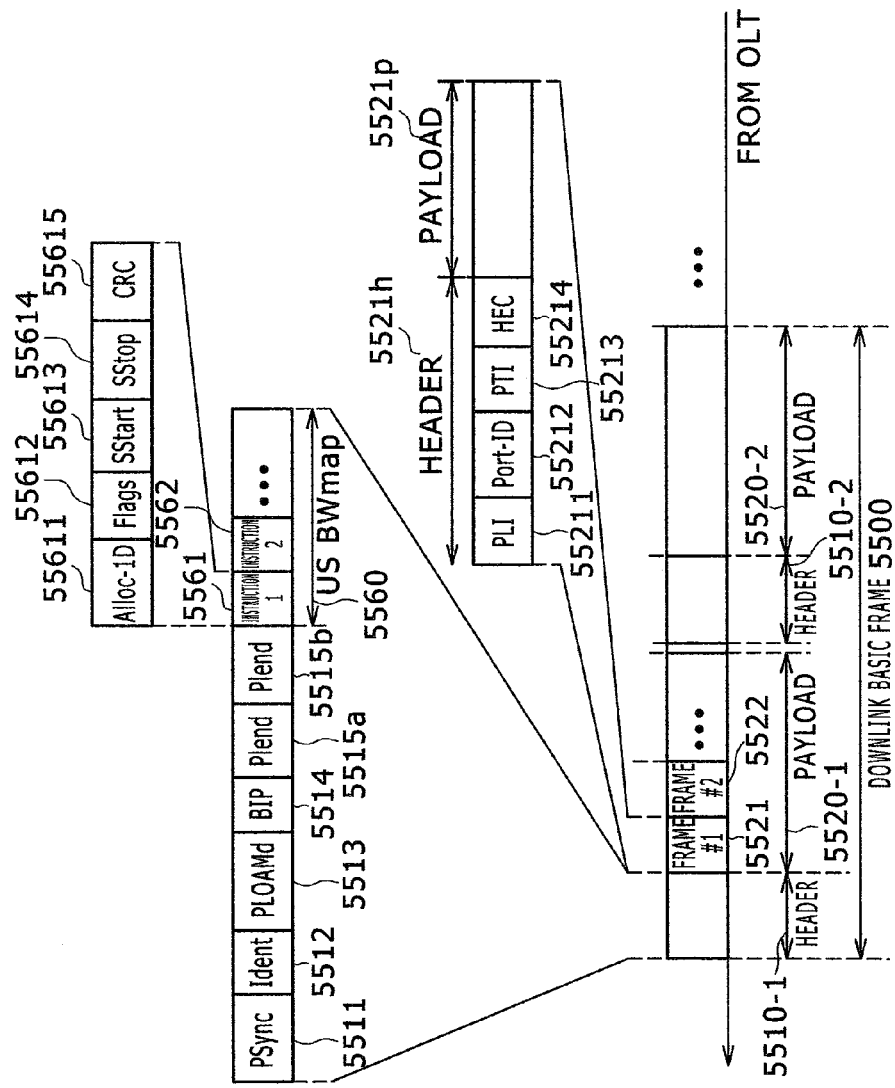
FIG. 55 is a view illustrating a downstream frame transmission method when each OLT transmits each downstream frame in the complete form.

FIG. 55 depicts a downlink frame transmission method when each OLT transmits a downlink frame in the complete form.

In this case, plural PCBd header 5510 added frames are inserted in the basic period 5500 of the downstream communication control (125 microsecond period in G-PON). The difference from FIG. 54 lies in whether the header 5510 is shared by the entire OLTs or separately transmitted. In case of FIG. 55, when the frame synchronization pattern is inserted before the header 5410-2, a process of synchronizing an individual frame in the ONU2 may utilize the conventional technology. As another method, in a case where clock synchronization accuracy is sufficient, start location of the header 5510-2 of the subsequent frame may be determined by referring to information on frame length 5515a, 5515b, and 55211 included in the header 5510 without inserting the frame synchronization pattern. In the latter case, phase shift of downstream frame may be suppressed by preparing phase identification function of downstream frame as in FIG. 54, and therefore, stable operations may be done even though the number of the OLTs has been increased.

The basic construction of the header 5510 is as shown in FIG. 54. However, only the information on the ONU which is managed by individual OLT is inserted into the US BWmap 5560. Accordingly, header construction and content of the downstream frame are identical to the construction of the header that has been used for existing PON at the beginning of GPON. The ONU2 may refer to the US BWmap 5560 of the downstream frame and Port-ID 55212 included in the header 5521h of the data frame to determine whether it should gather the data (bandwidth instruction and user's data).

In a case where downlink frames are common, it is necessary to provide an ID for band allocation to identify a specific ONU with plural PON systems disposed. There are plural implementing methods. One of them is a method of using independent identifiers (Alloc-ID in case of GPON) with respect to the entire ONUs sharing the optical fiber. This method has a merit of being capable of the conventional frame format without any variation. In a case where the number of band allocation IDs is relatively small, a request may be satisfied which reduce development costs and maintains operation efficiency. In another method, an identifier for identifying the PON system is separately provided from the conventional bandwidth allocation ID, and the bandwidth allocation process is performed like the prior art in the individual PON system. Because the number of independent band control IDs may be small in this case, the size of the memory in the individual device and logical circuits may be reduced, thus resulting in lowering in costs. Because operation such as searching becomes fast as the number of the band control IDs, improvement in performance may be expected.

In a case where upstream wavelengths are different for each ONU, at this time they are not applicable, for example, overlapping between signals in upstream communication. It is unnecessary to adjust the response delay time of the ONU between systems that has been performed when upstream wavelengths are the same without TDM control.

The setup of EqD may be carried out independently for each PON system. The process at the startup of ONU sets the logical distance necessary from the OLT side by the transmission timing of the downstream frame. It is required to adjust the transmission timing of the downstream frame by referring to a common frame counter for controlling the downstream communication and making the boundaries of the DBA control periods unified with respect to the OLT (at the beginning of the OLT). However, if the adjustment is complete at the OLT side, the subsequent ONU start processing may be performed by using the conventional method, and the ranging process and its result, i.e. determination of EqD are not affected by the other systems.

In a case where the upstream and downstream wavelengths are set to be common, a clock synchronization method between the OLTs may be realized by the same method as described above with reference to FIGS. 1 to 13 without the aid of setup of wavelengths.

Such a process as described above with reference to FIGS. 14 to 51 is required for DBA control and setup of logical distance that is needed for control of upstream communication timing. Also, adjustment of transmission timing is necessary between the OLTs and such a process as described above with reference to FIGS. 52 to 56 is performed with respect to the downlink communication timing.

What is claimed is:

1. A network system comprising:
a first OLT (Optical Line Terminal), a second OLT, a first ONU (Optical Network Unit), and a second ONU,
wherein the first OLT and the second OLT are connected to the first ONU and the second ONU through an optical fiber shared by the first OLT and the second OLT such that data is transmitted between the first OLT and the first ONU and between the second OLT and the second ONU,
wherein time division multiplexing is performed during data transmission between the first OLT and the first ONU and between the second OLT and the second ONU,
the first OLT and the second OLT mutually share uplink communication band allocation information so that each of the first and second ONUs transmits an uplink frame,
the first OLT allocates a first uplink communication band to the first ONU which is different from a second uplink communication band that is allocated to the second ONU, and allocates the second uplink communication band to the second ONU,
wherein the first and second OLTs are connected to a DBA control unit that allocates the uplink communication band to the first OLT and the second OLT, and
the DBA control unit notifies the uplink communication band information which is allocated to the first OLT and the second OLT, and
wherein the DBA control unit includes a band request management table that stores an uplink communication request band notified from the first OLT and the second OLT and priority of the uplink band allocation between the first OLT and the second OLT, and
the DBA control unit allocates the uplink band based on the priority of the uplink band.

2. The network system according to claim 1, wherein DBA periods of the first and second OLTs are the same periods.

3. The network system according to claim 1, wherein the first OLT allocates the first uplink communication band to the first ONU based on the uplink communication band information notified from the DBA control unit and the second OLT allocates the second uplink communication band to the second ONU based on the uplink communication band information notified from the DBA control unit.

4. The network system according to claim 1,
wherein the first OLT directly notifies the DBA control unit of the uplink band request from the first ONU,
the second OLT directly notifies the DBA control unit of the uplink band request from the second ONU, and
in the DBA control unit, the allocation of the uplink communication band to the first ONU and the second ONU is performed.

5. The network system according to claim 1,
wherein the first OLT includes a band management database that stores the band allocation information allocated to the first ONU and the priority between the first OLT and the second OLT, and
when the first OLT has higher priority than the second OLT by referring to the band management database, the first uplink communication band is allocated to the first ONU and the allocated uplink band information is notified to the second OLT and when the first OLT has lower priority than the second OLT, the second OLT receives the second uplink band information that is allocated to the second ONU and then allocates the uplink communication band to the first ONU.

6. The network system according to claim 1,
wherein the DBA period of the first OLT is an integer multiple of the DBA period of the second OLT and the first OLT and the second OLT share a timing of a period boundary of the DBA period of the first OLT as a timing of a period boundary of a common DBA period,
the first ONU and the second ONU include an uplink frame counter that counts the timing of the period boundary,
the first OLT and the second OLT instruct a transmission time of the uplink frame to the first ONU and the second ONU, respectively by using a relative time that considers the timing of the period boundary as a reference, and the first ONU and the second ONU transmit the uplink frame based on the timing the period boundary and the relative time notified from the first OLT and the second OLT.

7. The network system according to claim 1,
wherein the DBA period of the first OLT is an integer multiple of the DBA period of the second OLT and the first OLT and the second OLT share a timing of a period boundary of the DBA period of the first OLT as a timing of a period boundary of a common DBA period,
each of the ONU includes an uplink frame counter that counts the number of frames among the uplink frames included between next timings of the period boundary from the timing of the period boundary,
the first OLT and the second OLT notify the first ONU and the second ONU, respectively, of a frame identifier indicating whether an uplink communication band is allocated within any frame of the plurality of uplink frames included between next timings of the period boundary from the timing of the period boundary and a band allocation position among the frames, and
the first ONU and the second ONU transmit the uplink frame based on the number of counts of the uplink frame counter, the frame identifier, and the band allocation position among the frames.

8. The network system according to claim 1,
wherein the first OLT and the second OLT perform the DBA control at different DBA periods and share a count start time and a count period that counts a reference timing performing the DBA control,
the first OLT and the second OLT instruct a transmission time of the uplink frame to the first ONU and the second ONU, respectively, by using a relative time from a count start time of the reference timing, and
the first ONU and the second ONU include an uplink frame counter that counts the relative time from the count start time and transmits the uplink frame based on the transmission time instructed from the uplink frame counter and the first OLT and the second OLT.

9. The network system according to claim 1,
wherein the first OLT and the second OLT perform the DBA control at different DBA periods and share a count start time and a count period that counts a reference timing performing the DBA control,
the first ONU and the second ONU includes an uplink frame counter that counts the number of frames included during the count period,
the first OLT and the second OLT notify the first ONU and the second ONU, respectively, of a frame identifier indicating whether an uplink communication band is allocated within any frame of the plurality of frames included during the count period and a band allocation position among the frames, and
the first ONU and the second ONU transmits the uplink frame based on the number of counts of the uplink frame counter, the frame identifier, and the band allocation position among the frames.

10. A network system comprising:
a first OLT (Optical Line Terminal), a second OLT, a first ONU (Optical Network Unit), and a second ONU,
wherein the first OLT and the second OLT are connected to the first ONU and the second ONU through an optical fiber shared by the first OLT and the second OLT such that data is transmitted between the first OLT and the first ONU and between the second OLT and the second ONU,
wherein time division multiplexing is performed during data transmission between the first OLT and the first ONU and between the second OLT and the second ONU,
the first OLT and the second OLT mutually share uplink communication band allocation information so that each of the first and second ONUs transmits an uplink frame, and
the first OLT allocates a first uplink communication band to the first ONU which is different from a second uplink communication band that is allocated to the second ONU, and allocates the second uplink communication band to the second ONU, and
wherein the first OLT includes a DBA control unit that allocates the uplink communication band to the second OLT, and
the DBA control unit notifies the second OLT of the uplink communication band information that is allocated to the second OLT.

11. The network system according to claim 10, wherein the first OLT and the first ONU are operated at higher bit rate than the second OLT and the second ONU.

12. An OLT that is connected to an ONU and the other ONU of a system through an optical fiber shared by the ONU and the other ONU of the system, is further connected to the other OLT of the system, and transmits data between the ONUs,
the OLT comprising a band management database that stores the band allocation information allocated to the ONU and priority between the OLT and the other OLT of the system,
wherein time division multiplexing is performed during data transmission,
the OLT shares uplink communication band information that is allocated to the ONU and the other ONU of the system with the other OLT of the system, and
the OLT allocates a first uplink communication band to the ONU which is different from a second uplink communication band that is allocated to the other OLT of the system, and
wherein when the OLT has higher priority that the other OLT of the system by referring to the band management database, the first uplink communication band is allocated to the ONU and the allocated uplink band information is notified to the other OLT of the system and when the OLT has lower priority than the other OLT of the system, the other OLT of the system receives the uplink band information that is allocated to the other ONU of the system and then allocates the second uplink communication band to the ONU.

13. The OLT according to claim 12, further comprising a DBA control unit that allocates the uplink band to the ONU and the other ONU of the system,
wherein the DBA control unit notifies the other ONU of the system of the allocated communication band information.

14. The OLT according to claim 13, wherein the OLT is operated at higher bit rate than the other OLT of the system and the other ONU of the system.

* * * * *